(12) United States Patent
Zhu et al.

(10) Patent No.: US 12,231,693 B2
(45) Date of Patent: Feb. 18, 2025

(54) ENTROPY CODING FOR PALETTE ESCAPE SYMBOL

(71) Applicant: Bytedance Inc., Los Angeles, CA (US)

(72) Inventors: Weijia Zhu, San Diego, CA (US); Jizheng Xu, San Diego, CA (US); Li Zhang, San Diego, CA (US); Hsiao Chiang Chuang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 18/485,088

(22) Filed: Oct. 11, 2023

(65) Prior Publication Data
US 2024/0056609 A1 Feb. 15, 2024

Related U.S. Application Data

(63) Continuation of application No. 17/965,325, filed on Oct. 13, 2022, now Pat. No. 11,943,481, which is a (Continued)

(30) Foreign Application Priority Data

Aug. 15, 2019 (WO) ................ PCT/CN2019/100850
Sep. 19, 2019 (WO) ................ PCT/CN2019/106700
(Continued)

(51) Int. Cl.
*H04N 19/70* (2014.01)
*H04N 19/132* (2014.01)
(Continued)

(52) U.S. Cl.
CPC .......... *H04N 19/70* (2014.11); *H04N 19/132* (2014.11); *H04N 19/176* (2014.11); *H04N 19/186* (2014.11)

(58) Field of Classification Search
CPC .... H04N 19/70; H04N 19/132; H04N 19/176; H04N 19/186
(Continued)

(56) References Cited

U.S. PATENT DOCUMENTS 9,426,462 B2 8/2016 Wang
9,426,466 B2 8/2016 Van der Auwera
(Continued)

FOREIGN PATENT DOCUMENTS

CN 114424545 B 7/2024
EP 3308542 B1 7/2019
(Continued)

OTHER PUBLICATIONS

"http://phenix.it-sudparis.eu/jvet/doc_end_user/documents/15_Gothenburg/wg11/JVET-O2001-v14.zip".
(Continued)

*Primary Examiner* — Nguyen T Truong
(74) *Attorney, Agent, or Firm* — Conley Rose, P.C.

(57) ABSTRACT

Methods, systems, and devices for performing entropy coding for a palette escape symbol in palette mode coding and decoding are described. An example method for video processing includes performing a conversion between a video having one or more video regions including a current video block and a bitstream representation of the video, wherein the bitstream representation conforms to a format rule that the current video block is coded using a palette mode coding tool, wherein a binarization of an escape symbol for the current video block uses an exponential-Golomb (EG) code of order K, wherein K is a non-negative integer that is unequal to three, and wherein the palette mode coding tool represents the current video block using a palette of representative color values and wherein the escape sym-
(Continued)

bol is used for a sample of the current video block coded without using the representative color values.

20 Claims, 33 Drawing Sheets

Related U.S. Application Data continuation of application No. 17/671,422, filed on Feb. 14, 2022, now Pat. No. 11,503,344, which is a continuation of application No. PCT/US2020/046581, filed on Aug. 15, 2020.

(30) Foreign Application Priority Data

| Sep. 24, 2019 | (WO) | ................ PCT/CN2019/107494 |
| Sep. 27, 2019 | (WO) | ................ PCT/CN2019/108736 |
| Oct. 1, 2019 | (WO) | ................ PCT/CN2019/109793 |
| Oct. 29, 2019 | (WO) | ................ PCT/CN2019/113931 |
| Jan. 9, 2020 | (WO) | ................ PCT/CN2020/071221 |

(51) Int. Cl.
  *H04N 19/176*  (2014.01)
  *H04N 19/186*  (2014.01)
(58) Field of Classification Search
  USPC .................................................. 375/240.26
  See application file for complete search history.

(56) References Cited

U.S. PATENT DOCUMENTS

| 9,900,617 | B2 | 2/2018 | Karczewicz | |
| 10,055,189 | B2 | 8/2018 | Tsai | |
| 10,148,981 | B2 | 12/2018 | Zhu | |
| 10,237,575 | B2 | 3/2019 | Tsai | |
| 10,277,910 | B2 | 4/2019 | Xiu | |
| 10,484,686 | B2 | 11/2019 | Xiu | |
| 10,659,783 | B2 | 5/2020 | Li | |
| 10,681,383 | B2 | 6/2020 | Ye | |
| 10,735,764 | B2 | 8/2020 | Tsai | |
| 10,812,817 | B2 | 10/2020 | Li | |
| 11,943,481 | B2 | 3/2024 | Zhu | |
| 2010/0150242 | A1 | 6/2010 | Ozawa | |
| 2013/0051458 | A1 | 2/2013 | Kitahara | |
| 2013/0064293 | A1 | 3/2013 | Song | |
| 2014/0160139 | A1 | 6/2014 | MacInnis | |
| 2015/0078447 | A1 | 3/2015 | Gamei | |
| 2015/0098510 | A1 | 4/2015 | Ye | |
| 2015/0341643 | A1 | 11/2015 | Xu | |
| 2015/0365671 | A1 | 12/2015 | Pu | |
| 2016/0100177 | A1 | 4/2016 | Pu | |
| 2016/0100179 | A1 | 4/2016 | He | |
| 2016/0234498 | A1* | 8/2016 | Misra | ..................... H04N 19/46 |
| 2016/0286215 | A1 | 9/2016 | Gamei | |
| 2016/0373745 | A1 | 12/2016 | Joshi | |
| 2017/0026641 | A1 | 1/2017 | Lai | |
| 2017/0085891 | A1 | 3/2017 | Seregin | |
| 2017/0127077 | A1 | 5/2017 | Chuang | |
| 2017/0318301 | A1 | 11/2017 | Li | |
| 2017/0374372 | A1 | 12/2017 | Liu | |
| 2017/0374384 | A1 | 12/2017 | Xiu | |
| 2018/0288415 | A1 | 10/2018 | Li | |
| 2018/0307457 | A1 | 10/2018 | Tsai | |
| 2019/0158854 | A1 | 5/2019 | He | |
| 2019/0238845 | A1 | 8/2019 | Zhang | |
| 2019/0246122 | A1 | 8/2019 | Zhang | |
| 2020/0092546 | A1* | 3/2020 | Ye | ....................... H04N 19/186 |
| 2020/0244962 | A1 | 7/2020 | Li | |
| 2020/0267392 | A1 | 8/2020 | Lu | |
| 2020/0322630 | A1 | 10/2020 | Tsai | |
| 2021/0029358 | A1 | 1/2021 | Chao | |
| 2021/0051336 | A1* | 2/2021 | Chao | .................. H04N 19/1883 |
| 2021/0092372 | A1 | 3/2021 | Misra | |
| 2021/0297669 | A1 | 9/2021 | Zhang | |
| 2021/0321098 | A1 | 10/2021 | Chuang | |
| 2022/0182655 | A1 | 6/2022 | Zhu | |
| 2022/0210419 | A1 | 6/2022 | Zhu | |

FOREIGN PATENT DOCUMENTS

| IN | 546343 | 7/2024 |
| JP | 7494289 B2 | 6/2024 |
| WO | 2013158656 A2 | 10/2013 |
| WO | 2017206805 A1 | 12/2017 |
| WO | 2019026807 A1 | 2/2019 |

OTHER PUBLICATIONS

Bossen, F., Retrieved From the Internet: https://vcgit.hhi.fraunhofer.de/jvet/VVCSoftware_VTM/tags/VTM-5.0, Jan. 9, 2023, 2 pages.
Document: JVET-O2011, Segall, A., et al., "JVET common test conditions and evaluation procedures for HDR/WCG video," Joint Video Exploration Team (JVET) of ITU-T SG 16 WP 3 and ISO/IEC JTC 1/SC 29/WG 11 15th Meeting: Gothenburg, SE, Jul. 3-12, 2019, 10 pages.
Document: JVET-N0258-v1, Zhu, W., et al., "CE8-related: Palette Mode Coding," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.
Document: JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.
"Series H: Audiovisual and Multimedia Systems, Infrastructure of audiovisual services—Coding of moving video High efficiency video coding," Recommendation ITU-T H.2651 ISO/IEC 23008-2, Feb. 2018, 692 pages.
Document: JVET-N0309-v3, Henkel, A., et al., "Non-CE4: Switched half-pel interpolation filter," Joint Video Experts Team (JVET) of ITU-T SG 16 WP 3 and ISO/IEC JTC 1/SC 29/WG 11 14th Meeting: Geneva, CH, Mar. 19-27, 2019, 8 pages.
Document: JVET-P0077, Chao, Y-H., et al., "E8-1.3: Line-based CG Palette Mode," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.
Document: JVET-P2001-v4, Bross, B., et al., "Versatile Video Coding (Draft 7)," Joint Video Experts Team (JVET) of ITU-T SG 16 WP 3 and ISO/IEC JTC 1/SC 29/WVG 11 16th Meeting: Geneva, CH, Oct. 1-11, 2019, 463 pages.
Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
Document JVET-O0071-V1, Zhu, W., et al., "CE8-2.3: Compound Palette Mode," Joint Video Experts Team (JVET) of ITU-T SG 16 WP 3 and ISO/IECJTC 1/SC 29/WG 11 15th Meeting, Gothenburg, SE Jul. 3-12, 2019, 17 pages.
Document JVET-L0308, Ye, J., et al., "CE15-Related: Palette Mode When Dual-Tree is Enabled," Joint Video Experts Team (JVET) of ITU-T SG 16WP3 and ISO/IEC JTC 1/SC 29/WG 11 12th Meeting, Macao, CN Oct. 3-12, 2018, 3 pages.
Document: JCTVC-T0112r1, Zou, F., et al. "CE1 Related: On Escape Pixel Coding for Palette Mode," Joint Collaborative Team on Video Coding (JCTVC)of ITU-T SG 16 WP 3 and ISO/IEC JTC 1/SC 29/WG 11 20th Meeting, Geneva, CH Feb. 10-18, 9 pages.
Document: JVET-O0398, Choi, J., et al., "Chroma Block Size Restriction in Dual Tree Intra Coding," Joint Video Experts Team (JVET) of ITU-T SG16 WP 3 and ISO/IEC JTC 1/SC 29/WG 1115th Meeting, Gothenburg, SE Jul. 3-12, 2019, 4 pages.
Xu, J., et al., "Overview of the Emerging HEVC Screen Content Coding Extension", IEEE Transactions on Circuits and Systems for Video Technology, Sep. 14, 2015, IEEE, vol. 26, No. 1, pp. 50-62, ISSN: 1051-8215, DOI: 10.1109/TCSVT.2015.2478706.
Document: JVET-O0259-v1, Zhu, W., et al., "CE8-related: Palette mode with 8 bits entries," Joint Video Experts Team (JVET) of

(56) References Cited

OTHER PUBLICATIONS

ITU-T SG 16 WP 3 and ISO/IEC JTC 1/SC 29/WG 11 15th Meeting: Gothenburg, Jul. 3-12, 2019, 19 pages.
Document: JVET-O2001-vD, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 474 pages.
Foreign Communication From A Related Counterpart Application, PCT Application No. PCT/US2020/046574, International Search Report dated Jan. 19, 2021, 12 pages.
Foreign Communication From A Related Counterpart Application, PCT Application No. PCT/US2020/046581, International Search Report dated Jan. 12, 2021, 12 pages.
Foreign Communication From A Related Counterpart Application, PCT Application No. PCT/US2020/051540, International Search Report dated Dec. 31, 2020, 10 pages.
Non-Final Office Action dated Jun. 16, 2022, 8 pages, U.S. Appl. No. 17/698,968, filed Mar. 18, 2022.
Non-Final Office Action dated Apr. 28, 2022, 9 pages, U.S. Appl. No. 17/671,486, filed Feb. 14, 2022.
Foreign Communication From A Related Counterpart Application, Indian Application No. 202247015459, Indian Office Action dated Aug. 22, 2022, 6 pages.
Foreign Communication From A Related Counterpart Application, European Application No. 20851940.5, Extended European Search Report dated Aug. 5, 2022, 14 pages.
Notice of Allowance dated Oct. 12, 2022, 17 pages, U.S. Appl. No. 17/698,968, filed Mar. 18, 2022.
Document: JVET-O2001-v4, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothernburg, SE, Jul. 3-12, 2019, 422 pages.
Korean Notice of Allowance from Korean Application No. 10-2022-7004036 dated Jun. 5, 2024, 8 pages.

* cited by examiner

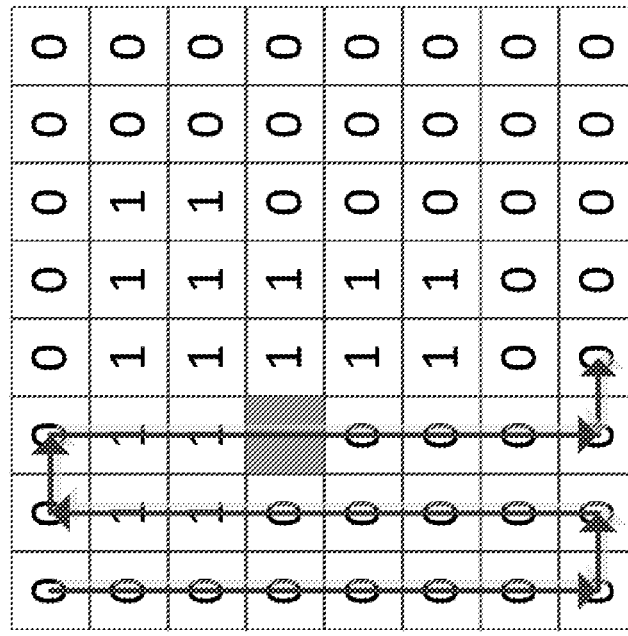
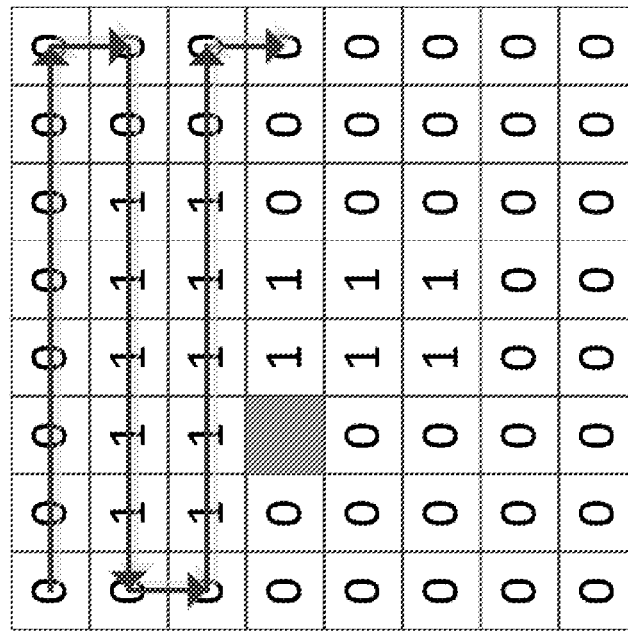
FIG. 3

2300

Performing a conversion between a video comprising one or more video regions comprising a current video block and a bitstream representation of the video, the bitstream representation conforming to a format rule that the current video block that is coded using a palette mode coding tool is represented using syntax elements that are coded based on the current index and a reference index — 2310

2410 — Performing a conversion between a video comprising one or more video regions comprising a current video block and a bitstream representation of the video, the bitstream representation conforming to a format rule that the current video block that is coded using a palette mode coding tool is represented using syntax elements comprising an escape symbol that is predictively coded

FIG. 24

ENTROPY CODING FOR PALETTE ESCAPE SYMBOL

CROSS-REFERENCE TO RELATED APPLICATIONS

This application is a continuation of U.S. application Ser. No. 17/965,325, filed on Oct. 13, 2022, which is a continuation of U.S. application Ser. No. 17/671,422 (now issued as U.S. Pat. No. 11,503,344), filed on Feb. 14, 2022, which is a continuation of International Application No. PCT/US2020/046581, filed on Aug. 15, 2020, which claims the priority to and benefits of International Patent Application Nos. PCT/CN2019/100850, filed on Aug. 15, 2019; PCT/CN2019/106700, filed on Sep. 19, 2019; PCT/CN2019/107494, filed on Sep. 24, 2019; PCT/CN2019/108736, filed on Sep. 27, 2019; PCT/CN2019/109793, filed on Oct. 1, 2019; PCT/CN2019/113931, filed on Oct. 29, 2019; and PCT/CN2020/071221, filed on Jan. 9, 2020. The entire disclosures of the aforementioned applications are incorporated by reference as part of the disclosure of this application.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for performing entropy coding for the palette escape symbol in palette mode coding and decoding.

In an example aspect, a method of video processing is disclosed. The method includes performing a conversion between a video comprising one or more video regions comprising a current video block and a bitstream representation of the video, wherein the bitstream representation conforms to a format rule that the current video block is coded using a palette mode coding tool, wherein a binarization of an escape symbol for the current video block uses an exponential-Golomb (EG) code of order K, wherein K is a non-negative integer that is unequal to three, and wherein the palette mode coding tool represents the current video block using a palette of representative color values and wherein the escape symbol is used for a sample of the current video block coded without using the representative color values.

In another example aspect, a method of video processing is disclosed. The method includes performing a conversion between a video comprising one or more video regions comprising one or more video blocks and a bitstream representation of the video, wherein the bitstream representation conforms to a format rule that a current video block of the one or more video blocks that is coded using a palette mode coding tool wherein a binarization of an escape symbol for the current video block uses a fixed length binarization, wherein the palette mode coding tool represents the current video block using a palette of representative color values and wherein the escape symbol is used for a sample of the current video block coded without using the representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block is coded using a palette mode coding tool, wherein a binarization of an escape symbol of the current video block uses a variable length coding, wherein the palette mode coding tool represents the current video block using a palette of representative color values and wherein the escape symbol is used for a sample of the current video block coded without using the representative color values.

In yet another example aspect, a method of video processing is disclosed. The method includes performing a conversion between a video comprising one or more video regions comprising a current video block and a bitstream representation of the video, wherein the conversion comprises an application of a quantization or an inverse quantization process on the current video block, wherein the bitstream representation conforms to a format rule that configures the application of the quantization or the inverse quantization process based on whether the current video block is coded using a palette mode coding tool, and wherein the palette mode coding tool represents the current video block using a palette of representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool is represented such that an escape symbol of the current video block is quantized and/or dequantized using a binary shift operation, wherein the palette mode coding tool represents the current video block using a palette of representative color values and wherein the escape symbol is used for a sample of the current video block coded without using the representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool, wherein one or more palette indexes of the palette mode coding tool are coded without using a reference index, and wherein the palette mode coding tool represents the current video block using a palette of representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block is coded using a palette mode coding tool and constrains a derivation between an index of an escape symbol and an index of a non-escape symbol, wherein the palette mode coding tool represents the current video block using a palette of representative color values and wherein the escape symbol is used for a sample of the current video block coded without using the representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool, wherein a derived palette index of the palette mode coding tool has a maximum value, and wherein the palette mode coding tool represents the current video block using a palette of representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool is represented using syntax elements comprising an escape symbol, wherein a value of an index indicating the escape symbol is unchanged for each of the one or more video regions, wherein the palette mode coding tool represents the current video block using a palette of representative color values and wherein the escape symbol is used for a sample of the current video block coded without using the representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool is represented using syntax elements that are coded based on the current index and a reference index, wherein the palette mode coding tool represents the current video block using a palette of representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool is represented using syntax elements comprising an escape symbol that is predictively coded, wherein the palette mode coding tool represents the current video block using a palette of representative color values and wherein the escape symbol is used for a sample of the current video block coded without using the representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool is represented using syntax elements that are run-length coded with a context based on a palette index for indexing palette entries, wherein the palette mode coding tool represents the current video block using a palette of representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool is represented using syntax elements comprising a current palette index that is signalled independently of previous palette indices, wherein the palette mode coding tool represents the current video block using a palette of representative color values.

In yet another example aspect, a method of video processing is disclosed. The method includes determining, based on an alignment rule, a first neighboring video block used for predicting a quantization parameter for a current video block of one or more video regions of a video and a second neighboring video block used for predictively determining a coding mode of the current video block, and performing, based on the determining, a conversion between the video and a bitstream representation of the video.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool is represented using syntax elements comprising a block-level quantization parameter (QP) difference regardless of whether the current video block comprises an escape symbol, wherein the palette mode coding tool represents the current video block using a palette of representative color values and wherein the escape symbol is used for a sample of the current video block coded without using the representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool is represented using syntax elements comprising one or more coded block flags (CBFs) for a palette block, wherein the palette mode coding tool represents the current video block using a palette of representative color values.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool is represented using syntax elements comprising one or more palette indices, wherein a number of the one or more palette indices (NumPltIdx) is greater than or equal to K, wherein the palette mode coding tool represents the current video block using a palette of representative color values, and wherein K is a positive integer.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a palette mode coding tool is represented using syntax elements based on a maximum size of a palette for the current block, a size of the current video block, a usage of a lossless mode, or a quantization parameter (QP), wherein the palette mode coding tool represents the current video block using a palette of representative color values.

In yet another example aspect, a method of video processing is disclosed. The method includes determining, for a conversion between a video comprising one or more video regions comprising a current video block and a bitstream representation of the video, that the current video block is coded with a block-based differential pulse code modulation (BDPCM) mode and split into multiple transform blocks or sub-blocks, performing, as part of performing the conversion, a residual prediction at a block level and an inclusion of one or more residuals in the bitstream representation at the sub-block or transform block level based on the determining.

In yet another example aspect, a method of video processing is disclosed. The method includes performing a conversion between a video comprising one or more video regions comprising a current video block and a bitstream representation of the video, wherein the bitstream representation conforms to a format rule that the current video block that is coded using a line-based coefficient group (CG) palette mode, wherein the line-based CG palette mode represents multiple segments of each coding unit (CU) of the current video block using a palette of representative color values.

In yet another example aspect, the above-described method may be implemented by a video encoder apparatus that comprises a processor.

In yet another example aspect, the above-described method may be implemented by a video decoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 3 shows examples of horizontal and vertical traverse scans.

FIGS. 14-33 show flowcharts of example methods of video processing.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is related to index and escape symbols coding in palette coding. It may be applied to the existing video coding standard like High Efficiency Video Coding (HEVC), or the standard (Versatile Video Coding (VVC)) to be finalized. It may be also applicable to future video coding standards or video codec.

2. Background

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting a 50% bitrate reduction compared to HEVC.

The latest version of VVC draft, i.e., Versatile Video Coding (Draft 6) could be found at:

http://phenix.it-sudparis.eu/jvet/doc_end_user/documents/15_Gothenburg/wg11/JVET-O2001-v14.zip The latest reference software of VVC, named VTM, could be found at:

https://vcgit.hhi.fraunhofer.de/jvet/VVCSoftware_VTM/tagsNTM-5.0

2.1 Palette Mode in HEVC Screen Content Coding Extensions (HEVC-SCC)

2.1.1 Concept of Palette Mode

Figure 1:
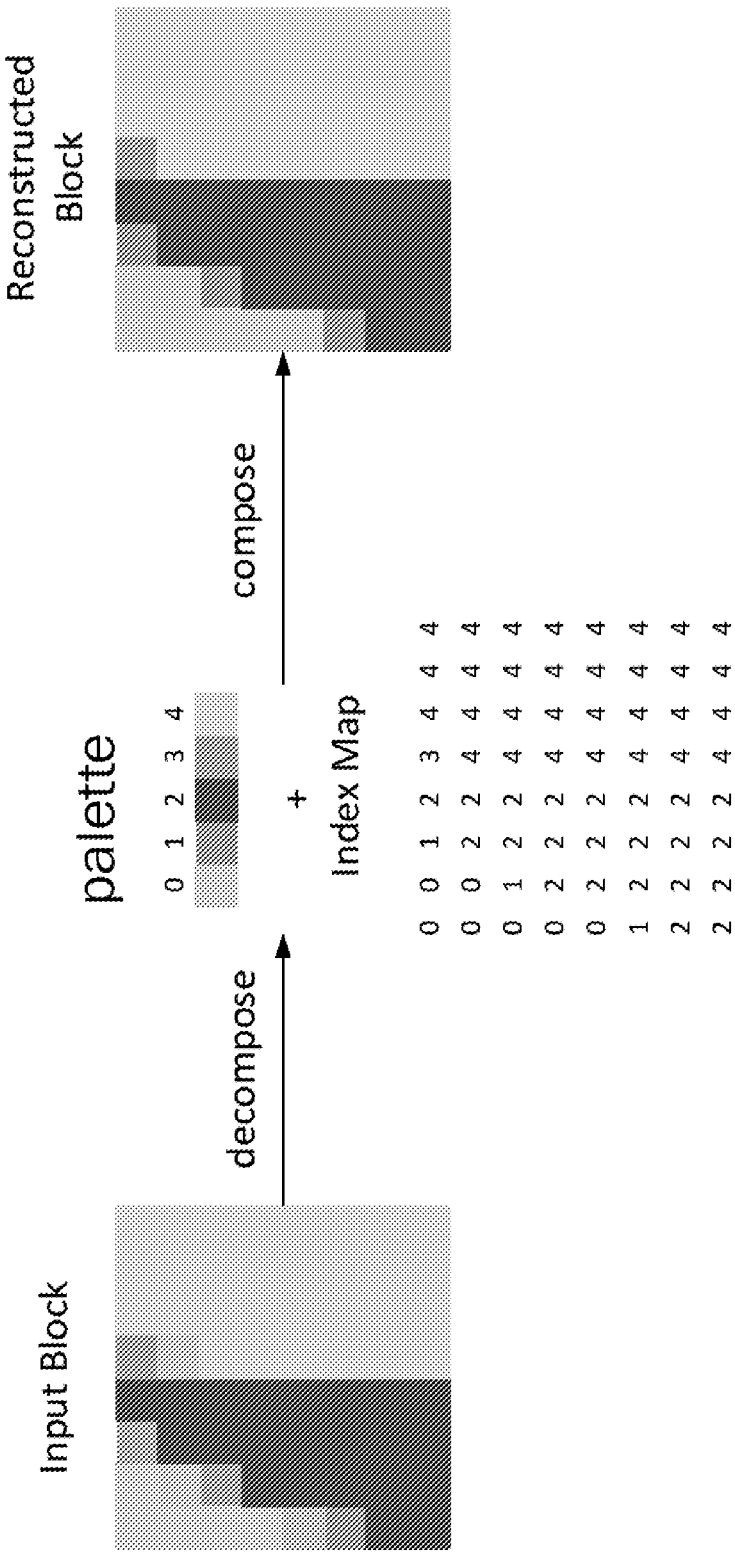
FIG. 1 shows an example of a block coded in palette mode.

The basic idea behind a palette mode is that the pixels in the CU are represented by a small set of representative color values. This set is referred to as the palette. And it is also possible to indicate a sample that is outside the palette by signalling an escape symbol followed by (possibly quantized) component values. This kind of pixel is called an escape pixel. The palette mode is illustrated in FIG. 1. As depicted in FIG. 1, for each pixel with three color components (luma, and two chroma components), an index to the palette is identified, and the block could be reconstructed based on the identified values in the palette.

2.1.2 Coding of the Palette Entries

For coding of the palette entries, a palette predictor is maintained. The maximum size of the palette as well as the palette predictor is signalled in the sequence parameter set (SPS). In HEVC-SCC, a palette_predictor_initializer_present_flag is introduced in the picture parameter set (PPS). When this flag is 1, entries for initializing the palette predictor are signalled in the bitstream. The palette predictor is initialized at the beginning of each coding tree unit (CTU) row, each slice and each tile. Depending on the value of the palette_predictor_initializer_present_flag, the palette predictor is reset to 0 or initialized using the palette predictor initializer entries signalled in the PPS. In HEVC-SCC, a palette predictor initializer of size 0 was enabled to allow explicit disabling of the palette predictor initialization at the PPS level.

Figure 2:
FIG. 2 shows an example of use of palette predictor to signal palette entries.

For each entry in the palette predictor, a reuse flag is signalled to indicate whether it is part of the current palette. This is illustrated in FIG. 2. The reuse flags are sent using run-length coding of zeros. After this, the number of new palette entries are signalled using Exponential Golomb (EG) code of order 0, i.e., EG-0. Finally, the component values for the new palette entries are signalled.

2.1.3 Coding of Palette Indices

The palette indices are coded using horizontal and vertical traverse scans as shown in FIG. 3. The scan order is explicitly signalled in the bitstream using the palette_transpose_flag. For the rest of the subsection it is assumed that the scan is horizontal.

The palette indices are coded using two palette sample modes: 'COPY_LEFT' and 'COPY_ABOVE'. In the 'COPY_LEFT' mode, the palette index is assigned to a decoded index. In the 'COPY_ABOVE' mode, the palette index of the sample in the row above is copied. For both "COPY_LEFT" and 'COPY_ABOVE' modes, a run value is signalled which specifies the number of subsequent samples that are also coded using the same mode.

Figure 4:
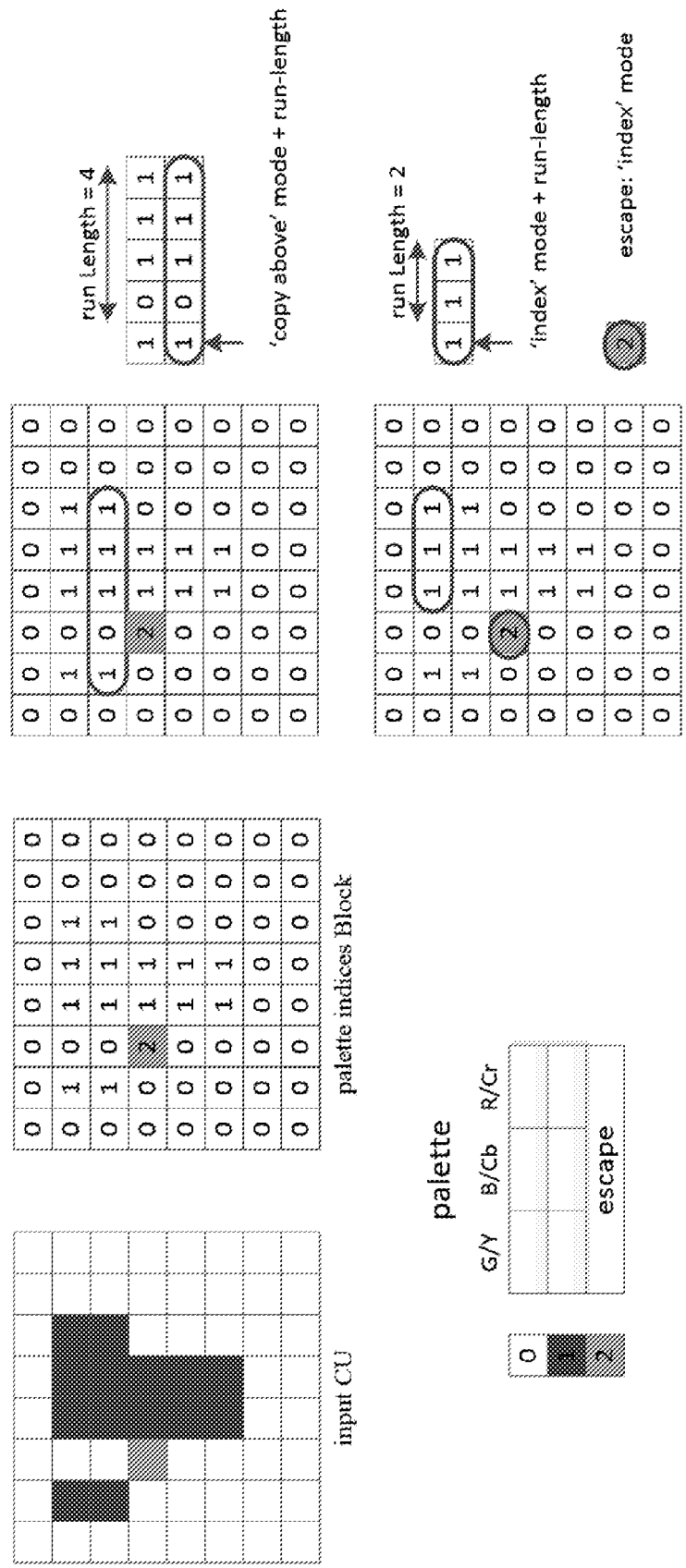
FIG. 4 shows an example coding of palette indices.

In the palette mode, the value of an index for the escape symbol is the number of palette entries. And, when escape symbol is part of the run in 'COPY_LEFT' or 'COPY_ABOVE' mode, the escape component values are signalled for each escape symbol. The coding of palette indices is illustrated in FIG. 4.

This syntax order is accomplished as follows. First the number of index values for the CU is signalled. This is followed by signalling of the actual index values for the entire CU using truncated binary coding. Both the number of indices as well as the index values are coded in bypass mode. This groups the index-related bypass bins together. Then the palette sample mode (if necessary) and run are signalled in an interleaved manner Finally, the component escape values corresponding to the escape symbols for the entire CU are grouped together and coded in bypass mode. The binarization of escape symbols is EG coding with $3^{rd}$ order, i.e., EG-3.

An additional syntax element, last_run_type_flag, is signalled after signalling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signalling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signalling is for the escape component values. For each escape symbol, the number of escape component values signalled may be different depending on the number of components associated with that symbol.

In addition, there is an index adjustment process in the palette index coding. When signalling a palette index, the left neighboring index or the above neighboring index should be different from the current index. Therefore, the range of the current palette index could be reduced by 1 by removing one possibility. After that, the index is signalled with truncated binary (TB) binarization.

The texts related to this part is shown as follows, where the CurrPaletteIndex is the current palette index and the adjustedRefPaletteIndex is the prediction index.

The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC][yC] shall be in the range of 0 to MaxPaletteIndex, inclusive. The variable adjustedRefPaletteIndex is derived as follows:

```
adjustedRefPaletteIndex = MaxPaletteIndex + 1
if( PaletteScanPos > 0 ) {
   xcPrev = x0 + TraverseScanOrder[ log2CbWidth ][ log2bHeight ][ PaletteScanPos − 1 ][ 0 ]
   ycPrev = y0 + TraverseScanOrder[ log2CbWidth ][ log2bHeight ][ PaletteScanPos − 1 ][ 1 ]
   if( CopyAboveIndicesFlag[ xcPrev ][ ycPrev ] = = 0 ) {
      adjustedRefPaletteIndex = PaletteIndexMap[ xcPrev ][ ycPrev ] {              (7-157)
   }
   else {
     if( !palette_transpose_flag )
        adjustedRefPaletteIndex = PaletteIndexMap[ xC ][ yC − 1 ]
     else
        adjustedRefPaletteIndex = PaletteIndexMap[ xC − 1 ][ yC ]
   }
}
```

When CopyAboveIndicesFlag[xC][yC] is equal to 0, the variable CurrPaletteIndex is derived as follows:
  if(CurrPaletteIndex>=adjustedRefPaletteIndex)
    CurrPaletteIndex++

In addition, the run length elements in the palette mode are context coded. The related context derivation process described in JVET-O2011-vE is shown as follows.

*Derivation process of ctxInc for the syntax element palette_run_prefix*

Inputs to this process are the bin index binIdx and the syntax elements copy_above_palette_indices_flag and palette_idx_idc.

Output of this process is the variable ctxInc.

The variable ctxInc is derived as follows:
  If copy_above_palette_indices_flag is equal to 0 and binIdx is equal to 0, ctxInc is derived as follows:

$$\text{ctxInc}=(\text{palette\_idx\_idc}<1)?0:((\text{palette\_idx\_idc}<3)?1:2) \quad (9\text{-}69)$$

Otherwise, ctxInc is provided by Table 1:

TABLE 1

Specification of ctxIdxMap[ copy_above_palette_indices_flag ][ binIdx ]

| binIdx | 0 | 1 | 2 | 3 | 4 | >4 |
|---|---|---|---|---|---|---|
| copy_above_palette_indices_flag == 1 | 5 | 6 | 6 | 7 | 7 | bypass |
| copy_above_palette_indices_flag == 0 | 0, 1, 2 | 3 | 3 | 4 | 4 | bypass |

2.2 Palette Mode in VVC 2.2.1 Palette in Dual Tree

In VVC, the dual tree coding structure is used on coding the intra slices, so the luma component and two chroma components may have different palette and palette indices. In addition, the two chroma component shares same palette and palette indices.

2.2.2 Palette as a Separate Mode

In JVET-N0258 and current VTM, the prediction modes for a coding unit can be MODE_INTRA, MODE_INTER, MODE_IBC and MODE_PLT. The binarization of prediction modes is changed accordingly.

When IBC is turned off, on I tiles, the first one bin is employed to indicate whether the current prediction mode is MODE_PLT or not. While on P/B tiles, the first bin is employed to indicate whether the current prediction mode is MODE_INTRA or not. If not, one additional bin is employed to indicate the current prediction mode is MODE_PLT or MODE_INTER.

When IBC is turned on, on I tiles, the first bin is employed to indicate whether the current prediction mode is MODE_IBC or not. If not, the second bin is employed to indicate whether the current prediction mode is MODE_PLT or MODE_INTRA. While on P/B tiles, the first bin is employed to indicate whether the current prediction mode is MODE_INTRA or not. If it is an intra mode, the second bin is employed to indicate the current prediction mode is MODE_PLT or MODE_INTRA. If not, the second bin is employed to indicate the current prediction mode is MODE_IBC or MODE_INTER.

The related texts in JVET-O2001-vE are shown as follows.

Coding Unit Syntax

| | Descriptor |
|---|---|
| coding_unit( x0, y0, cbWidth, cbHeight, cqtDepth, treeType, modeType ) { | |
|   chType = treeType == DUAL_TREE_CHROMA ? 1 : 0 | |
|   if( slice_type != I \|\| sps_ibc_enabled_flag \|\| sps_palette_enabled_flag) { | |
|     if( treeType != DUAL_TREE_CHROMA && | |
|     !( ( ( cbWidth == 4 && cbHeight == 4 ) \|\| modeType == MODE_TYPE_INTRA ) | |
|     && !sps_ibc_enabled_flag ) ) | |
|     cu_skip_flag[ x0 ][ y0 ] | ae(v) |
|     if( cu_skip_flag[ x0 ][ y0 ] == 0 && slice_type != I | |
|     && !( cbWidth == 4 && cbHeight == 4 ) && modeType == MODE_TYPE_ALL ) | |
|     pred_mode_flag | ae(v) |
|     if( ( ( slice_type = I && cu_skip_flag[ x0 ][ y0 ] ==0) \|\| | |
|       ( slice_type != I && ( CuPredMode[ chType ][ x0 ][ y0 ] != MODE_INTRA \|\| | |
|         ( cbWidth == 4 && cbHeight == 4 && cu_skip_flag[ x0 ][ y0 ] == 0) ) ) ) && | |
|       cbWidth <= 64 && cbHeight <= 64 && modeType != MODE_TYPE_INTER && | |
|       sps_ibc_enabled_flag && treeType != DUAL_TREE_CHROMA ) | |
|     pred_mode_ibc_flag | ae(v) |
|     if( ( ( ( slice_type == I \|\| ( cbWidth == 4 && cbHeight == 4 ) \|\| sps_ibc_enabled_flag ) && | |
|       CuPredMode[ x0 ][ y0 ] == MODE_INTRA ) \|\| | |
|       ( slice_type != I && !( cbWidth == 4 && cbHeight == 4) && !sps_ibc_enabled_flag | |
|       && CuPredMode[ x0 ][ y0 ] != MODE_INTRA ) ) && sps_palette_enabled_flag && | |
|       cbWidth <= 64 && cbHeight <= 64 && cu_skip_flag[ x0 ][ y0 ] == 0 && | |
|       modeType != MODE_TYPE_INTER ) | |
|     pred_mode_plt_flag | ae(v) |
|   } | |
|   ... | |
| } | |

2.2.3 Palette Mode Syntax

|  | Descriptor |
|---|---|
| palette_coding( x0, y0, cbWidth, cbHeight, startComp, numComps ) { | |
|   palettePredictionFinished = 0 | |
|   NumPredictedPaletteEntries = 0 | |
|   for( predictorEntryIdx = 0; predictorEntryIdx < PredictorPaletteSize[ startComp ] && | |
|       !palettePredictionFinished          && | |
|     NumPredictedPaletteEntries[ startComp ] < palette_max_size; predictorEntryIdx++ ) { | |
|     palette_predictor_run | ae(v) |
|     if( palette_predictor_run != 1 ) { | |
|       if( palette_predictor_run > 1) | |
|         predictorEntryIdx += palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < palette_max_size ) | |
|     num_signalled_palette_entries | ae(v) |
|   for( cIdx = startComp; cIdx < ( startComp + numComps); cIdx++ ) | |
|     for( i = 0; i < num_signalled_palette_entries; i++ ) | |
|       new_palette_entries[ cIdx ][ i ] | ae(v) |
|   if( CurrentPaletteSize[ startComp ] > 0) | |
|     palette_escape_val_present_flag | ae(v) |
|   if( MaxPaletteIndex > 0 ) { | |
|     num_palette_indices_minus1 | ae(v) |
|     adjust = 0 | |
|     for( i = 0; i <= num_palette_indices_minus1; i++ ) { | |
|       if( MaxPaletteIndex − adjust > 0 ) { | |
|         palette_idx_idc | ae(v) |
|         PaletteIndexIdc[ i ] = palette_idx_idc | |
|       } | |
|       adjust = 1 | |
|     } | |
|     copy_above_indices_for_final_run_flag | ae(v) |
|     palette_transpose_flag | ae(v) |
|   } | |
|   if( treeType != DUAL_TREE_CHROMA && palette_escape_val_present_flag ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   } | |
|   if( treeType != DUAL_TREE_LUMA && palette_escape_val_present_flag ) { | |
|     if( cu_chroma_qp_offset_enabled_flag && !IsCuChromaQpOffsetCoded ) { | |
|       cu_chroma_qp_offset_flag | ae(v) |
|       if( cu_chroma_qp_offset_flag ) | |
|         cu_chroma_qp_offset_idx | ae(v) |
|     } | |
|   } | |
|   remainingNumIndices = num_palette_indices_minus1 + 1 | |
|   PaletteScanPos = 0 | |
|   log2CbWidth = Log2( cbWidth ) | |
|   log2CbHeight = Log2( cbHeight ) | |
|   while( PaletteScanPos < cbWidth*cbHeightt ) { | |
|     xC = x0 + TraverseScanOrder[ log2CbWidth ][ log2CbHeight ][ PaletteScanPos ][ 0 ] | |
|     yC = y0 + TraverseScanOrder[ log2CbWidth ][ log2CbHeight ][ PaletteScanPos ][ 1 ] | |
|     if( PaletteScanPos > 0 ) { | |
|       xcPrev = x0 + TraverseScanOrder[ log2CbWidth ][ log2CbHeight ][ PaletteScanPos − 1 ][ 0 ] | |
|       ycPrev = y0 + TraverseScanOrder[ log2CbWidth ][ log2CbHeight ][ PaletteScanPos − 1 ][ 1 ] | |
|     } | |
|     PaletteRunMinus1 = cbWidth * cbHeight − PaletteScanPos − 1 | |
|     RunToEnd = 1 | |
|     CopyAboveIndicesFlag[ xC ][ yC ] = 0 | |
|     if( MaxPaletteIndex > 0 ) | |
|       if( ( ( !palette_transpose_flag && yC > 0) || ( palette_transpose_flag && xC > 0 ) ) | |
|         && CopyAboveIndicesFlag[ xcPrev ][ ycPrev ] = = 0 ) | |
|         if( remainingNumIndices > 0 && PaletteScanPos < cbWidth* cbHeight − 1 ) { | |
|           copy_above_palette_indices_flag | ae(v) |
|           CopyAboveIndicesFlag[ xC ][ yC ] = copy_above_palette_indices_flag | |
|         } else { | |
|           if( PaletteScanPos = = cbWidth * cbHeight − 1 && remainingNumIndices > 0 ) | |
|             CopyAboveIndicesFlag[ xC ][ yC ] = 0 | |
|           else | |
|             CopyAboveIndicesFlag[ xC ][ yC ] = 1 | |
|         } | |

|  | Descriptor |
|---|---|
| ```
    if ( CopyAboveIndicesFlag[ xC ][ yC ] = = 0 ) {
        currNumIndices = num_palette_indices_minus1 + 1 − remainingNumIndices
        PaletteIndexMap[ xC ][ yC ] = PaletteIndexIdc[ currNumIndices ]
    }
    if( MaxPaletteIndex > 0 ) {
        if( CopyAboveIndicesFlag[ xC ][ yC ] = = 0 )
            remainingNumIndices − = 1
        if( remainingNumIndices > 0    ||    CopyAboveIndicesFlag[ xC ][ yC ]    !=
                copy_above_indices_for_final_run_flag ) {
            PaletteMaxRunMinus1    =    cbWidth * cbHeight − PaletteScanPos − 1 −
                remainingNumIndices − copy_above_indices_for_final_run_flag
            RunToEnd = 0
            if( PaletteMaxRunMinus1 > 0 ) {
                palette_run_prefix
                if( ( palette_run_prefix > 1 )    &&    ( Palette MaxRunMinus1    !=
                        ( 1 << ( palette_run_prefix − 1 ) ) ) )
                    palette_run_suffix
            }
        }
    }
    runPos = 0
    while ( runPos <= PaletteRunMinus1 ) {
        xR = x0 + TraverseScanOrder[ log2CbWidth ][ log2CbHeight ][ PaletteScanPos ][ 0 ]
        yR = y0 + TraverseScanOrder[ log2CbWidth ][ log2CbHeight ][ PaletteScanPos ][ 1 ]
        if( CopyAboveIndicesFlag[ xC ][ yC ] = = 0 ) {
            CopyAboveIndicesFlag[ xR ][ yR ] = 0
            PaletteIndexMap[ xR ][ yR ] = PaletteIndexMap[ xC ][ yC ]
        } else {
            CopyAboveIndicesFlag[ xR ][ yR ] = 1
            if ( !palette_transpose_flag )
                PaletteIndexMap[ xR ][ yR ] = PaletteIndexMap[ xR ][ yR − 1 ]
            else
                PaletteIndexMap[ xR ][ yR ] = PaletteIndexMap[ xR − 1 ][ yR ]
        }
        runPos++
        PaletteScanPos ++
    }
}
if( palette_escape_val_present_flag ) {
    for( cIdx = startComp; cIdx < ( startComp + numComps ); cIdx++ )
        for( sPos = 0; sPos < cbWidth* cbHeight; sPos++ ) {
            xC = x0 + TraverseScanOrder[ log2CbWidth ][ log2CbHeight ][ sPos ][ 0 ]
            yC = y0 + TraverseScanOrder[ log2CbWidth ][ log2CbHeight ][ sPos ][ 1 ]
            if( PaletteIndexMap[ cIdx ][ xC ][ yC ] = = MaxPaletteIndex ) {
                palette_escape_val
                PaletteEscapeVal[ cIdx ][ xC ][ yC ] = palette_escape_val
            }
        }
}
}
``` | ae(v)<br><br><br><br><br><br>ae(v)<br><br><br><br><br><br><br><br><br><br><br><br><br><br><br><br><br><br><br><br><br>ae(v) |

2.2.4 Palette Mode Semantics

In the following semantics, the array indices x0, y0 specify the location (x0, y0) of the top-left luma sample of the considered coding block relative to the top-left luma sample of the picture. The array indices xC, yC specify the location (xC, yC) of the sample relative to the top-left luma sample of the picture. The array index startComp specifies the first color component of the current palette table. startComp equal to 0 indicates the Y component; startComp equal to 1 indicates the Cb component; startComp equal to 2 indicates the Cr component. numComps specifies the number of color components in the current palette table.

The predictor palette consists of palette entries from previous coding units that are used to predict the entries in the current palette.

The variable PredictorPaletteSize[startComp] specifies the size of the predictor palette for the first color component of the current palette table startComp. PredictorPaletteSize is derived as specified in clause 8.4.5.3.

The variable PalettePredictorEntryReuseFlags[i] equal to 1 specifies that the i-th entry in the predictor palette is reused in the current palette. PalettePredictorEntryReuseFlags[i] equal to 0 specifies that the i-th entry in the predictor palette is not an entry in the current palette. All elements of the array PalettePredictorEntryReuseFlags[i] are initialized to 0.

palette_predictor_run is used to determine the number of zeros that precede a non-zero entry in the array PalettePredictorEntryReuseFlags.

It is a requirement of bitstream conformance that the value of palette_predictor_run shall be in the range of 0 to (PredictorPaletteSize−predictorEntryIdx), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries shall be in the range of 0 to palette_max_size, inclusive.

num_signalled_palette_entries specifies the number of entries in the current palette that are explicitly signalled for the first color component of the current palette table startComp.

When num_signalled_palette_entries is not present, it is inferred to be equal to 0.

The variable CurrentPaletteSiz[startComp] specifies the size of the current palette for the first color component of the current palette table startComp and is derived as follows:

CurrentPaletteSize[startComp]=NumPredictedPaletteEntries+num_signalled_palette_entries    (7-155)

The value of CurrentPaletteSiz[startComp] shall be in the range of 0 to palette_max_size, inclusive.

new_palette_entries[cIdx] specifies the value for the i-th signalled palette entry for the color component cIdx.

The variable PredictorPaletteEntries[cIdx][i] specifies the i-th element in the predictor palette for the color component cIdx.

The variable CurrentPaletteEntries[cIdx][i] specifies the i-th element in the current palette for the color component cIdx and is derived as follows:

```
numPredictedPaletteEntries = 0
for( i = 0; i < PredictorPaletteSize[ startComp ]; i++ )
  if( PalettePredictorEntryReuseFlags[ i ] ) {
    for( cIdx =startComp; cIdx < ( startComp + numComps ); cIdx++ )
      CurrentPaletteEntries[ cIdx ][ numPredictedPaletteEntries ] =
  PredictorPaletteEntries[ cIdx ][ i ]
      numPredictedPaletteEntries++
  }
for( cIdx = startComp; cIdx < (startComp + numComps); cIdx++)    (7-156)
  for( i = 0; i < num_signalled_palette_entries[startComp]; i++ )
    CurrentPaletteEntries[ cIdx ][ numPredictedPaletteEntries + i ] =
new_palette_entries[ cIdx ][ i ]
``` palette_escape_val_present_flag equal to 1 specifies that the current coding unit contains at least one escape coded sample. escape_val_present_flag equal to 0 specifies that there are no escape coded samples in the current coding unit. When not present, the value of palette_escape_val_present_flag is inferred to be equal to 1.

The variable MaxPaletteIndex specifies the maximum possible value for a palette index for the current coding unit. The value of MaxPaletteIndex is set equal to CurrentPaletteSize[startComp]−1+palette_escape_val_present_flag.

num_palette_indices_minus1 plus 1 is the number of palette indices explicitly signalled or inferred for the current block.

When num_palette_indices_minus1 is not present, it is inferred to be equal to 0.

palette_idx_idc is an indication of an index to the palette table, CurrentPaletteEntries. The value of palette_idx_idc shall be in the range of 0 to MaxPaletteIndex, inclusive, for the first index in the block and in the range of 0 to (MaxPaletteIndex−1), inclusive, for the remaining indices in the block.

When palette_idx_idc is not present, it is inferred to be equal to 0.

The variable PaletteIndexIdc[i] stores the i-th palette_idx_idc explicitly signalled or inferred. All elements of the array PaletteIndexIdc[i] are initialized to 0.

copy_above_indices_for_final_run_flag equal to 1 specifies that the palette indices of the last positions in the coding unit are copied from the palette indices in the row above if horizontal traverse scan is used or the palette indices in the left column if vertical traverse scan is used. copy_above_indices_for_final_run_flag equal to 0 specifies that the palette indices of the last positions in the coding unit are copied from PaletteIndexIdc[num_palette_indices_minus1].

When copy_above_indices_for_final_run_flag is not present, it is inferred to be equal to 0.

palette_transpose_flag equal to 1 specifies that vertical traverse scan is applied for scanning the indices for samples in the current coding unit. palette_transpose_flag equal to 0 specifies that horizontal traverse scan is applied for scanning the indices for samples in the current coding unit. When not present, the value of palette_transpose_flag is inferred to be equal to 0.

The array TraverseScanOrder specifies the scan order array for palette coding. TraverseScanOrder is assigned the horizontal scan order HorTravScanOrder if palette_transpose_flag is equal to 0 and TraverseScanOrder is assigned the vertical scan order VerTravScanOrder if palette_transpose_flag is equal to 1.

copy_above_palette_indices_flag equal to 1 specifies that the palette index is equal to the palette index at the same location in the row above if horizontal traverse scan is used or the same location in the left column if vertical traverse scan is used. copy_above_palette_indices_flag equal to 0 specifies that an indication of the palette index of the sample is coded in the bitstream or inferred.

The variable CopyAboveIndicesFlag[xC][yC] equal to 1 specifies that the palette index is copied from the palette index in the row above (horizontal scan) or left column (vertical scan). CopyAboveIndicesFlag[xC][yC] equal to 0 specifies that the palette index is explicitly coded in the bitstream or inferred. The array indices xC, yC specify the location (xC, yC) of the sample relative to the top-left luma sample of the picture. The value of PaletteIndexMap[xC][yC] shall be in the range of 0 to (MaxPaletteIndex−1), inclusive.

The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC][yC] shall be in the range of 0 to MaxPaletteIndex, inclusive.

The variable adjustedRefPaletteIndex is derived as follows:

```
adjustedRefPaletteIndex = MaxPaletteIndex + 1
if( PaletteScanPos > 0 ) {
  xcPrev = x0 + TraverseScanOrder[ log2CbWidth ][ log2bHeight ][ PaletteScanPos − 1 ][ 0 ]
  ycPrev = y0 + TraverseScanOrder[ log2CbWidth ][ log2bHeight ][ PaletteScanPos − 1 ][ 1 ]
  if( CopyAboveIndicesFlag[ xcPrev ][ ycPrev ] = = 0 ) {
    adjustedRefPaletteIndex = PaletteIndexMap[ xcPrev ][ ycPrev ] {    (7-157)
  }
  else {
    if( !palette_transpose_flag )
      adjustedRefPaletteIndex = PaletteIndexMap[ xC ][ yC − 1 ]
    else
      adjustedRefPaletteIndex = PaletteIndexMap[ xC − 1 ][ yC ]
  }
}
```

When CopyAboveIndicesFlag[xC][yC] is equal to 0, the variable CurrPaletteIndex is derived as follows:

if(CurrPaletteIndex>=adjustedRefPaletteIndex) CurrPaletteIndex++     (7-158)

palette_run_prefix, when present, specifies the prefix part in the binarization of PaletteRunMinus1.

palette_run_suffix is used in the derivation of the variable PaletteRunMinus1. When not present, the value of palette_run_suffix is inferred to be equal to 0.

When RunToEnd is equal to 0, the variable PaletteRunMinus1 is derived as follows:
If PaletteMaxRunMinus1 is equal to 0, PaletteRunMinus1 is set equal to 0.
Otherwise (PaletteMaxRunMinus1 is greater than 0) the following applies:
If palette_run_prefix is less than 2, the following applies:

PaletteRunMinus1=palette_run_prefix     (7-159)

Otherwise (palette_run_prefix is greater than or equal to 2), the following applies:

PrefixOffset=1<<(palette_run_prefix−1)

PaletteRunMinus1=PrefixOffset+palette_run_suffix     (7-160)

The variable PaletteRunMinus1 is used as follows:
If CopyAboveIndicesFlag[xC][yC] is equal to 0, PaletteRunMinus1 specifies the number of consecutive locations minus 1 with the same palette index.
Otherwise if palette_transpose_flag equal to 0, PaletteRunMinus1 specifies the number of consecutive locations minus 1 with the same palette index as used in the corresponding position in the row above.
Otherwise, PaletteRunMinus1 specifies the number of consecutive locations minus 1 with the same palette index as used in the corresponding position in the left column.

When RunToEnd is equal to 0, the variable PaletteMaxRunMinus1 represents the maximum possible value for PaletteRunMinus1 and it is a requirement of bitstream conformance that the value of PaletteMaxRunMinus1 shall be greater than or equal to 0.

palette_escape_val specifies the quantized escape coded sample value for a component.

The variable PaletteEscapeVal[cIdx][xC][yC] specifies the escape value of a sample for which PaletteIndexMap[xC][yC] is equal to MaxPaletteIndex and palette_escape_val_present_flag is equal to 1. The array index cIdx specifies the color component. The array indices xC, yC specify the location (xC, yC) of the sample relative to the top-left luma sample of the picture.

It is a requirement of bitstream conformance that PaletteEscapeVal[cIdx][xC][yC] shall be in the range of 0 to $(1<<(BitDepth_Y+1))-1$, inclusive, for cIdx equal to 0, and in the range of 0 to $(1<<<(BitDepth_C+1))-1$, inclusive, for cIdx not equal to 0.

1.1.1 Line-Based CG Palette Mode

Line-based CG palette mode was adopted to VVC. In this method, each CU of palette mode is divided into multiple segments of m samples (m=16 in this test) based on the traverse scan mode. The encoding order for palette run coding in each segment is as follows: For each pixel, 1 context coded bin run_copy_flag=0 is signalled indicating if the pixel is of the same mode as the previous pixel, i.e., if the previous scanned pixel and the current pixel are both of run type COPY_ABOVE or if the previous scanned pixel and the current pixel are both of run type INDEX and the same index value. Otherwise, run_copy_flag=1 is signalled. If the pixel and the previous pixel are of different modes, one context coded bin copy_above_palette_indices_flag is signalled indicating the run type, i.e., INDEX or COPY_ABOVE, of the pixel. Same as the palette mode in VTM6.0, decoder does not have to parse run type if the sample is in the first row (horizontal traverse scan) or in the first column (vertical traverse scan) since the INDEX mode is used by default. Also, decoder does not have to parse run type if the previously parsed run type is COPY_ABOVE. After palette run coding of pixels in one segment, the index values (for INDEX mode) and quantized escape colors are bypass coded and grouped apart from encoding/parsing of context coded bins to improve throughput within each line CG. Since the index value is now coded/parsed after run coding, instead of processed before palette run coding as in VTM, encoder does not have to signal the number of index values num_palette_indices_minus1 and the last run type copy_above_indices_for_final_run_flag. The text of line-based CG palette mode in JVET-P0077 is shown as follows.

Palette Coding Syntax

| | Descriptor |
|---|---|
| palette_coding( x0, y0, cbWidth, cbHeight, startComp, numComps ) { | |
|   palettePredictionFinished = 0 | |
|   NumPredictedPaletteEntries = 0 | |
|   for( predictorEntryIdx = 0; predictorEntryIdx < PredictorPaletteSize[ startComp ] && | |
|     !palettePredictionFinished && | |
|     NumPredictedPaletteEntries[ startComp ] < palette_max_size; predictorEntryIdx++ ) { | |
|     palette_predictor_run | ae(v) |
|     if( palette_predictor_run != 1 ) { | |
|       if( palette_predictor_run > 1) | |
|         predictorEntryIdx += palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < palette_max_size ) | |
|     num_signalled_palette_entries | ae(v) |
|   for( cIdx = startComp; cIdx < ( startComp + numComps); cIdx++ ) | |
|     for( i = 0; i < num_signalled_palette_entries; i++ ) | |
|       new_palette_entries[ cIdx ][ i ] | ae(v) |
|   if( CurrentPaletteSize[ startComp ] > 0) | |
|     palette_escape_val_present_flag | ae(v) |
|   if( MaxPaletteIndex > 0 ) { | |

|  | Descriptor |
|---|---|
| ``` |  |
|             adjust = 0 |  |
|             palette_transpose_flag | ae(v) |
|         } |  |
|         if( treeType != DUAL_TREE_CHROMA && palette_escape_val_present_flag ) { |  |
|             if( cu_qp_delta_enabled_flag && !IsCuQpDeltaCoded ) { |  |
|                 cu_qp_delta_abs | ae(v) |
|                 if( cu_qp_delta_abs ) |  |
|                     cu_qp_delta_sign_flag | ae(v) |
|             } |  |
|         } |  |
|         if( treeType != DUAL_TREE_LUMA && palette_escape_val_present_flag ) { |  |
|             if( cu_chroma_qp_offset_enabled_flag && !IsCuChromaQpOffsetCoded ) { |  |
|                 cu_chroma_qp_offset_flag | ae(v) |
|                 if( cu_chroma_qp_offset_flag ) |  |
|                     cu_chroma_qp_offset_idx | ae(v) |
|             } |  |
|         } |  |
|     PreviousRunTypePosition = 0 |  |
|     PreviousRunType = 0 |  |
|     for (subSetId = 0; subSetId <= (cbWidth* cbHeight − 1) >> 4; subSetId++) { |  |
|         minSubPos = subSetId << 4 |  |
|         if( minSubPos + 16 > cbWidth * cbHeight) |  |
|         maxSubPos = cbWidth * cbHeight |  |
|         else |  |
|         maxSubPos = minSubPos + 16 |  |
|         RunCopyMap[ 0 ][ 0 ] = 0 |  |
|         log2CbWidth = Log2( cbWidth) |  |
|         log2CbHeight = Log2( cbHeight) |  |
|     PaletteScanPos = minSubPos |  |
|         while( PaletteScanPos < maxSubPos ) { |  |
|             xC = x0 + TraverseScanOrder[ log2CbWidth ][ log2CbHeight ][ PaletteScanPos ][ 0 ] |  |
|             yC = y0 + TraverseScanOrder[ log2CbWidth ][ log2CbHeight ][ PaletteScanPos ][ 1 ] |  |
|             if( PaletteScanPos > 0 ) { |  |
|                 xcPrev = |  |
| x0 + TraverseScanOrder[ log2CbWidth ][ log2CbHeight ][ PaletteScanPos − 1 ][ 0 ] |  |
|                 ycPrev = |  |
| y0 + TraverseScanOrder[ log2CbWidth ][ log2CbHeight ][ PaletteScanPos − 1 ][ 1 ] |  |
|             } |  |
|             if ( MaxPaletteIndex > 0 && PaletteScanPos > 0) { |  |
|                 run_copy_flag | ae(v) |
|                 RunCopyMap[ xC ][ yC ] = run_copy_flag |  |
|             } |  |
|                 CopyAboveIndicesFlag[ xC ][ yC ] = 0 |  |
|                 if( MaxPaletteIndex > 0 && ! RunCopyMap[startComp][xC][yC] ) { |  |
|                     if( ( ( !palette_transpose_flag && yC > 0) || ( palette_transpose_flag && xC > 0 ) ) |  |
|                         && CopyAboveIndicesFlag[ xcPrev ][ ycPrev ] = = 0 ) { |  |
|                         copy_above_palette_indices_flag | ae(v) |
|                         CopyAboveIndicesFlag[ xC ][ yC ] = copy_above_palette_indices_flag |  |
|                     } |  |
|                     PreviousRunType = CopyAboveIndicesFlag[ xC ][ yC ] |  |
|                     PreviousRunTypePosition = curPos |  |
|                 } else { |  |
|                     CopyAboveIndicesFlag[ xC ][ yC ] = CopyAboveIndicesFlag[xcPrev][ ycPrev] |  |
|                 } |  |
|             } |  |
|             PaletteScanPos ++ |  |
|         } |  |
|         PaletteScanPos = minSubPos |  |
|             while( PaletteScanPos < maxSubPos ) { |  |
|                 xC = |  |
| x0 + TraverseScanOrder[ log2CbWidth ][ log2CbHeight ][ PaletteScanPos ][ 0 ] |  |
|                 yC = |  |
| y0 + TraverseScanOrder[ log2CbWidth ][ log2CbHeight ][ PaletteScanPos ][ 1 ] |  |
|                 if( PaletteScanPos > 0 ) { |  |
|                     xcPrev = |  |
| x0 + TraverseScanOrder[ log2CbWidth ][ log2CbHeight ][ PaletteScanPos − 1 ][ 0 ] |  |
|                     ycPrev = |  |
| y0 + TraverseScanOrder[ log2CbWidth ][ log2CbHeight ][ PaletteScanPos − 1 ][ 1 ] |  |
|                 } |  |
|                 if ( MaxPaletteIndex > 0 ) { |  |
|                     if ( ! RunCopyMap [ x C][ yC ] && CopyAboveIndicesFlag[ xC ][ yC ] = = 0 ) { |  |
|                         if( MaxPaletteIndex − adjust > 0 ) { |  |
|                             palette_idx_idc | ae(v) |
|                         } |  |
|                         adjust = 1 |  |
|                     } |  |

-continued

| | Descriptor |
|---|---|
| ```
      }
      if ( ! RunCopyMap [ xC ][ yC ] && CopyAboveIndicesFlag[ xC ][ yC ] = = 0 ) {
        CurrPaletteIndex = palette_idx_idc
        if( CopyAboveIndicesFlag[ xC ][ yC ] = = 0 ) {
          PaletteIndexMap[ xC ][ yC ] = CurrPaletteIndex
        } else {
          if ( !palette_transpose_flag )
            PaletteIndexMap[ xC ][ yC ] = PaletteIndexMap[ xC ][ yC − 1 ]
          else
            PaletteIndexMap[ xC ][ yC ] = PaletteIndexMap[ xC − 1 ][ yC ]
        }
      }
    }
    if( palette_escape_val_present_flag ) {
      for( cIdx = startComp; cIdx < ( startComp + numComps ); cIdx++ )
        for( sPos = minSubPos ; sPos < maxSubPos; sPos++ ) {
          xC = x0 + TraverseScanOrder[ log2CbWidth][ log2CbHeight ][ sPos ][ 0 ]
          yC = y0 + TraverseScanOrder[ log2CbWidth][ log2CbHeight ][ sPos ][ 1 ]
          if( PaletteIndexMap[ cIdx ][ xC ][ yC ] = = MaxPaletteIndex ) {
            palette_escape_val
            PaletteEscapeVal[ cIdx ][ xC ][ yC ] = palette_escape_val
          }
        }
    }
  }
}
``` | ae(v) |

7.4.9.6. Palette Coding Semantics In the following semantics, the array indices x0, y0 specify the location (x0, y0) of the top-left luma sample of the considered coding block relative to the top-left luma sample of the picture. The array indices xC, yC specify the location (xC, yC) of the sample relative to the top-left luma sample of the picture. The array index startComp specifies the first color component of the current palette table. startComp equal to 0 indicates the Y component; startComp equal to 1 indicates the Cb component; startComp equal to 2 indicates the Cr component. numComps specifies the number of color components in the current palette table.

The predictor palette consists of palette entries from previous coding units that are used to predict the entries in the current palette.

The variable PredictorPaletteSize[startComp] specifies the size of the predictor palette for the first color component of the current palette table startComp. PredictorPaletteSize is derived as specified in clause 8.4.5.3.

The variable PalettePredictorEntryReuseFlags[i] equal to 1 specifies that the i-th entry in the predictor palette is reused in the current palette. PalettePredictorEntryReuseFlags[i] equal to 0 specifies that the i-th entry in the predictor palette is not an entry in the current palette. All elements of the array PalettePredictorEntryReuseFlags[i] are initialized to 0.

palette_predictor_run is used to determine the number of zeros that precede a non-zero entry in the array PalettePredictorEntryReuseFlags.

It is a requirement of bitstream conformance that the value of palette_predictor_run shall be in the range of 0 to (PredictorPaletteSize−predictorEntryIdx), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries shall be in the range of 0 to palette_max_size, inclusive.

num_signalled_palette_entries specifies the number of entries in the current palette that are explicitly signalled for the first color component of the current palette table startComp.

When num_signalled_palette_entries is not present, it is inferred to be equal to 0.

The variable CurrentPaletteSize[startComp] specifies the size of the current palette for the first color component of the current palette table startComp and is derived as follows:

$$CurrentPaletteSize[startComp]=NumPredictedPaletteEntries+num\_signalled\_palette\_entries \quad (7\text{-}155)$$

The value of CurrentPaletteSize[startComp] shall be in the range of 0 to palette_max_size, inclusive. new_palette_entries[cIdx][i] specifies the value for the i-th signalled palette entry for the color component cIdx.

The variable PredictorPaletteEntries[cIdx][i] specifies the i-th element in the predictor palette for the color component cIdx.

The variable CurrentPaletteEntries[cIdx][i] specifies the i-th element in the current palette for the color component cIdx and is derived as follows:

```
numPredictedPaletteEntries = 0
for( i = 0; i < PredictorPaletteSize[ startComp ]; i++ )
  if( PalettePredictorEntryReuseFlags[ i ] ) {
    for( cIdx =startComp; cIdx < ( startComp + numComps ); cIdx++ )
      CurrentPaletteEntries[ cIdx ][ numPredictedPaletteEntries ] =
        PredictorPaletteEntries[ cIdx ][ i ]
    numPredictedPaletteEntries++
  }
for( cIdx = startComp; cIdx < (startComp + numComps); cIdx++)   (7-156)
  for( i = 0; i < num_signalled_palette_entries[startComp]; i++ )
    CurrentPaletteEntries[ cIdx ][ numPredictedPaletteEntries + i ] =
      new_palette_entries[ cIdx ][ i ]
``` palette_escape_val_present_flag equal to 1 specifies that the current coding unit contains at least one escape coded sample. escape_val_present_flag equal to 0 specifies that there are no escape coded samples in the current coding unit.

When not present, the value of palette_escape_val_present_flag is inferred to be equal to 1.

The variable MaxPaletteIndex specifies the maximum possible value for a palette index for the current coding unit. The value of MaxPaletteIndex is set equal to CurrentPaletteSize[startComp]−1+palette_escape_val_present_flag.

palette_idx_idc is an indication of an index to the palette table, CurrentPaletteEntries. The value of palette_idx_idc shall be in the range of 0 to MaxPaletteIndex, inclusive, for the first index in the block and in the range of 0 to (MaxPaletteIndex−1), inclusive, for the remaining indices in the block.

When palette_idx_idc is not present, it is inferred to be equal to 0.

palette_transpose_flag equal to 1 specifies that vertical traverse scan is applied for scanning the indices for samples in the current coding unit. palette_transpose_flag equal to 0 specifies that horizontal traverse scan is applied for scanning the indices for samples in the current coding unit. When not present, the value of palette_transpose_flag is inferred to be equal to 0.

The array TraverseScanOrder specifies the scan order array for palette coding. TraverseScanOrder is assigned the horizontal scan order HorTravScanOrder if palette_transpose_flag is equal to 0 and TraverseScanOrder is assigned the vertical scan order VerTravScanOrder if palette_transpose_flag is equal to 1.

run_copy_flag equal to 1 specifies that the palette run type is the same the run type at the previously scanned position and palette run index is the same as the index at the previous position if copy_above_palette_indices_flag is equal to 0. Otherwise, run_copy_flag is equal to 0. copy_above_palette_indices_flag equal to 1 specifies that the palette index is equal to the palette index at the same location in the row above if horizontal traverse scan is used or the same location in the left column if vertical traverse scan is used. copy_above_palette_indices_flag equal to 0 specifies that an indication of the palette index of the sample is coded in the bitstream or inferred.

The variable CopyAboveIndicesFlag[xC][yC] equal to 1 specifies that the palette index is copied from the palette index in the row above (horizontal scan) or left column (vertical scan). CopyAboveIndicesFlag[xC][yC] equal to 0 specifies that the palette index is explicitly coded in the bitstream or inferred. The array indices xC, yC specify the location (xC, yC) of the sample relative to the top-left luma sample of the picture.

The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC][yC] shall be in the range of 0 to MaxPaletteIndex, inclusive.

The variable adjustedRefPaletteIndex is derived as follows:

```
adjustedRefPaletteIndex = MaxPaletteIndex + 1
if( PaletteScanPos > 0 ) {
  xcPrev = x0 + TraverseScanOrder[ log2CbWidth ][ log2bHeight ][ PaletteScanPos − 1 ][ 0 ]
  ycPrev = y0 + TraverseScanOrder[ log2CbWidth ][ log2bHeight ][ PaletteScanPos − 1 ][ 1 ]
  if( CopyAboveIndicesFlag[ xcPrev ][ ycPrev ] = = 0 ) {
    adjustedRefPaletteIndex = PaletteIndexMap[ xcPrev ][ ycPrev ]   { (7-157)
  }
  else {
    if( !palette_transpose_flag )
      adjustedRefPaletteIndex = PaletteIndexMap[ xC ][ yC − 1 ]
    else
      adjustedRefPaletteIndex = PaletteIndexMap[ xC − 1 ][ yC ]
  }
}
```

When CopyAboveIndicesFlag[xC][yC] is equal to 0, the variable CurrPaletteIndex is derived as follows:

if(CurrPaletteIndex>=adjustedRefPaletteIndex) Curr-
   PaletteIndex++                                        (7-158)

palette_escape_val specifies the quantized escape coded sample value for a component.

The variable PaletteEscapeVal[cIdx][xC][yC] specifies the escape value of a sample for which PaletteIndexMap [xC][yC] is equal to MaxPaletteIndex and palette_escape_val_present_flag is equal to 1. The array index cIdx specifies the color component. The array indices xC, yC specify the location (xC, yC) of the sample relative to the top-left luma sample of the picture.

It is a requirement of bitstream conformance that PaletteEscapeVal[cIdx][xC][yC] shall be in the range of 0 to $(1<<(BitDepth_Y+1))-1$, inclusive, for cIdx equal to 0, and in the range of 0 to $(1<<<(BitDepth_C+1))-1$, inclusive, for cIdx not equal to 0.

2.3 Local Dual Tree in VVC

In typical hardware video encoders and decoders, processing throughput drops when a picture has more small intra blocks because of sample processing data dependency between neighboring intra blocks. The predictor generation of an intra block requires top and left boundary reconstructed samples from neighboring blocks. Therefore, intra prediction has to be sequentially processed block by block.

In HEVC, the smallest intra CU is 8×8 luma samples. The luma component of the smallest intra CU can be further split into four 4×4 luma intra prediction units (PUs), but the chroma components of the smallest intra CU cannot be further split. Therefore, the worst-case hardware processing throughput occurs when 4×4 chroma intra blocks or 4×4 luma intra blocks are processed.

In VTM5.0, in single coding tree, since chroma partitions always follows luma and the smallest intra CU is 4×4 luma samples, the smallest chroma intra CB is 2×2. Therefore, in VTM5.0, the smallest chroma intra CBs in single coding tree is 2×2. The worst-case hardware processing throughput for VVC decoding is only ¼ of that for HEVC decoding. Moreover, the reconstruction process of a chroma intra CB becomes much more complex than that in HEVC after adopting tools including cross-component linear model (CCLM), 4-tap interpolation filters, position-dependent intra prediction combination (PDPC), and combined inter intra prediction (CIIP). It is challenging to achieve high processing throughput in hardware decoders. In this section, a method that improves the worst-case hardware processing throughput is proposed.

The goal of this method is to disallow chroma intra CBs smaller than 16 chroma samples by constraining the partitioning of chroma intra CBs.

In single coding tree, a SCIPU is defined as a coding tree node whose chroma block size is larger than or equal to a threshold number (TH) of chroma samples and has at least one child luma block smaller than 4TH luma samples, where TH is set to 16 in this contribution. It is required that in each SCIPU, all CBs are inter, or all CBs are non-inter, i.e., either intra or inra block copy (IBC). In case of a non-inter SCIPU, it is further required that chroma of the non-inter SCIPU shall not be further split and luma of the SCIPU is allowed to be further split. In this way, the smallest chroma intra CB size is 16 chroma samples, and 2×2, 2×4, and 4×2 chroma CBs are removed. In addition, chroma scaling is not applied in case of a non-inter SCIPU. In addition, when luma blocks are further split and chroma blocks are not split, a local dual tree coding structure is constructed.

Figure 5A:
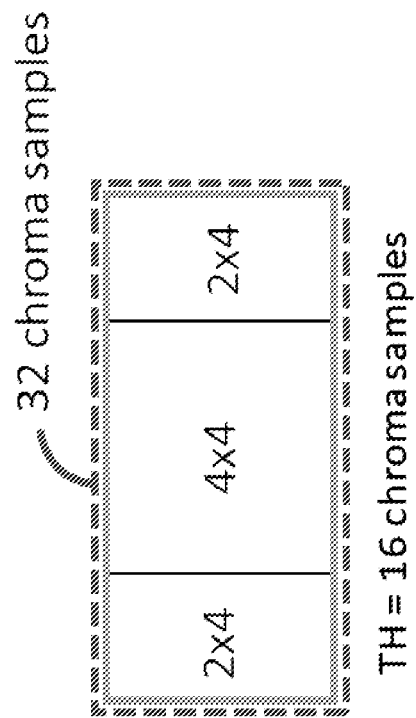
FIGS. 5A and 5B show examples of a smallest chroma intra prediction unit (SCIPU).
Figure 5B:
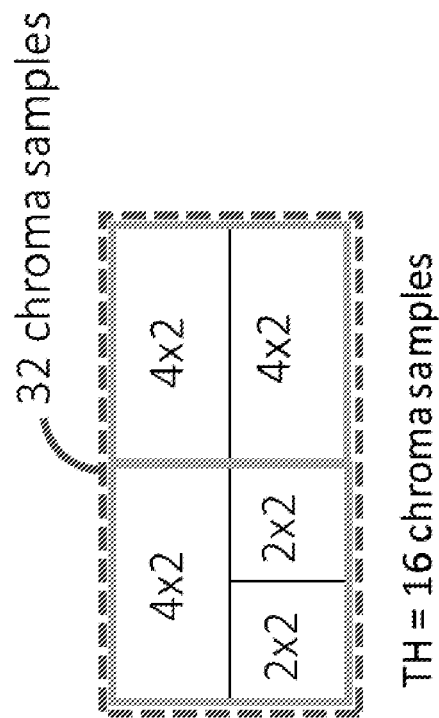

Two SCIPU examples are shown in FIGS. 5A and 5B. In FIG. 5A, one chroma CB of 8×4 chroma samples and three luma CBs (4×8, 8×8, 4×8 luma CBs) form one SCIPU because the ternary tree (TT) split from the 8×4 chroma samples would result in chroma CBs smaller than 16 chroma samples. In FIG. 5B, one chroma CB of 4×4 chroma samples (the left side of the 8×4 chroma samples) and three luma CBs (8×4, 4×4, 4×4 luma CBs) form one SCIPU, and the other one chroma CB of 4×4 samples (the right side of the 8×4 chroma samples) and two luma CBs (8×4, 8×4 luma CBs) form one SCIPU because the binary tree (BT) split from the 4×4 chroma samples would result in chroma CB s smaller than 16 chroma samples.

In the proposed method, the type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one signalled flag before parsing the CUs in the SCIPU.

By applying the above method, the worst-case hardware processing throughput occurs when 4×4, 2×8, or 8×2 chroma blocks, instead of a 2×2 chroma blocks, are processed. The worst-case hardware processing throughput is the same as that in HEVC and is 4× of that in VTM5.0.

2.4 Transform Skip (TS)

As in HEVC, the residual of a block can be coded with transform skip mode. To avoid the redundancy of syntax coding, the transform skip flag is not signalled when the CU level MTS_CU_flag is not equal to zero. The block size limitation for transform skip is the same to that for multiple transform set (MTS) in JEM4, which indicates that transform skip is applicable for a CU when both block width and height are equal to or less than 32. Note that implicit MTS transform is set to DCT2 when low frequency non-separable transform (LFNST) or matrix-based intra prediction (MIP) is activated for the current CU. Also, the implicit MTS can be still enabled when MTS is enabled for inter coded blocks.

In addition, for transform skip block, minimum allowed Quantization Parameter (QP) is defined as 6*(internalBitDepth−inputBitDepth)+4.

2.5 Alternative Luma Half-Pel Interpolation Filters

In JVET-N0309, alternative half-pel interpolation filters are proposed.

The switching of the half-pel luma interpolation filter is done depending on the motion vector accuracy. In addition to the existing quarter-pel, full-pel, and 4-pel adaptive motion vector resolution (AMVR) modes, a new half-pel accuracy AMVR mode is introduced. Only in case of half-pel motion vector accuracy, an alternative half-pel luma interpolation filter can be selected.

For a non-affine non-merge inter-coded CU which uses half-pel motion vector accuracy (i.e., the half-pel AMVR mode), a switching between the HEVC/VVC half-pel luma interpolation filter and one or more alternative half-pel interpolation is made based on the value of a new syntax element hpelIfIdx. The syntax element hpelIfIdx is only signalled in case of half-pel AMVR mode. In case of skip/merge mode using a spatial merging candidate, the value of the syntax element hpelIfIdx is inherited from the neighboring block.

2.6 Adaptive Color Transform (ACT)

Figure 6:
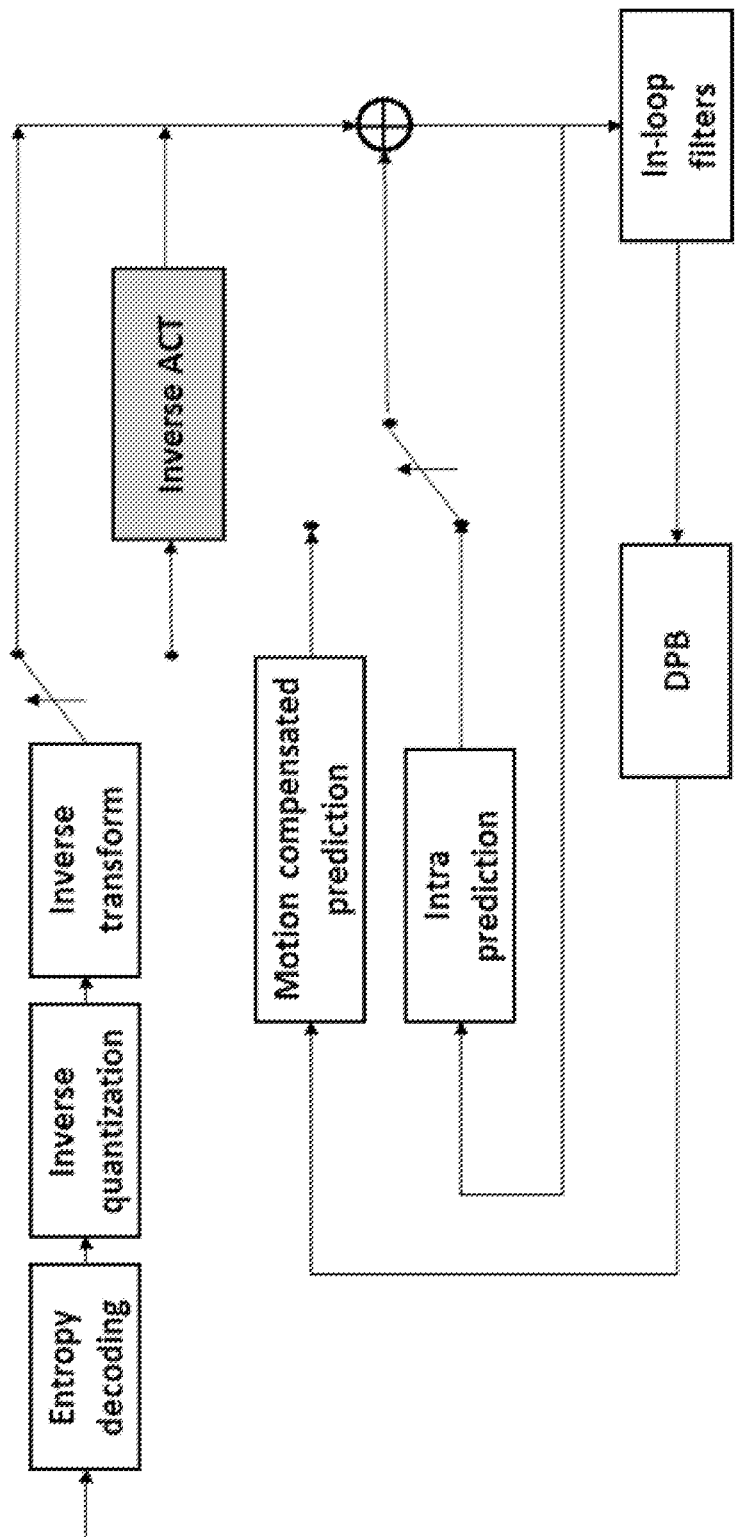
FIG. 6 shows a block diagram of an example of in-loop filtering in video processing.

FIG. 6 illustrates the decoding flowchart with the ACT be applied. As illustrated in FIG. 6, the color space conversion is carried out in residual domain. Specifically, one additional decoding module, namely inverse ACT, is introduced after inverse transform to convert the residuals from YCgCo domain back to the original domain.

In the VVC, unless the maximum transform size is smaller than the width or height of one coding unit (CU), one CU leaf node is also used as the unit of transform processing. Therefore, in the proposed implementation, the ACT flag is signalled for one CU to select the color space for coding its residuals. Additionally, following the HEVC ACT design, for inter and IBC CUs, the ACT is only enabled when there is at least one non-zero coefficient in the CU. For intra CUs, the ACT is only enabled when chroma components select the same intra prediction mode of luma component, i.e., DM mode.

The core transforms used for the color space conversions are kept the same as that used for the HEVC. Specifically, the following forward and inverse YCgCo color transform matrices, as described as follows, as applied.

$$\begin{bmatrix}C'_0\\C'_1\\C'_2\end{bmatrix}=\begin{bmatrix}2 & 1 & 1\\2 & -1 & -1\\0 & -2 & 2\end{bmatrix}\begin{bmatrix}C_0\\C_1\\C_2\end{bmatrix}/4\begin{bmatrix}C_0\\C_1\\C_2\end{bmatrix}=\begin{bmatrix}1 & 1 & 0\\1 & -1 & -1\\1 & -1 & 1\end{bmatrix}\begin{bmatrix}C'_0\\C'_1\\C'_2\end{bmatrix}$$

Additionally, to compensate the dynamic range change of residuals signals before and after color transform, the QP adjustments of (−5, −5, −3) are applied to the transform residuals.

On the other hand, the forward and inverse color transforms need to access the residuals of all three components. Correspondingly, in the proposed implementation, the ACT is disabled in the following two scenarios where not all residuals of three components are available.

1. Separate-tree partition: when separate-tree is applied, luma and chroma samples inside one CTU are partitioned by different structures. This results in that the CUs in the luma-tree only contains luma component and the CUs in the chroma-tree only contains two chroma components.

Intra sub-partition prediction (ISP): the ISP sub-partition is only applied to luma while chroma signals are coded without splitting. In the current ISP design, except the last ISP sub-partitions, the other sub-partitions only contain luma component.

Figure 7:
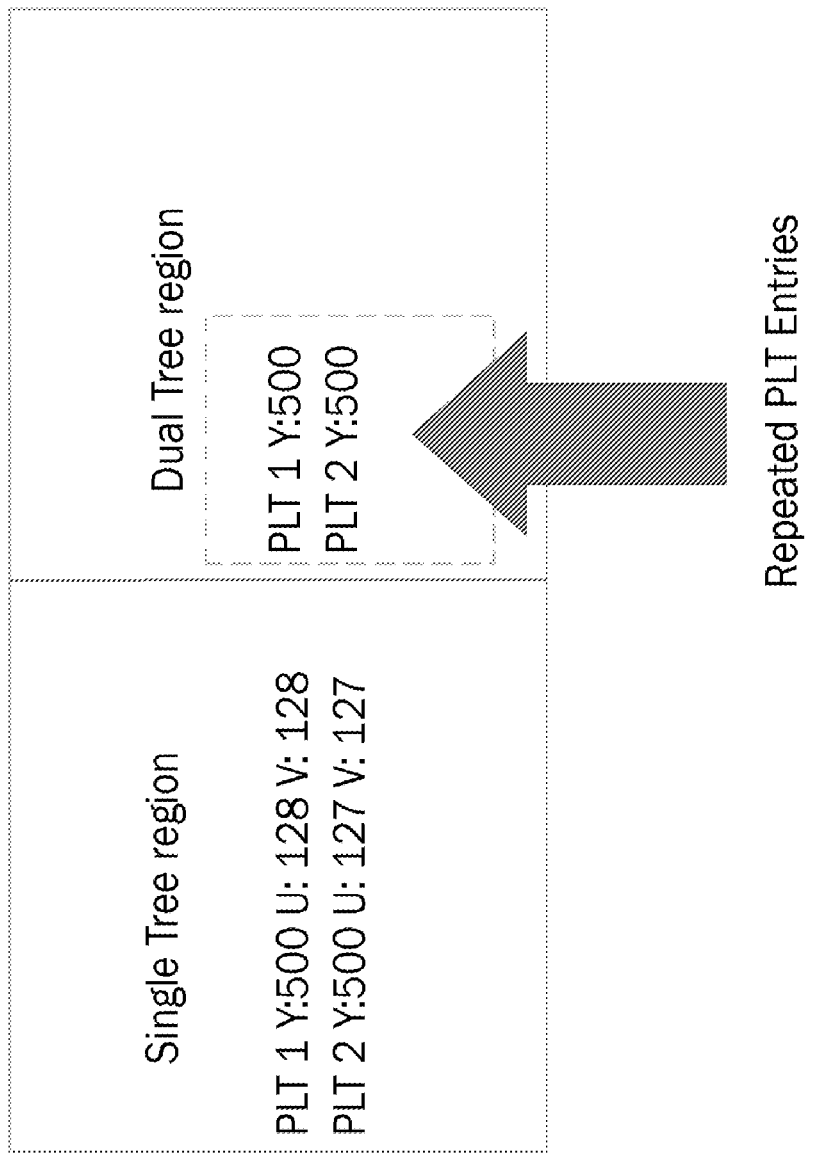
FIG. 7 shows an example of repeated palette entries in the local dual tree case.

3. Technical Problems Solved by Technical Solutions and Embodiments Described Herein 1. The current binarization of escape symbols is not fixed length, which may be suitable for a source with a uniform distribution.
2. Current palette coding design performs an index adjustment process to remove possible redundancy, which may introduce parsing dependency, e.g., when an escape value index is wrongly derived.
3. The reference index employed to derive the current index may need an encoder constraint which is not considered in the current design and not desirable for a codec design.
4. When local dual tree is enabled, previous block and current block's palette entries may have different number of color components. How to handle such a case is not clear.
5. The local dual tree and PLT could not be applied simultaneously since some palette entries may be repeated when coding from a single tree region to a dual tree region. One example is shown in FIG. 7.
6. Chroma QP table for joint_cbcr mode may be restricted.
7. Escape samples may be redundant under certain conditions.
8. The line-based CG mode could not be processed with a high throughput.

4. A Listing of Embodiments and Solutions

The list below should be considered as examples to explain general concepts. These items should not be interpreted in a narrow way. Furthermore, these items can be combined in any manner The following examples may be applied on palette scheme in VVC and all other palette related schemes.

In the following bullets, Qp may denote the qP in section 8.4.5.3 in JVET-P2001-vE.

In the following bullets, QpPrimeTsMin is the minimum allowed quantization parameter for transform skip mode.

Modulo(x, M) is defined as (x % M) when x is a positive integer; otherwise, it is defined as M−((−x) % M).

In the following, a block coded in lossless mode may mean that a block is coded with tranquant_bypass_flag is equal to 1; or coded with QP is no greater than a given threshold and transform_skip_flag is equal to 1.

The following examples may be applied on palette scheme in VVC and all other palette related schemes.

1. Fixed-length coding may be applied to code escape symbols.
   a. In one example, escape symbols may be signalled with fixed length binarization.
   b. In one example, an escape symbol may be signalled in fixed length binarization using N bits.
   c. In one example, the code length (e.g., N mentioned in bullet 1.b) to signal an escape symbol may depend on internal bit depth.
      i. Alternatively, the code length to signal an escape symbol may depend on input bit depth.
      ii. Alternatively, the code length to signal an escape symbol may depend on the difference between internal bit depth and input bit depth.
      iii. In one example N is set equal to input/internal bit depth.
   d. In one example, the length of the fixed-length coding may be signalled in a video processing unit level, e.g., slice subpicture, tile, picture, video.
   e. In one example, the code length to signal an escape symbol (e.g., N mentioned in bullet 1.b) may depend on the quantization parameter, i.e., Qp.
      i. In one example, the code length for signalling an escape symbol may be a function of quantization parameter, such as denoted by f(Qp).
         1. In one example, the function f may be defined as (internal bitdepth−g(QP)).
         2. In one example, N may be set to (internal bitdepth−max (16, (Qp−4)/6)).
         3. In one example, N may be set to (internal bitdepth−max (QpPrimeTsMin, (Qp−4)/6)), wherein qP is the decoded quantization parameter and QpPrimeTsMin is the minimum allowed quantization parameter for transform skip mode.
         4. Alternatively, furthermore, the code length N may be set to max(A, internal bitDepth−(Max (QpPrimeTsMin, Qp)−4)/6) wherein A is non-negative integer value, such as 0 or 1.
      ii. Qp mentioned in the above sub-bullet may refer to slice QP.

1. Alternatively, Qp may refer to slice QP plus a constant value.
   f. In the above examples, N may be greater than or equal to 0.
2. Dequantization Qp for escape symbols may be based on slice/picture/PPS level Qp.
   a. In one example, dequantization Qp for escape symbols may be based on slice/picture/PPS level Qp plus a given offset.
      i. The offset may be a constant.
      ii. The offset may be indicated, implicitly or explicitly, in bitstreams.
   b. In one example, block-level Qp difference may be skipped in the bitstream.
      i. In one example, cbf may be inferred as 0.
3. A left shift may be applied before dequantization for escape symbols.
   a. In one example, N bits' left shift (N>=0) may be applied before dequantization.
      i. In one example, N may be equal to Min(bitDepth−1, (QpPrimeTsMin−4)/6), where bitDepth is internal bitdepth, where bitDepth is internal bitdepth.
      ii. Alternatively, N may be equal to bitDepth−inputBD, where inputBD is input bitdepth.
         1. In one example, inputBD may be indicated in the bitstream.
      iii. Alternatively, N may be equal to deltaBD, where deltaBD is indicated in the bitstream.
4. Escape symbol dequantization may depend on (Qp−QpPrimeTsMin).
   a. In one example, (Qp−QpPrimeTsMin+4) may be applied for escape symbol dequantization as the dequantization Qp.
   b. In one example, Min(Qp−QpPrimeTsMin+4, 63+QpBdOffset) may be applied for escape symbol dequantization as the dequantization Qp.
5. Escape symbol dequantization may depend on (Qp−N*6).
   a. In one example, N may refer to the number of left shifting in bullet 3.a.
   b. In one example, Max(0, Qp−N*6) may be applied as dequantization Qp.
6. Escape symbol dequantization may depend on deltaBD, i.e., the difference between internal bit depth and input bit depth.
   a. In one example, (Qp−deltaBD*6) may be applied for escape symbol dequantization as the dequantization Qp.
   b. In one example, Min(Max(0, Qp−deltaBD*6), 63+QpBdOffset) may be applied for escape symbol dequantization as the dequantization Qp.
7. It is proposed to disable the usage of escape symbols in one video unit (e.g., a CU).
   a. Alternatively, furthermore, the signalling of indication of escape symbol presence is skipped.
   b. In one example, whether to enable/disable the usage of escape symbols may depend on the quantization parameters and/or bit depth.
      i. In one example, if (internal bitDepth−(Max(QpPrimeTsMin, Qp)−4)/6) is no greater than 0, the usage of escape symbols may be disabled.
8. Variable length coding excluding EG with $3^{rd}$ order may be applied to code escape symbols.
   a. In one example, the binarization of an escape symbol may be truncated binary (TB) with an input parameter K.
   b. In one example, the binarization of an escape symbol may be EG with Kth order wherein K is unequal to 3.
      i. In one example, the binarization of an escape symbol may be EG with 0th order.
         1. Alternatively, in one example, the binarization of an escape symbol may be EG with 1st order.
         2. Alternatively, in one example, the binarization of an escape symbol may be EG with 2nd order.
   c. In above examples, K may be an integer number and may depend on
      i. A message signalled in the SPS/video parameter set (VPS)/PPS/picture header/slice header/tile group header/largest coding unit (LCU) row/group of LCUs/bricks.
      ii. Internal bit depth
      iii. Input bit depth
      iv. Difference between internal bit depth and input depth
      v. Block dimension of current block
      vi. Current quantization parameter of current block
      vii. Indication of the color format (such as 4:2:0, 4:4:4, RGB or YUV)
      viii. Coding structure (such as single tree or dual tree)
      ix. Color component (such as luma component and/or chroma components)
9. Multiple binarization methods for coding escape symbols may be applied to a video unit (e.g., a sequence/picture/slice/tile/brick/subpicture/CTU row/CTU/coding tree block (CTB)/CB/CU/a sub-region within a picture) and/or for one or multiple values of escape symbols.
   a. In one example, how to select one of the multiple binarization methods may be signalled for the video unit and/or for one or multiple values of escape symbols.
   b. In one example, how to select one of the multiple binarization methods may be derived for the video unit and/or for one or multiple values of escape symbols.
   c. In one example, for one video unit and/or for one or multiple values of escape symbols, two or more binarization methods may be applied.
      i. In one example, an index or a flag may be encoded/decoded to tell the selected binarization method.

In the following bullets, p may denote the symbol value of a color component, bd may denote bit-depth (e.g., the internal bit depth or input bit depth), ibd may denote input bit depth, and Qp may denote the quantization parameter for transform skip blocks or transform blocks. In addition, QPs for luma component and chroma component may be different or same. Bit depth may be associated with a given color component.

10. How to apply the quantization and/or inverse quantization process may depend on whether the block is coded with palette mode or not.
    a. In one example, the quantization and/or inverse quantization process for escape symbols may be different from those used for normal intra/inter coded blocks with quantization applied.
11. The quantization and/or inverse quantization process for escape symbols may use bit-shifting.
    a. In one example, right bit-shifting may be used for quantizing escape symbols.

i. In one example, the escape symbol may be signalled as f (p, Qp) wherein p is the input symbol value (e.g., input luma/chroma sample value), and Qp is the derived quantization parameter for the corresponding color component.
  1. In one example, the function f may be defined as p>>g(Qp).
  2. In one example, the function f may be defined as (p+(1<<(g(QP)−1)))>>g(QP).
  3. In one example, the function f may be defined as (0, (1<<bd)−1, (p+(1<<(g(QP)−1)))>>g(Qp))
ii. In one example, the escape symbol may be signalled as h(p).
  1. In one example, the function h may be defined as p>>N.
  2. In one example, the function h may be defined as (p+(1<<(N−1)))>>N.
  3. In one example, when cu_transquant_bypass_flag is equal to 1, N may be set to 0.
  4. In one example, when cu_transquant_bypass_flag is equal to 1, N may be equal to (bd−ibd), where bd is internal bit-depth and ibd is input bit-depth.
  5. In one example, the function h may be defined as clip(0, (1<<(bd−N)−1, p>>N), where bd is the internal bit depth for the current color component.
  6. In one example, the function h may be defined as clip(0, (1<<(bd−N)−1, (p+(1<<(N−1)))>>N), where bd is the internal bit depth for the current color component.
  7. In the above example, N may be in the range of [0, (bd−1)].
b. In one example, left bit-shifting may be used for inverse quantizing escape symbols.
  i. In one example, the escape symbol may be dequantized as f(p,Qp), where p is the decoded escape symbol, and Qp is the derived quantization parameter for the corresponding color component.
    1. In one example, f may be defined as p<<g(Qp).
    2. In one example, f may be defined as (p<<g(Qp))+(1<<(g(Qp)−1)).
  ii. In one example, the escape symbol may be reconstructed as f(p,Qp), where p is the decoded escape symbol.
    1. In one example, f may be defined as clip (0, (1<<bd)−1, p<<g(Qp)).
    2. In one example, f may be defined as clip (0, (1<<bd)−1, (p<<g(Qp))+(1<<(g(Qp)−1))).
  iii. In one example, the escape symbol may be reconstructed as h(p).
    1. In one example, the function h may be defined as p<<N.
    2. In one example, the function h may be defined as (p<<N)+(1<<(N−1)).
    3. In one example, when cu_transquant_bypass_flag is equal to 1, N may be set to 0.
    4. In one example, when cu_transquant_bypass_flag is equal to 1, N may be equal to (bd−ibd), where bd is internal bit-depth and ibd is input bit-depth.
    5. In one example, N is set to (max (QpPrimeTsMin, qP)−4)/6, wherein qP is the decoded quantization parameter and QpPrimeTsMin is the minimum allowed quantization parameter for transform skip mode.
      a) In the above example, if both luma and chroma have transform skip modes, different minimum allowed quantization parameters for transform skip mode may be applied for different color components.
    6. Alternatively, for the above examples, N may be further clipped, such as min(bd−1, N).
    7. In the above example, N may be in the range of [0, (bd−1)].
12. When applying left-shift as dequantization, reconstruction offset of an escape symbol p may depend on bitdepth information.
  a. In one example, it may be dependent on the difference between internal bitdepth and input bitdepth, i.e. deltaBD=internal bitdepth−input bitdepth.
  b. When K is smaller or equal to deltaBD, the reconstructed value may be p<<K.
  c. When K is larger than deltaBD, the reconstruction value may be (p<<K)+(1<<(K−1)).
  d. When K is smaller or equal to T0 (e.g., T0=2), the reconstructed value may be p<<K.
  e. When K is larger than T1 (e.g., T1=2), the reconstruction value may be (p<<K)+(1<<(K−1)).
  f. In one example, T0 and T1 in bullet d and e may be signalled in the bitstream, such as in sequence/picture/slice/tile/brick/subpicture-level.
  g. In one example, the reconstruction value may be (p<<K)+((1<<(K−1))>>deltaBD<<deltaBD).
  h. In one example, the reconstruction value may be ((p<<(K+1))+(1<<K))>>(deltaBD+1)<<deltaBD.
  i. In one example, the deltaBD may be signalled in the bitstream, such as in sequence/picture/slice/tile/brick/subpicture-level.
  j. In one example, which reconstruction value shall be used (e.g., bullets b to e) may depend on the quantization parameter of current block.
  k. In one example, which reconstruction value shall be used (e.g., bullets b to e) may depend on the value of deltaBD.
  l. In one example, K may be set to g(Qp).
13. In the above examples, the following may apply:
  a. In one example, the escape symbols may be context coded.
  b. In one example, the escape symbols may be bypass coded.
  c. In one example, g(Qp) may be defined as (Qp−4)/6 or QP/8.
    i. Alternatively, g(Qp) may be defined as Qp/6 or QP/8.
    ii. Alternatively, g(Qp) may be defined as max (16, Qp/6)).
    iii. Alternatively, g(Qp) may be defined as max (16, (Qp−4)/6).
    iv. Alternatively, g(Qp) may be defined as max ((bd−ibd)*6+4, (Qp−4)/6).
    v. Alternatively, g(Qp) may be defined as max (M, (Qp−4)/6).
      1. In one example, M may be signalled to the decoder.
    vi. Alternatively, g(Qp) may be defined as max ((M,Qp)−4)/6.
      1. In one example, M may be indicated in the SPS.
      2. In one example, same or different M may be applied on luma and chroma components.
      3. In one example, M may be equal to (bd−ibd)*6+4.

vii. Alternatively, g(Qp) may be defined as Qp/6 or QP/8.
viii. Alternatively, g(Qp) may be defined as (max (16, Qp)/6).
ix. Alternatively, g(Qp) may be defined as (max (16, Qp)−4)/6.
d. In one example, the value of g(Qp) may be in the range of [0, (bd−1)].
e. In one example, the max function max (a,i) may be defined as (i<=a? a: i).
  i. Alternatively, in one example, the max function max (a,i) may be defined as (i<a? a: i).
f. In one example, N may be an integer number (e.g., 8 or 10) and may depend on:
  i. A message signalled in the SPS/VPS/PPS/picture header/slice header/tile group header/LCU row/group of LCUs/bricks.
  ii. Internal bit depth
  iii. Input bit depth
  iv. Difference between internal bit depth and input depth
  v. Block dimension of current block
  vi. Current quantization parameter of current block
  vii. Indication of the color format (such as 4:2:0, 4:4:4, RGB or YUV)
  viii. Coding structure (such as single tree or dual tree)
  ix. Color component (such as luma component and/or chroma components)
  x. Slice/tile group type and/or picture type
g. In one example, N may be signalled to the decoder.
14. Qp for escape values may be clipped.
  a. In one example, the lowest Qp applied to escape values may be equal to min_qp_prime_ts_minus4.
  b. In one example, the lowest Qp applied to escape values may be related to min_qp_prime_ts_minus4.
    i. In one example, the lowest Qp applied to escape values may be equal to min_qp_prime_ts_minus4+4.
  c. In one example, the lowest Qp for each color component may be indicated in the SPS/PPS/VPS/dependency parameter set (DPS)/Tile/Slice header.
  d. In one example, the lowest Qp applied to escape values may be (bd−ibd)*6+4, where bd is the internal bit depth and ibd denotes the input bit depth for a certain color component.
  e. In one example, the above examples may be applied to a certain color component.
15. In the above examples, the chroma Qp for escape values may use the Qp before/after mapping.
16. It is proposed to not use a reference index when deriving the current palette index in the palette mode.
  a. In one example, the palette index may be directly signalled without excluding the possibility of a reference index (e.g. adjustedRefPaletteIndex).
    i. Alternatively, in one example, the encoder may be constrained to enable the reference index always being different from the current index. In such as case, the palette index may be signalled by excluding the possibility of a reference index.
  b. In one example, the binarization of a palette index may be Truncated binary (TB) with using maximal palette index as a binarization input parameter.
  c. In one example, the binarization of a palette index may be fixed length.
  d. In one example, the binarization of a palette index may be EG with Kth order.
    i. In one example, K may be an integer number (e.g., 1, 2 or 3) and may depend on:
      1. A message signalled in the SPS/VPS/PPS/picture header/slice header/tile group header/LCU row/group of LCUs/bricks.
      2. Internal bit depth
      3. Input bit depth
      4. Difference between internal bit depth and input depth Block dimension of current block
      6. Current quantization parameter of current block
      7. Indication of the color format (such as 4:2:0, 4:4:4, RGB or YUV)
      8. Coding structure (such as single tree or dual tree)
      9. Color component (such as luma component and/or chroma components)
  e. In one example, the above examples may be applied only when the current block has one escape sample at least.
17. Current palette index may be signalled independent from the previous palette indices.
  a. In one example, whether and/or how to use previous palette indices may depend on whether there is escape sample(s) in the current block.
18. Derivation from an index for escape symbols to an index for non-escape symbols may be disallowed.
  a. In one example, when escape symbols are applied and the palette index is not equal to the index for escape symbols, it may be disallowed to decode the symbols as an escape symbol.
19. Derivation from an index for non-escape symbols to an index for escape symbols may be disallowed.
  a. In one example, when escape symbols are applied and the palette index is equal to the index for escape symbols, it may be disallowed to decode the symbols as a non-escape symbol.
20. A derived palette index may be capped by the current palette table size.
  a. In one example, when the palette index is larger than MaxPaletteIndex, it may be modified to equal to MaxPaletteIndex.
21. A derived palette index may be capped by the current palette table size excluding the index for escape symbols.
  a. In one example, when escape symbols are not applied and the palette index is larger than MaxPaletteIndex, it may be modified to equal to MaxPaletteIndex.
  b. In one example, when escape symbols are applied and the palette index is larger than (MaxPaletteIndex−1), it may be modified to equal to (MaxPaletteIndex−1).
22. The index to indicate escape symbol may be disallowed to be modified.
  a. In one example, index being equal to be MaxPaletteIndex may always indicate escape symbol when escape symbols are present in the current block.
  b. In one example, index not equal to be MaxPaletteIndex cannot be decoded as an index to indicate escape symbol.
23. It is proposed to code the difference between a reference index and current index
  a. In one example, the difference equal to be 0 may be disallowed to be coded.
  b. Alternatively, for the first index in a palette coded block, the index may be directly coded.

24. It is proposed to code the modulo of the difference between a reference index (denoted as R), and the current index (denoted as C).
   a. In one example, I=Modulo(C−R, MaxPaletteIndex) may be coded.
      i. In one example, the index may be reconstructed as Modulo(I+R, MaxPaletteIndex).
      ii. In one example, Modulo(C−R, MaxPaletteIndex) equal to be 0 may be disallowed in the bitstream.
      iii. In one example, truncated binary code with cMax=MaxPaletteIndex may be used to code the value.
      iv. Alternatively, for the first index in a palette coded block, the index may be directly coded.
   b. In one example, I=Modulo(C−R, MaxPaletteIndex)−1 may be coded.
      i. In one example, the index may be reconstructed as Modulo(I+1+R, MaxPaletteIndex).
      ii. In one example, Modulo(C−R, MaxPaletteIndex)−1 smaller than 0 may be disallowed in the bitstream.
      iii. In one example, truncated binary code with cMax=(MaxPaletteIndex−1) may be used to code the value I.
      iv. Alternatively, for the first index in a palette coded block, Modulo(C−R, MaxPaletteIndex) may be coded.
      v. Alternatively, for the first index in a palette coded block, the index may be directly coded.
25. At the beginning of decoding a palette block, the reference index R may be set equal to −1
   a. Alternatively, the reference index R may be set equal to 0.
26. It is proposed to enable the palette mode and the local dual tree exclusively.
   a. In one example, the local dual tree may be not allowed when the palette mode is enabled.
      i. Alternatively, in one example, the palette mode may be not allowed when the local dual tree is enabled.
   b. In one example, the local dual tree is not enabled on a specific color format, such as 4:4:4.
   c. In one example, palette mode may be disallowed when a coding tree is of MODE_TYPE_INTRA.
   d. It is proposed to reset the palette predictor based on the usage of local dual tree.
      i. In one example, the palette predictor may be reset when single tree is switched to local dual tree.
      ii. In one example, the palette predictor may be reset when local dual tree is switched to single tree.
      iii. Alternatively, furthermore, whether to signal usage of entries in the palette predictor (e.g., palette_predictor_run) may depend on the tree type.
         1. In one example, the signalling of usage of entries in the palette predictor (e.g., palette_predictor_run) is omitted when meeting the switch between local dual tree and single tree.
27. It is proposed to remove repeated palette entries in the palette prediction table when local dual tree is applied.
   a. In one example, the palette prediction table may be reset when local dual tree is applied.
      i. Alternatively, in one example, the decoder may check all palette entries in the prediction table and remove repeated ones when local dual tree is applied.
      ii. Alternatively, in one example, the decoder may check partial palette entries in the prediction table and remove repeated ones when local dual tree is applied.
      iii. In one example, full pruning or partial pruning may be applied when checking the palette entries.
         1. In one example, a set of selected entries may be checked (e.g., the set includes all or partial palette entries in the palette predictor).
            a) In one example, full or partial pruning may be applied on the selected entries.
         2. In one example, full pruning may denote that one entry is compared to all entries that may be added.
         3. In one example, partial pruning may denote that one entry is compared to partial entries that may be added.
      iv. In one example, whether two palette entries are same may be only based on whether their luma component values are same.
         1. Alternatively, in one example, whether two palette entries are same may be only based on whether their chroma component values are same.
         2. Alternatively, in one example, whether two palette entries are same may be based on whether both of their luma and chroma component values are same.
      v. In one example, the above method may be applied on luma blocks only when the local dual tree starts to process the luma component.
         1. Alternatively, in one example, the above method may be applied on chroma blocks only when the local dual tree starts to process the chroma component.
      vi. Alternatively, in one example, the encoder may add a constraint that is considering two palette entries different when three components of their entries are different.
28. When the current palette entry has a different number of color components from an entry the palette prediction table, the palette prediction table may be disallowed to be used.
   a. In one example, reused flags for all entries in the palette prediction table may be marked as true but may not be used for the current block when the current palette entry has a different number of color components from prediction.
   b. In one example, reused flags for all entries in the palette prediction table may be marked as false when the current palette entry has a different number of color components from prediction.
29. When the prediction table and current palette table have different color component(s), the palette prediction table may be disallowed to be used.
   a. In one example, reused flags for all entries in the palette prediction table may be marked as true but may not be used for the current block when prediction table and current palette table have different color components.
   b. In one example, reused flags for all entries in the palette prediction table may be marked as false when prediction table and current palette table have different color components.
30. The escape symbols may be predictively coded, such as based on previously coded escape symbols.

a. In one example, an escape symbol of one component may be predicted by coded values in the same color component.
   i. In one example, the escape symbol may employ the previously one coded escape symbol in the same component as a predictor and the residue between them may be signalled.
   ii. Alternatively, the escape symbol may employ the previously $K^{th}$ coded escape symbol in the same component as a predictor and the residue between them may be signalled.
   iii. Alternatively, the escape symbol may be predicted from multiple (e.g., K) coded escape symbols in the same component.
      1. In one example, K may be an integer number (e.g., 1, 2 or 3) and may depend on:
         a) A message signalled in the SPS/VPS/PPS/picture header/slice header/tile group header/LCU row/group of LCUs/bricks.
         b) Internal bit depth
         c) Input bit depth
         d) Difference between internal bit depth and input depth
         e) Block dimension of current block
         f) Current quantization parameter of current block
         g) Indication of the color format (such as 4:2:0, 4:4:4, RGB or YUV)
         h) Coding structure (such as single tree or dual tree)
         i) Color component (such as luma component and/or chroma components)
b. In one example, an escape symbol of one component may be predicted by coded values of another component.
c. In one example, a pixel may have multiple color components, and if the pixel is treated as escape symbol, the value of one component may be predicted by the values of samples of other components.
   i. In one example, the U component of an escape symbol may be predicted by the V component of that symbol.
d. In one example, the above methods may be only applied to certain color component (e.g., on luma component or chroma components), or under certain conditions such as based on coded information.

31. Signalling of palette related syntax elements may depend on the maximum size of palette, and/or block dimension, and/or usage of lossless mode and/or quantization parameters (QP).
   a. In one example, for a lossless code block and/or QP is no greater than a threshold and/or transform skip is applied, the block's palette size is inferred to be equal to block dimension.
      i. Alternatively, for a lossless code block and/or QP is no greater than a threshold, the block's palette size is inferred to be equal to min(block dimension, maximum palette size).
   b. Whether to signal the usage of escape samples in a block may depend on the block dimension and/or usage of lossless coded mode (e.g., QP is equal to given value (e.g., 4) or not; and/or transform_skip_flag is equal to 1; or transquant_bypass_flag is equal to true or not) and/or QPs.
      i. Alternatively, furthermore, whether to signal the usage of escape samples may depend on the relationship between the block dimension and current palette size of the current block.
         1. In one example, whether to signal the usage of escape samples may depend on whether the block dimension is equal to current palette size.
            a) Alternatively, furthermore, if block dimension is equal to current palette size, it is not signalled and inferred to be false.
         2. Alternatively, whether to signal the usage of escape samples may depend on whether the block dimension is no smaller than current palette size.
            a) Alternatively, furthermore, if block dimension is no smaller than current palette size, it is not signalled and inferred to be false.
      ii. Alternatively, furthermore, whether to signal the usage of escape samples may depend on the relationship between the block dimension, maximum size of palette, and/or lossless mode.
         1. In one example, if one block is coded with lossless mode and the block dimension is smaller than the maximum size of palette, the signalling of usage of escape samples may be omitted and it is inferred to be false.
         2. In one example, if one block is coded with QP no greater than a threshold and the block dimension is smaller than the maximum size of palette, the signalling of usage of escape samples may be omitted and it is inferred to be false.
      iii. The indication of usage of escape samples (e.g. palette_escape_val_present_flag) may be inferred under certain conditions.
         1. In one example, the indication of usage of escape samples may be inferred to false when the current block size is smaller than or equal to the maximally allowed palette size (e.g. palette_max_size).
            a) Alternatively, in one example, the indication of usage of escape samples may be signalled when the current block size is greater than the maximally allowed palette size.
            b) Alternatively, in one example, the indication of usage of escape samples may be inferred to false when the current block size is greater than the maximally allowed palette size.
         2. In one example, the above methods may be applied under the lossless coding condition.
         3. In one example, the above methods may be applied to CUs that are lossless coded.
         4. In one example, the indication of usage of escape samples may be inferred to false when the current block size is smaller than or equal to the palette size of the current block.
         5. In one example, when the usage flag of escape samples is inferred, the corresponding syntax element, e.g. palette_escape_val_present_flag, may be skipped in the bitstream.

Figure 8:
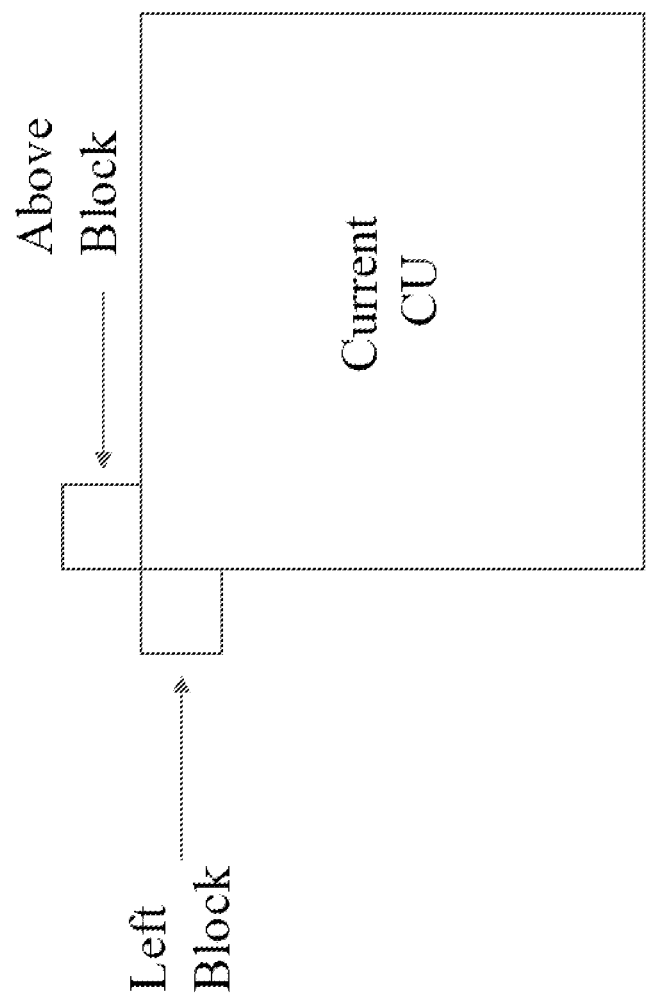
FIG. 8 shows an example of left and above blocks in the process of context derivation.

32. The contexts for run-length coding in palette mode may depend on the palette index for indexing the palette entries.
   a. In one example, the palette index after the index adjustment process at the decoder (mentioned in section 2.1.3) may be employed to derive contexts for the prefix of a length element (e.g., palette_run_prefix).

b. Alternatively, in one example, the I defined in the bullet 13 may replace the palette index to derive contexts for the prefix of a length element (e.g., palette_run_prefix).
33. It is proposed to align the positions of left neighboring block and/or above neighboring block employed in the derivation process for the quantization parameter predictors with the positions of left neighboring block and/or above neighboring block used in the mode/MV (e.g., MPM) derivation.
   a. The positions of left neighboring block and/or above neighboring block employed in the derivation process for the quantization parameter may be aligned with that used in the merge/AMVP candidate list derivation process.
   b. In one example, the positions of left neighboring block and/or above block employed in the derivation process for the quantization parameter may be the left/above neighboring blocks shown in FIG. 8.
34. Block-level QP difference may be sent independent of whether escape samples exist in the current block.
   a. In one example, whether and/or how to send block-level QP difference may follow blocks coded in other modes than palette.
   b. In one example, block-level QP difference may be always not sent for a palette block.
   c. In one example, block-level QP difference may be sent for a palette block when block width is larger than a threshold.
   d. In one example, block-level QP difference may be sent for a palette block when block height is larger than a threshold.
   e. In one example, block-level QP difference may be sent for a palette block when block size is larger than a threshold.
   f. In one example, the above examples may only apply to luma or chroma blocks.
35. One or more of the coded block flags (CBFs) (e.g., cbf_luma, cbf_cb, cbf_cr) for a palette block may be set equal to 1.
   a. In one example, the CBF for a palette block may be always set equal to 1.
   b. One or more of the CBFs for a palette block may depend on whether escape pixels exist in the current block.
      i. In one example, when a palette block has escape samples, its cbf may be set equal to 1.
      ii. Alternatively, when a palette block does not have escape samples, its cbf may be set equal to 0.
   c. Alternatively, when accessing a neighboring palette coded block, it may be treated as an intra coded block with CBF equal to 1.
36. The difference between luma and/or chroma QP applied to a palette block and QP derived for the block (e.g. $Qp_Y$ or $Qp'_Y$ in JVET-O2001-vE spec) may be set equal to a fixed value for palette blocks.
   a. In one example, the luma and/or chroma QP offset may be set equal to 0.
   b. In one example, the chroma QP offsets for Cb and Cr may be different.
   c. In one example, the luma QP offset and chroma QP offsets may be different.
   d. In one example, the chroma QP offset(s) may be indicated in DPS/VPS/SPS/PPS/Slice/Brick/Tile header.
37. The number of palette indices explicitly signalled or inferred for the current block (e.g., num_palette_indices_minus1+1), denoted by $Num_{pltIdx}$, may be restricted to be greater than or equal to K.
   a. In one example, K may be determined based on the current palette size, the escape flag and/or other information of palette coded blocks. Let S be current palette size of a current block and E be the value of escape present flag (e.g., palette_escape_val_present_flag). Let BlkS be the current block size.
      i. In one example, K may be set equal to S.
      ii. Alternatively, in one example, K may be set equal to S+E.
      iii. Alternatively, in one example, K may be set equal to (Number of Predicted Palette entries+number of signalled palette entries+palette_escape_val_present_flag) (e.g., NumPredictedPaletteEntries+num_signalled_palette_entries+palette_escape_val_present_flag).
      iv. Alternatively, in one example, K may be set equal to (the maximal value of palette index (e.g. MaxPaletteIndex) plus 1).
      v. Alternatively, in one example, K may be signalled to the decoder.
      i. In one example, K may be a fixed integer value.
      ii. In one example, K is an integer number and may be determined based on:
         1. Decoded information of previously coded blocks/current block
         2. Quantization parameters of current block/neighboring (adjacent or non-adjacent) blocks
         3. Video contents (e.g., screen contents or natural contents)
         4. A message signalled in the DPS/SPS/VPS/PPS/adaptation parameter set (APS)/picture header/slice header/tile group header/Largest coding unit (LCU)/Coding unit (CU)/LCU row/group of LCUs/transform unit (TU)/picture unit (PU) block/Video coding unit
         5. Position of CU/PU/TU/block/Video coding unit
         6. Block dimension of current block and/or its neighboring blocks
         7. Block shape of current block and/or its neighboring blocks
         8. Indication of the color format (such as 4:2:0, 4:4:4, RGB or YUV)
         9. Coding tree structure (such as dual tree or single tree)
         10. Slice/tile group type and/or picture type
         11. Color component (e.g., may be only applied on luma component and/or chroma component)
         12. Temporal layer ID
         13. Profiles/Levels/Tiers of a standard
   b. In one example, ($Num_{pltIdx}$, minus K) instead of num_palette_indices_minus1 may be signalled/parsed.
      i. Alternatively, furthermore, it may be signalled only when (S+E) is no smaller than 1.
      ii. In one example, the value of ($Num_{pltIdx}$, minus K) may be signalled with a binarization method that the binarized bin string may have a pre-fix (e.g., truncated unary) and/or a suffix with m-th EG code.
      iii. In one example, the value of ($Num_{pltIdx}$, minus K) may be signalled with a truncated binary binarization method.
      iv. In one example, the value of ($Num_{pltIdx}$, minus K) may be signalled with a truncated unary binarization method.

v. In one example, the value of (Num$_{pltIdx}$, minus K) may be signalled with a m-th EG binarization method.

vi. In one example, the value of BlkS−K may be used as an input parameter (e.g., cMax) in the above binarization methods, such as being used as maximum value to the truncated unary/truncated binary binarization method.

c. In one example, a conformance bitstream shall satisfy that Num$_{PltIdx}$, is greater than or equal to K.

d. In one example, a conformance bitstream shall satisfy that Num$_{pltIdx}$, is smaller than or equal to K'.

i. In one example, K' is set to (block width*block height).

ii. In one example, K' is set to (block width*block height−K).

38. Whether and/or how apply the above methods may be based on:

a. Video contents (e.g., screen contents or natural contents)

b. A message signalled in the DPS/SPS/VPS/PPS/APS/picture header/slice header/tile group header/Largest coding unit (LCU)/Coding unit (CU)/LCU row/group of LCUs/TU/PU block/Video coding unit c. Position of CU/PU/TU/block/Video coding unit d. Block dimension of current block and/or its neighboring blocks e. Block shape of current block and/or its neighboring blocks f. Indication of the color format (such as 4:2:0, 4:4:4, RGB or YUV)

g. Coding tree structure (such as dual tree or single tree)

h. Slice/tile group type and/or picture type i. Color component (e.g., may be only applied on luma component and/or chroma component)

j. Temporal layer ID k. Profiles/Levels/Tiers of a standard l. Whether the current block has one escape sample or not.

i. In one example, the above methods may be applied only when the current block has one escape sample at least.

m. Whether current block is coded with lossless mode or not (e.g., cu_transquant_bypass_flag)

i. In one example, the above methods may be applied only when the current block is NOT coded with lossless mode.

n. Whether lossless coding is enabled or not (e.g., transquant_bypass_enabled, cu_transquant_bypass_flag)

i. In one example, the above methods may be applied only when lossless coding is disabled.

Line Based CG Palette Mode Related

39. Whether these are escape samples may be indicated for each CG.

a. In one example, for each CG, a syntax element, e.g., palette_escape_val_present_flag, may be sent in the bitstream to indicate whether escape samples are present or not.

i. In one example, the palette_escape_val_present_flag may be signalled or inferred based on the CG size, the number of decoded samples in the current block, and/or the palette size of the current block.

b. In one example, for the current CG, when escape samples are not present, index adjustment may be applied.

c. In one example, for the current CG, when escape samples are present, index adjustment should not be applied.

d. Alternatively, above methods may be applied only when the current block contains escape samples.

40. In the line-based CG palette mode, the indication of the usage of copying the above index (e.g., copy_above_palette_indices_flag) may be not context coded.

e. Alternatively, in one example, the indication of the usage of copying the above index (e.g., copy_above_palette_indices_flag) may be bypass coded without using any contexts.

i. In one example, the indication of the usage of copying the above index (e.g., copy_above_palette_indices_flag) and the copy flags (e.g., run_copy_flag) in the current segment may be interleaved signalled.

f. In one example, the indication of the usage of copying the above index (e.g., copy_above_palette_indices_flag) may be coded after the all copy flags (e.g., run_copy_flag) in the current segment are signalled.

g. In one example, the indication of the usage of copying the above index (e.g., copy_above_palette_indices_flag) and the signalled index may be interleaved coded.

h. The above methods may be also applied to other palette-based coding modes.

41. The copy flags, the run types, the indications of the usage of copying the above index, and the escape values may be interleaved signalled.

i. In one example, a first copy flag, run type, the indication of the usage of copying the above index, and escape values may be coded in order; followed by a second copy flag, run type, the indication of the usage of copying the above index, and escape values.

j. Alternatively, furthermore, for a given CG, the above method may be applied.

42. The line-based CG palette mode may be disabled for blocks with size being smaller than or equal to a given threshold, denoted as Th.

k. In one example, Th is equal to the number of samples of a segment in the line-based CG palette mode.

l. In one example, Th is a fixed number (e.g., 16) and may be based on:

i. Video contents (e.g., screen contents or natural contents)

ii. A message signalled in the DPS/SPS/VPS/PPS/APS/picture header/slice header/tile group header/Largest coding unit (LCU)/Coding unit (CU)/LCU row/group of LCUs/TU/PU block/Video coding unit iii. Position of CU/PU/TU/block/Video coding unit iv. Block dimension of current block and/or its neighboring blocks v. Block shape of current block and/or its neighboring blocks vi. Indication of the color format (such as 4:2:0, 4:4:4, RGB or YUV)

vii. Coding tree structure (such as dual tree or single tree)

viii. Slice/tile group type and/or picture type ix. Color component (e.g., may be only applied on luma component and/or chroma component)

x. Temporal layer ID xi. Profiles/Levels/Tiers of a standard xii. The quantization parameter of the current block xiii. Whether the current block has one escape sample or not xiv. Whether lossless coding is enabled or not (e.g., transquant_bypass_enabled, cu_transquant_bypass_flag)

BDPCM Related

43. When one block is coded with BDPCM and is split into multiple transform blocks or sub-blocks, the residual prediction may be done in block level, and signalling of residuals is done in sub-block/transform block level.

a. Alternatively, furthermore, the reconstruction of one sub-block is disallowed in the reconstruction process of another sub-block.
   b. Alternatively, the residual prediction and signalling of residuals is done in sub-block/transform block level.
      i. In this way, the reconstruction of one sub-block may be utilized in the reconstruction process of another sub-block.

Chroma QP Table Related

44. For a given index, the value of the chroma QP table for joint_cb_cr mode may be constrained by both the value of the chroma QP table for Cb and the value of the chroma QP table for Cr.

c. In one example, the value of the value of the chroma QP table for joint_cb_cr mode may be constrained between the value of the chroma QP table for Cb and the value of the chroma QP table for Cr, inclusive.

Deblocking Related

45. Motion vector (MV) comparison in deblocking may depend on whether the alternative half-pel interpolation filter is used (e.g., indicated by hpelIfIdx in the JVET-O2001-vE spec).

d. In one example, blocks using different interpolation filters may be treated as having different MVs.
   e. In one example, a constant offset may be added to the MV difference for deblocking comparison when the alternative half-pel interpolation filter is involved.

General claims

46. Whether and/or how apply the above methods may be based on:

a. Video contents (e.g., screen contents or natural contents)
   b. A message signalled in the DPS/SPS/VPS/PPS/APS/picture header/slice header/tile group header/Largest coding unit (LCU)/Coding unit (CU)/LCU row/group of LCUs/TU/PU block/Video coding unit
   c. Position of CU/PU/TU/block/Video coding unit
   d. Block dimension of current block and/or its neighboring blocks
   e. Block shape of current block and/or its neighboring blocks
   f. Quantization parameter of the current block
   g. Indication of the color format (such as 4:2:0, 4:4:4, RGB or YUV)
   h. Coding tree structure (such as dual tree or single tree)
   i. Slice/tile group type and/or picture type
   j. Color component (e.g., may be only applied on luma component and/or chroma component)
   k. Temporal layer ID
   l. Profiles/Levels/Tiers of a standard
   m. Whether the current block has one escape sample or not
      i. In one example, the above methods may be applied only when the current block has one escape sample at least.
   n. Whether current block is coded with lossless mode or not (e.g., cu_transquant_bypass_flag).
      ii. In one example, the above methods may be applied only when the current block is NOT coded with lossless mode.
   o. Whether lossless coding is enabled or not (e.g., transquant_bypass_enabled, cu_transquant_bypass_flag).

5. Embodiments

The embodiment is based on JVET-O2001-vE. Newly-added text is enclosed in double bolded braces, e.g., {{a}} indicates that "a" has been added. Deleted text is enclosed in double bolded brackets, e.g., [[b]] indicates that "b" has been deleted.

5.1 Embodiment #1

Decoding Process for Palette Mode

Inputs to this process are:

a location (xCb, yCb) specifying the top-left luma sample of the current block relative to the top-left luma sample of the current picture, a variable startComp specifies the first color component in the palette table, a variable cIdx specifying the color component of the current block, two variables nCbW and nCbH specifying the width and height of the current block, respectively.

Output of this process is an array recSamples[x][y], with x=0 . . . nCbW−1, y=0 . . . nCbH−1 specifying reconstructed sample values for the block.

Depending on the value of cIdx, the variables nSubWidth and nSubHeight are derived as follows:

If cIdx is equal to 0, nSubWidth is set to 1 and nSubHeight is set to 1.

Otherwise, nSubWidth is set to SubWidthC and nSubHeight is set to SubHeightC.

The (nCbW×nCbH) block of the reconstructed sample array recSamples at location (xCb, yCb) is represented by recSamples[x][y] with x=0 . . . nCTbW−1 and y=0 . . . nCbH−1, and the value of recSamples[x][y] for each x in the range of 0 to nCbW−1, inclusive, and each y in the range of 0 to nCbH−1, inclusive, is derived as follows:

The variables xL and yL are derived as follows:

$$xL = \text{palette\_transpose\_flag} ? x*\text{nSubHeight} : x*\text{nSubWidth} \quad (8\text{-}268)$$

$$yL = \text{palette\_transpose\_flag} ? y*\text{nSubWidth} : y*\text{nSubHeight} \quad (8\text{-}269)$$

The variable bIsEscapeSample is derived as follows:

If PaletteIndexMap[xCb+xL][yCb+yL] is equal to MaxPaletteIndex and palette_escape_val_present_flag is equal to 1, bIsEscapeSample is set equal to 1.

Otherwise, bIsEscapeSample is set equal to 0.

If bIsEscapeSample is equal to 0, the following applies:

$$\text{recSamples}[x][y] = \text{CurrentPaletteEntries}[cIdx][\text{PaletteIndexMap}[xCb+xL][yCb+yL]] \quad (8\text{-}270)$$

Otherwise, if cu_transquant_bypass_flag is equal to 1, the following applies:

recSamples[x][y]=PaletteEscapeVal[cIdx][xCb+xL][yCb+yL]  (8-271)

Otherwise (bIsEscapeSample is equal to 1 and cu_transquant_bypass_flag is equal to 0), the following ordered steps apply:

1. The quantization parameter qP is derived as follows:
If cIdx is equal to 0, $qP=\text{Max}(0,Qp'Y)$  (8-272)

Otherwise, if cIdx is equal to 1, $qP=\text{Max}(0,Qp'Cb)$  (8-273)

Otherwise (cIdx is equal to 2), $qP=\text{Max}(0,Qp'Cr)$  (8-274)

2. The variables bitDepth is derived as follows:

$\text{bitDepth}=(cIdx==0)?\text{BitDepth}_Y:\text{BitDepth}_C$  (8-275)

3. [[The list levelScale[ ] is specified as levelScale[k]= {40, 45, 51, 57, 64, 72} with k=0 ... ]]

4. The following applies:

[[tmpVal=(PaletteEscapeVal[cIdx][xCb+xL][yCb+yL]
*levelScale[qP%6])<<(qP/6)+32)>>6  (8-276)]]

{{T is set equal to (internal_bit_depth−input_bit_depth) for component cIdx

Nbits=max(T,(qP−4)/6)

If Nbits is equal to T recSamples[x][y]=PaletteEscapeVal[cIdx][xCb+xL][yCb+yL]<<Nbits Otherwise recSamples[x][y]=(PaletteEscapeVal[cIdx][xCb+xL][yCb+yL]<<Nbits)+(1<<(Nbits−1))}}

[[recSamples[x][y]=Clip3(0,(1<<bitDepth)−1,tmpVal)  (8-277)]]

When one of the following conditions is true:
cIdx is equal to 0 and numComps is equal to 1;
cIdx is equal to 2;
the variable PredictorPaletteSize[startComp] and the array PredictorPaletteEntries are derived or modified as follows:

```
for( i = 0; i < CurrentPaletteSize[ startComp ]; i++ )
  for( cIdx = startComp; cIdx < (startComp + numComps); cIdx++ )
    newPredictorPaletteEntries[ cIdx ][ i ] = CurrentPaletteEntries[ cIdx ][ i ]
newPredictorPaletteSize = CurrentPaletteSize[ startComp ]
for( i = 0; i < PredictorPaletteSize && newPredictorPaletteSize < PaletteMaxPredictorSize; i++ )
  if( !PalettePredictorEntryReuseFlags[ i ] ) {
    for( cIdx = startComp; cIdx < (startComp + numComps); cIdx++ )        (8-278)
      newPredictorPaletteEntries[ cIdx ][ newPredictorPaletteSize ] =
        PredictorPaletteEntries[ cIdx ][ i ]
    newPredictorPaletteSize++
  }
for( cIdx = startComp; cIdx < ( startComp + numComps ); cIdx++ )
  for( i = 0; i < newPredictorPaletteSize; i++ )
    PredictorPaletteEntries[ cIdx ][ i ] = newPredictorPaletteEntries[ cIdx ][ i ]
PredictorPaletteSize[ startComp ] = newPredictorPaletteSize
```

It is a requirement of bitstream conformance that the value of PredictorPaletteSize[startComp] shall be in the range of 0 to PaletteMaxPredictorSize, inclusive.

5.2 Embodiment #2

This embodiment describes palette index derivation.

Palette Coding Semantics

[[The variable adjustedRefPaletteIndex is derived as follows:

```
adjustedRefPaletteIndex = MaxPaletteIndex + 1
if( PaletteScanPos > 0 ) {
  xcPrev = x0 + TraverseScanOrder[ log2CbWidth ][ log2bHeight ][ PaletteScanPos − 1 ][ 0 ]
  ycPrev = y0 + TraverseScanOrder[ log2CbWidth ][ log2bHeight ][ PaletteScanPos − 1 ][ 1 ]
  if( CopyAboveIndicesFlag[ xcPrev ][ ycPrev ] = = 0 ) {
    adjustedRefPaletteIndex = PaletteIndexMap[ xcPrev ][ ycPrev ] {        (7-157)
  }
  else {
    if( !palette_transpose_flag )
      adjustedRefPaletteIndex = PaletteIndexMap[ xC ][ yC − 1 ]
    else
      adjustedRefPaletteIndex = PaletteIndexMap[ xC − 1 ][ yC ]
  }
}
```

When CopyAboveIndicesFlag[xC][yC] is equal to 0, the variable CurrPaletteIndex is derived as follows:
   if(CurrPaletteIndex>=adjustedRefPaletteIndex)
      CurrPaletteIndex++]]

Binarization Process for Palette_Idx_Idc

Input to this process is a request for a binarization for the syntax element palette_idx_idc and the variable MaxPaletteIndex.

Output of this process is the binarization of the syntax element.

The variable cMax is derived as follows:
[[If this process is invoked for the first time for the current block,]] cMax is set equal to MaxPaletteIndex.
[[Otherwise (this process is not invoked for the first time for the current block), cMax is set equal to MaxPaletteIndex minus 1.]]

The binarization for the palette_idx_idc is derived by invoking the TB binarization process specified in clause 9.3.3.4 with cMax.

5.3 Embodiment #3

TABLE 9-77

Syntax elements and associated binarizations

| Syntax element | Process | Input parameters |
|---|---|---|
| palette_escape_val | [[EG3]] {{FL}} | {{bitDepth − (Max(QpPrimeTsMin, Qp'Y ) − 4)/6}} |

8.4.5.3 Decoding Process for Palette Mode

Inputs to this process are:
- a location (xCb, yCb) specifying the top-left luma sample of the current block relative to the top-left luma sample of the current picture,
- a variable startComp specifies the first color component in the palette table,
- a variable cIdx specifying the color component of the current block,
- two variables nCbW and nCbH specifying the width and height of the current block, respectively.

Output of this process is an array recSamples[x][y], with x=0 . . . nCbW−1, y=0 . . . nCbH−1 specifying reconstructed sample values for the block.

Depending on the value of cIdx, the variables nSubWidth and nSubHeight are derived as follows:
. . .

Otherwise (bIsEscapeSample is equal to 1 and cu_transquant_bypass_flag is equal to 0), the following ordered steps apply:

5. The quantization parameter qP is derived as follows:
If cIdx is equal to 0, $$qP=\text{Max}(0, Qp'Y) \quad (8\text{-}272)$$

Otherwise, if cIdx is equal to 1, $$qP=\text{Max}(0, Qp'Cb) \quad (8\text{-}273)$$

Otherwise (cIdx is equal to 2), $$qP=\text{Max}(0, Qp'Cr) \quad (8\text{-}274)$$

6. The variables bitDepth is derived as follows:

$$\text{bitDepth}=(cIdx==0)?\text{BitDepth}_Y: \text{BitDepth}_C \quad (8\text{-}275)$$

7. [[The list levelScale[ ] is specified as levelScale[k]= {40, 45, 51, 57, 64, 72} with k=0 . . . 5.]]
8. The following applies:

[[tmpVal=(PaletteEscapeVal[cIdx][xCb xL][yCb+yL]
   *levelScale[qP%6])<<(qP/6)+32)>>6   (8-276)]]

{{shift=(max(QpPrimeTsMin,qP)−4)/6 tmpVal=(PaletteEscapeVal[cIdx][xCb+xL][yCb+yL]
   <<shift)}}

$$\text{recSamples}[x][y]=\text{Clip3}(0,(1<<\text{bitDepth})-1,\text{tmpVal}) \quad (8\text{-}277)$$

5.4 Embodiment #4 copy_above_palette_indices_flag equal to 1 specifies that the palette index is equal to the palette index at the same location in the row above if horizontal traverse scan is used or the same location in the left column if vertical traverse scan is used. copy_above_palette_indices_flag equal to 0 specifies that an indication of the palette index of the sample is coded in the bitstream or inferred.

. . .

The variable adjustedRefPaletteIndex is derived as follows:

```
adjustedRefPaletteIndex = MaxPaletteIndex + 1
if( PaletteScanPos > 0 {{&& !palette_escape_val_present_flag}}) {
    xcPrev = x0 + TraverseScanOrder[ log2CbWidth ][ log2bHeight ][ PaletteScanPos − 1 ][ 0 ]
    ycPrev = y0 + TraverseScanOrder[ log2CbWidth ][ log2bHeight ][ PaletteScanPos − 1 ][ 1 ]
    if( CopyAboveIndicesFlag[ xcPrev ][ ycPrev ] = = 0 ) {
        adjustedRefPaletteIndex = PaletteIndexMap[ xcPrev ][ ycPrev ] {                    (7-157)
    }
```

```
    else {
      if( !palette_transpose_flag )
        adjustedRefPaletteIndex = PaletteIndexMap[ xC ][ yC − 1 ]
      else
        adjustedRefPaletteIndex = PaletteIndexMap[ xC − 1 ][ yC ]
    }
  }
}
```

When CopyAboveIndicesFlag[xC][yC] is equal to 0, the variable CurrPaletteIndex is derived as follows:

if(CurrPaletteIndex>=adjustedRefPaletteIndex) Curr-
 PaletteIndex++             (7-158)

5.5 Embodiment #5

TABLE 9-77

| Syntax elements and associated binarizations | | |
|---|---|---|
| Syntax element | Process | Input parameters |
| palette_escape_val | [[EG3]] {{FL}} | {{max(1, bitDepth − (Max(QpPrimeTsMin, Qp'Y ) − 4)/6)}} |

8.4.5.3 Decoding Process for Palette Mode
 Inputs to this process are:
  a location (xCb, yCb) specifying the top-left luma sample of the current block relative to the top-left luma sample of the current picture,
  a variable startComp specifies the first color component in the palette table,
  a variable cIdx specifying the color component of the current block,
  two variables nCbW and nCbH specifying the width and height of the current block, respectively.
 Output of this process is an array recSamples[x][y], with x=0 . . . nCbW−1, y=0 . . . nCbH−1 specifying reconstructed sample values for the block.
 Depending on the value of cIdx, the variables nSubWidth and nSubHeight are derived as follows:
. . .
 Otherwise (bIsEscapeSample is equal to 1 and cu_transquant_bypass_flag is equal to 0), the following ordered steps apply:
 9. The quantization parameter qP is derived as follows:
  If cIdx is equal to 0, $$qP=\text{Max}(0, Qp'Y) \quad (8\text{-}272)$$

Otherwise, if cIdx is equal to 1, $$qP=\text{Max}(0, Qp'Cb) \quad (8\text{-}273)$$

Otherwise (cIdx is equal to 2), $$qP=\text{Max}(0, Qp'Cr) \quad (8\text{-}274)$$

10. The variables bitDepth is derived as follows:

$$\text{bitDepth}=(cIdx==0)?\text{BitDepth}_Y:\text{BitDepth}_C \quad (8\text{-}275)$$

11. [[The list levelScale[ ] is specified as levelScale[k]= {40, 45, 51, 57, 64, 72} with k=0 . . . 5.]]
12. The following applies:

[[tmpVal=(PaletteEscapeVal[cIdx][xCb xL][yCb+yL]
 *levelScale[qP%6])<<(qP/6)+32)>>6   (8-276)]]

{{shift=min(bitDepth−1,(max(QpPrimeTsMin,qP)−
 4)/6)

tmpVal=(PaletteEscapeVal[cIdx][xCb+xL][yCb+yL]
 <<shift)}} recSamples[x][y]=Clip3(0,(1<<bitDepth)−1,tmpVal)   (8-277)

5.6 Embodiment #6

This embodiment illustrates a design to skip transform shift for transform skip, and is based on JVET-O2001-vE.
8.7.2 Scaling and Transformation Process
 Inputs to this process are:
  a luma location (xTbY, yTbY) specifying the top-left sample of the current luma transform block relative to the top-left luma sample of the current picture,
  a variable cIdx specifying the color component of the current block,
  a variable nTbW specifying the transform block width,
  a variable nTbH specifying the transform block height.
 Output of this process is the (nTbW)×(nTbH) array of residual samples resSamples[x][y] with x=0 . . . nTbW−1, y=0 . . . nTbH−1.
 The variables bitDepth, bdShift and tsShift are derived as follows:

$$\text{bitDepth}=(cIdx==0)?\text{BitDepth}_Y:\text{BitDepth}_C \quad (8\text{-}942)$$

$$\text{bdShift}=\text{Max}(20-\text{bitDepth},0) \quad (8\text{-}943)$$

[[tsShift=5+((Log 2(nTbW)+Log 2(nTbH))/2)   (8 944)]]

The variable codedCIdx is derived as follows:
 If cIdx is equal to 0 or TuCResMode[xTbY][yTbY] is equal to 0, codedCIdx is set equal to cIdx.
 Otherwise, if TuCResMode[xTbY][yTbY] is equal to 1 or 2, codedCIdx is set equal to 1.
 Otherwise, codedCIdx is set equal to 2.
The variable cSign is set equal to (1−2*slice_joint_cbcr_sign_flag).
The (nTbW)×(nTbH) array of residual samples resSamples is derived as follows:
 1. The scaling process for transform coefficients as specified in clause 8.7.3 is invoked with the transform block location (xTbY, yTbY), the transform block width nTbW and the transform block height nTbH, the color component variable cIdx being set equal to codedCIdx and the bit depth of the current color component bitDepth as inputs, and the output is an (nTbW)×(nTbH) array of scaled transform coefficients d.

2. The (nTbW)×(nTbH) array of residual samples r is derived as follows:

[[If transform_skip_flag[xTbY][yTbY] is equal to 1 and cIdx is equal to 0, the residual sample array values r[x][y] with x=0 . . . nTbW−1, y=0 . . . nTbH−1 are derived as follows:

$$r[x][y]=d[x][y]<<tsShift \quad (8\text{-}945)]]$$

[[Otherwise (transform_skip_flag[xTbY][yTbY] is equal to 0 or and cIdx is not equal to 0),]] the transformation process for scaled transform coefficients as specified in clause 8.7.4.1 is invoked with the transform block location (xTbY, yTbY), the transform block width nTbW and the transform block height nTbH, the color component variable cIdx and the (nTbW)×(nTbH) array of scaled transform coefficients d as inputs, and the output is an (nTbW)×(nTbH) array of residual samples r.

3. The intermediate residual samples res[x][y] with x=0 . . . nTbW−1, y=0 . . . nTbH−1 are derived as follows:

{{If transform_skip_flag[xTbY][yTbY] is equal to 1 and cIdx is equal to 0, the following applies:

$$res[x][y]=d[x][y]\}\}$$

{{Otherwise (transform_skip_flag[xTbY][yTbY] is equal to 0 or and cIdx is not equal to 0), the following applies:}}

$$res[x][y]=(r[x][y]+(1<<(bdShift-1)))>>bdShift \quad (8\text{-}946)$$

4. The residual samples resSamples[x][y] with x=0 . . . nTbW−1, y=0 . . . nTbH−1 are derived as follows:
If cIdx is equal to codedCIdx, the following applies:

$$resSamples[x][y]=res[x][y] \quad (8\text{-}947)$$

Otherwise, if TuCResMode[xTbY][yTbY] is equal to 2, the following applies:

$$resSamples[x][y]=cSign*res[x][y] \quad (8\text{-}948)$$

Otherwise, the following applies:

$$resSamples[x][y]=(cSign*res[x][y])>>1 \quad (8\text{-}949)$$

8.7.3 Scaling Process for Transform Coefficients
. . .
The variable rectNonTsFlag is derived as follows:

$$rect[[NonTs]]Flag=(((Log\ 2(nTbW)+Log\ 2(nTbH))\&1)==1[[\&\&]] \quad (8\text{-}955)$$

[[transform_skip_flag[*xTbY*][*yTbY*]==]]=0)

The variables bdShift, rectNorm and bdOffset are derived as follows:

{{If transform_skip_flag[xTbY][yTbY] is equal to 1 and cIdx is equal to 0, the following applies: bdShift=10}}
{{Otherwise, the following applies:}}

$$bdShift=bitDepth+((rect[[NonTs]]Flag?1:0)+(Log\ 2(nTbW)+Log\ 2(nTbH))/2)-5+dep\_quant\_enabled\_flag \quad (8\text{-}956)$$

$$bdOffset=(1<<bdShift)>>1 \quad (8\text{-}957)$$

The list levelScale[ ][ ] is specified as levelScale[j][k]= {{40, 45, 51, 57, 64, 72}, {57, 64, 72, 80, 90, 102}} with j=0 . . . 1, k=0 . . . 5.

The (nTbW)×(nTbH) array dz is set equal to the (nTbW)×(nTbH) array TransCoeffLevel[xTbY][yTbY][cIdx].

For the derivation of the scaled transform coefficients d[x][y] with x=0 . . . nTbW−1, y=0 . . . nTbH−1, the following applies:

The intermediate scaling factor m[x][y] is derived as follows:
If one or more of the following conditions are true, m[x][y] is set equal to 16:
sps_scaling_list_enabled_flag is equal to 0.
transform_skip_flag[xTbY][yTbY] is equal to 1.
Otherwise, the following applies:

$$m[x][y]=ScalingFactor[Log\ 2(nTbW)][Log\ 2(nTbH)][matrixId][x][y],\ \text{with matrixId as specified in Table 7-5} \quad (8\text{-}958)$$

The scaling factor ls[x][y] is derived as follows:
If dep_quant_enabled_flag is equal to 1, the following applies:

$$ls[x][y]=(m[x][y]*levelScale[rect[[NonTs]]Flag][(qP+1)\%6])<<((qP+1)/6) \quad (8\text{-}959)$$

Otherwise (dep_quant_enabled_flag is equal to 0), the following applies:

$$ls[x][y]=(m[x][y]*levelScale[rect[[NonTs]]Flag][qP\%6])<<(qP/6) \quad (8\text{-}960)$$

When BdpcmFlag[xTbY][yYbY] is equal to 1, dz[x][y] is modified as follows:
If BdpcmDir[xTbY][yYbY] is equal to 0 and x is greater than 0, the following applies:

$$dz[x][y]=Clip3(CoeffMin,CoeffMax,dz[x-1][y]+dz[x][y]) \quad (8\text{-}961)$$

Otherwise, if BdpcmDir[xTbY][yYbY] is equal to 1 and y is greater than 0, the following applies:

$$dz[x][y]=Clip3(CoeffMin,CoeffMax,dz[x][y-1]+dz[x][y]) \quad (8\text{-}962)$$

The value dnc[x][y] is derived as follows:

$$dnc[x][y]=(dz[x][y]*ls[x][y]+bdOffset)>>bdShift \quad (8\text{-}963)$$

The scaled transform coefficient d[x][y] is derived as follows:

$$d[x][y]=Clip3(CoeffMin,CoeffMax,dnc[x][y]) \quad (8\text{-}964)$$

5.7 Embodiment #7

This embodiment illustrates a design to signal the number of palette indices.
7.3.8.6 Palette Coding Syntax

| | Descriptor |
|---|---|
| palette_coding( x0, y0, cbWidth, cbHeight, startComp, numComps ) { | |
| ... | |
| if( MaxPaletteIndex > 0 ) { | |
| num_palette_indices{{_diff} }[_minus1]] | ae(v) |
| adjust = 0 | |

-continued

|  | Descriptor |
|---|---|
| ``for( i = 0; i <= [[num_palette_indices_minus1]]{{NumPaletteIndices}}; i++ ) {`` | |
| ``    if( MaxPaletteIndex - adjust > 0 ) {`` | |
| ``        palette_idx_idc`` | ae(v) |
| ``        PaletteIndexIdc[ i ] = palette_idx_idc`` | |
| ``    }`` | |
| ``    adjust = 1`` | |
| ``}`` | |
| ``copy_above_indices_for_final_run_flag`` | ae(v) |
| ``palette_transpose_flag`` | ae(v) |
| ``}`` | |
| ``if( treeType != DUAL_TREE_CHROMA && palette_escape_val_present_flag ) {`` | |
| ``    if( cu_qp_delta_enabled_flag && !IsCuQpDeltaCoded ) {`` | |
| ``        cu_qp_delta_abs`` | ae(v) |
| ``        if( cu_qp_delta_abs )`` | |
| ``            cu_qp_delta_sign_flag`` | ae(v) |
| ``    }`` | |
| ``}`` | |
| ``if( treeType != DUAL_TREE_LUMA && palette_escape_val_present_flag ) {`` | |
| ``    if( cu_chroma_qp_offset_enabled_flag && !IsCuChromaQpOffsetCoded ) {`` | |
| ``        cu_chroma_qp_offset_flag`` | ae(v) |
| ``        if( cu_chroma_qp_offset_flag )`` | |
| ``            cu_chroma_qp_offset_idx`` | ae(v) |
| ``    }`` | |
| ``}`` | |
| ``remainingNumIndices = [[num_palette_indices_minus1 + 1]]{{NumPaletteIndices}})`` | |
| ... | |
| ``    if ( CopyAboveIndicesFlag[ xC ][ yC ] = = 0 ) {`` | |
| ``        currNumIndices = [[num_palette_indices_minus1 + 1]]{{NumPaletteIndices}} - remainingNumIndices`` | |
| ``        PaletteIndexMap[ xC ][ yC ] = PaletteIndexIdc[ currNumIndices ]`` | |
| ``    }`` | |
| ... | |
| ``}`` | | num_palette_indices{{_diff}}[[_minus1]] plus [[1]] ({{MaxPaletteIndex+1}}) is the number of palette indices explicitly signalled or inferred for the current block.

{{NumPaletteIndices is set to (num_palette_indices_diff+MaxPaletteIndex+1).}}

When num_palette_indices{{_diff}}[[_minus1]] is not present, it is inferred to be equal to 0.

{{The value of num_palette_indices_diff shall be in the range of 0 to cbWidth*cbHeight−(MaxPaletteIndex+1) inclusive.}} copy_above_indices_for_final_run_flag equal to 1 specifies that the palette indices of the last positions in the coding unit are copied from the palette indices in the row above if horizontal traverse scan is used or the palette indices in the left column if vertical traverse scan is used. copy_above_indices_for_final_run_flag equal to 0 specifies that the palette indices of the last positions in the coding unit are copied from PaletteIndexIdc[[[num_palette_indices_minus1]] {{NumPaletteIndices−1}}].

9.5.3.13 Binarization Process for Num_Palette_Indices{{_Diff}}[[_minus1]]

Input to this process is a request for a binarization for the syntax element num_palette_indices{{_diff}}[[_minus1]], and MaxPaletteIndex.

Output of this process is the binarization of the syntax element.

The variables cRiceParam is derived as follows:

$$cRiceParam = 3 + ((MaxPaletteIndex+1) >> 3) \quad (9\text{-}26)$$

The variable cMax is derived from cRiceParam as:

$$cMax = 4 <<< cRiceParam \quad (9\text{-}27)$$

The binarization of the syntax element num_palette_indices{{_diff}}[[_minus1]] is a concatenation of a prefix bin string and (when present) a suffix bin string.

For the derivation of the prefix bin string, the following applies:

The prefix value of num_palette_indices{{_diff}}[[_minus1]], prefixVal, is derived as follows:

$$prefixVal = Min(cMax, num\_palette\_indices\{\{\_diff\}\}[[\_minus1]]) \quad (9\text{-}28)$$

The prefix bin string is specified by invoking the TR binarization process as specified in clause 9.3.3.3 for prefixVal with the variables cMax and cRiceParam as inputs.

When the prefix bin string is equal to the bit string of length 4 with all bits equal to 1, the suffix bin string is present and it is derived as follows:

The suffix value of num_palette_indices{{_diff}}[[_minus1]], suffixVal, is derived as follows:

$$suffixVal = num\_palette\_indices\{\{\_diff\}\}[[\_minus1]] - cMax \quad (9\text{-}29)$$

The suffix bin string is specified by invoking the k-th order EGk binarization process as specified in clause 9.3.3.5 for the binarization of suffixVal with the Exp-Golomb order k set equal to cRiceParam+1.

TABLE 9-77

| | Syntax elements and associated binarizations | | |
|---|---|---|---|
| Syntax structure | Syntax element | Binarization Process | Input parameters |
| palette_coding( ) | num_palette_indices{{_diff}[[_minus1]] | 9.5.3.13 | MaxPaletteIndex |

TABLE 9-82

| | Assignment of ctxInc to syntax elements with context coded bins | | | | | |
|---|---|---|---|---|---|---|
| | binIdx | | | | | |
| Syntax element | 0 | 1 | 2 | 3 | 4 | >=5 |
| num_palette_indices{{_diff}}[[_minus1]] | bypass | bypass | bypass | bypass | bypass | bypass |

5.8 Embodiment #8

This embodiment illustrates a design of interleaved signalling in the line based CG palette mode.

The embodiment is based on the draft provided in JVET-P2001-v4.

| | Descriptor |
|---|---|
| palette_coding( x0, y0, cbWidth, cbHeight, startComp, numComps ) { | |
|  palettePredictionFinished = 0 | |
|  ... | |
|  PreviousRunPosition = 0 | |
|  PreviousRunType = 0 | |
|  for( subSetId = 0; subSetId <= ( cbWidth * cbHeight − 1 ) / 16; subSetId++ ) { | |
|   minSubPos = subSetId * 16 | |
|   if( minSubPos + 16 > cbWidth * cbHeight) | |
|    maxSubPos = cbWidth * cbHeight | |
|   else | |
|    maxSubPos = minSubPos + 16 | |
|   RunCopyMap[ x0 ][ y0 ] = 0 | |
|   PaletteScanPos = minSubPos | |
|   log2CbWidth = Log2( cbWidth ) | |
|   log2CbHeight = Log2( cbHeight ) | |
|   while( PaletteScanPos < maxSubPos ) { | |
|    xC = x0 + TraverseScanOrder[ log2CbWidth ][ log2CbHeight ][ PaletteScanPos ][ 0 ] | |
|    yC = y0 + TraverseScanOrder[ log2CbWidth ][ log2CbHeight ][ PaletteScanPos ][ 1 ] | |
|    if( PaletteScanPos > 0 ) { | |
|     xcPrev = x0 + TraverseScanOrder[ log2CbWidth ][ log2CbHeight ][ PaletteScanPos − 1 ][ 0 ] | |
|     ycPrev = y0 + TraverseScanOrder[ log2CbWidth ][ log2CbHeight ][ PaletteScanPos − 1 ][ 1 ] | |
|    } | |
|    if ( MaxPaletteIndex > 0 && PaletteScanPos > 0 ) { | |
|     run_copy_flag | ae(v) |
|     RunCopyMap[ xC ][ yC ] = run_copy_flag | |
|    } | |
|    CopyAboveIndicesFlag[ xC ][ yC ] = 0 | |
|    if( MaxPaletteIndex > 0 && !RunCopyMap[ xC ][ yC ] ) { | |
|     if( ( ( !palette_transpose_flag && yC > 0 ) || ( palette_transpose_flag && xC > 0 ) ) | |
|      && CopyAboveIndicesFlag[ xcPrev ][ ycPrev ] = = 0 ) { | |
|      copy_above_palette_indices_flag | ae(v) |
|      CopyAboveIndicesFlag[ xC ][ yC ] = copy_above_palette_indices_flag | |
|     } | |
|     PreviousRunType = CopyAboveIndicesFlag[ xC ][ yC ] | |
|     PreviousRunPosition = curPos | |
|    } else { | |
|     CopyAboveIndicesFlag[ xC ][ yC ] = CopyAboveIndicesFlag[ xcPrev ][ ycPrev ] | |
|    } | |
| {{ if( MaxPaletteIndex > 0 ) { | |
|    if ( !RunCopyMap[ xC ][ yC ] && CopyAboveIndicesFlag[ xC ][ yC ] = = 0 ) { | |

| | Descriptor |
|---|---|
| ```
            if( MaxPaletteIndex − adjust > 0 ) {
                palette_idx_idc
            }
            adjust = 1
        }
    }
    if( !RunCopyMap[ xC ][ yC ] && CopyAboveIndicesFlag[ xC ][ yC ] = = 0 ) {
        CurrPaletteIndex = palette_idx_idc
        if( CopyAboveIndicesFlag[ xC ][ yC ] = = 0 ) {
            PaletteIndexMap[ xC ][ yC ] = CurrPaletteIndex
        } else {
            if( !palette_transpose_flag )
                PaletteIndexMap[ xC ][ yC ] = PaletteIndexMap[ xC ][ yC − 1 ]
            else
                PaletteIndexMap[ xC ][ yC ] = PaletteIndexMap[ xC − 1 ][ yC ]
        }
    }
    if( palette_escape_val_present_flag ) {
        for( cIdx = startComp; cIdx < ( startComp + numComps ); cIdx++ ){
            xC = x0 + TraverseScanOrder[ log2CbWidth ][ log2CbHeight ][ sPos ][ 0 ]
            yC = y0 + TraverseScanOrder[ log2CbWidth ][ log2CbHeight ][ sPos ][ 1 ]
            if( PaletteIndexMap[ cIdx ][ xC ][ yC ] = = MaxPaletteIndex ) {
                palette_escape_val
                PaletteEscapeVal[ cIdx ][ xC ][ yC ] = palette_escape_val
            }
        }
    } }}
    PaletteScanPos ++
}
[[PaletteScanPos = minSubPos
while( PaletteScanPos < maxSubPos ) {
    xC = x0 + TraverseScanOrder[ log2CbWidth ][ log2CbHeight ][ PaletteScanPos ][ 0 ]
    yC = y0 + TraverseScanOrder[ log2CbWidth ][ log2CbHeight ][ PaletteScanPos ][ 1 ]
    if( PaletteScanPos > 0 ) {
        xcPrev                                  =x0 +
TraverseScanOrder[ log2CbWidth ][ log2CbHeight ][ PaletteScanPos − 1 ][ 0 ]
        ycPrev                =                 y0 +
TraverseScanOrder[ log2CbWidth ][ log2CbHeight ][ PaletteScanPos − 1 ][ 1 ]
    }
    if( MaxPaletteIndex > 0 ) {
        if ( !RunCopyMap[ xC ][ yC ] && CopyAboveIndicesFlag[ xC ][ yC ] = = 0 ) {
            if( MaxPaletteIndex − adjust > 0 ) {
                palette_idx_idc
            }
            adjust = 1
        }
    }
    if( !RunCopyMap[ xC ][ yC ] && CopyAboveIndicesFlag[ xC ][ yC ] = = 0 ) {
        CurrPaletteIndex = palette_idx_idc
        if( CopyAboveIndicesFlag[ xC ][ yC ] = = 0 ) {
            PaletteIndexMap[ xC ][ yC ] = CurrPaletteIndex
        } else {
            if( !palette_transpose_flag )
                PaletteIndexMap[ xC ][ yC ] = PaletteIndexMap[ xC ][ yC − 1 ]
            else
                PaletteIndexMap[ xC ][ yC ] = PaletteIndexMap[ xC − 1 ][ yC ]
        }
    }
    if( palette_escape_val_present_flag ) {
        for( cIdx = startComp; cIdx < ( startComp + numComps ); cIdx++ )
            for( sPos = minSubPos; sPos < maxSubPos; sPos++ ) {
                xC = x0 + TraverseScanOrder[ log2CbWidth ][ log2CbHeight ][ sPos ][ 0 ]
                yC = y0 + TraverseScanOrder[ log2CbWidth ][ log2CbHeight ][ sPos ][ 1 ]
                if( PaletteIndexMap[ cIdx ][ xC ][ yC ] = = MaxPaletteIndex ) {
                    palette_escape_val
                    PaletteEscapeVal[ cIdx ][ xC ][ yC ] = palette_escape_val
                }
            }
    }
}]]
}
``` | {{ae(v)}}<br><br><br><br><br><br><br><br><br><br><br><br><br><br><br><br>ae(v)<br><br><br><br><br><br><br><br><br><br><br><br><br><br><br><br><br><br>[[ae(v)]]<br><br><br><br><br><br><br><br><br><br><br><br><br><br><br>[[ae(v)]] |

5.9 Embodiment #9

The changes are based on JVET-P2001-vE.
8.4.5.3 Decoding Process for Palette Mode
Inputs to this process are:
  a location (xCbComp, yCbComp) specifying the top-left sample of the current coding block relative to the top-left sample of the current picture,
  a variable treeType specifying whether a single or a dual tree is used and if a dual tree is used, it specifies whether the current tree corresponds to the luma or chroma components,
  a variable cIdx specifying the color component of the current block,
  two variables nCbW and nCbH specifying the width and height of the current coding block, respectively.

Output of this process is an array recSamples[x][y], with x=0 . . . nCbW−1, y=0 . . . nCbH−1 specifying reconstructed sample values for the block.

Depending on the value of treeType, the variables startComp and numComps are derived as follows:
  If treeType is equal to SINGLE_TREE:

$$startComp=0 \qquad (444)$$

$$numComps=3 \qquad (445)$$

Otherwise, treeType is equal to DUAL_TREE_LUMA:

$$startComp=0 \qquad (446)$$

$$numComps=1 \qquad (447)$$

Otherwise, treeType is equal to DUAL_TREE_CHROMA:

$$startComp=1 \qquad (448)$$

$$numComps=2 \qquad (449)$$

Depending on the value of cIdx, the variables nSubWidth and nSubHeight are derived as follows:
  If cIdx is greater than 0 and startComp is equal to 0, nSubWidth is set to SubWidthC and nSubHeight is set to SubHeightC.
  Otherwise, nSubWidth is set to 1 and nSubHeight is set to 1.

The (nCbW×nCbH) block of the reconstructed sample array recSamples at location (xCbComp, yCbComp) is represented by recSamples[x][y] with x=0 . . . nCTbW−1 and y=0 . . . nCbH−1, and the value of recSamples[x][y] for each x in the range of 0 to nCbW−1, inclusive, and each y in the range of 0 to nCbH−1, inclusive, is derived as follows:
  The variables xL, yL, xCbL, and yCbL are derived as follows:

$$xL=x*nSubWidth \qquad (450)$$

$$yL=y*nSubHeight \qquad (451)$$

$$xCbL=xCbComp*nSubWidth \qquad (452)$$

$$yCbL=yCbComp*nSubHeight \qquad (453)$$

The variable bIsEscapeSample is derived as follows:
  If PaletteIndexMap[xCbL+xL][yCbL+yL] is equal to MaxPaletteIndex and palette_escape_val_present_flag is equal to 1, bIsEscapeSample is set equal to 1. Otherwise, bIsEscapeSample is set equal to 0.
  If bIsEscapeSample is equal to 0, the following applies:

$$recSamples[x][y]=CurrentPaletteEntries[cIdx][PaletteIndexMap[xCbL+xL][yCbL+yL]] \qquad (454)$$

Otherwise (bIsEscapeSample is equal to 1), the following ordered steps apply:
  1. The quantization parameter qP is derived as follows:
    If cIdx is equal to 0, $$qP=\text{Max}(QpPrimeTsMin,Qp'Y) \qquad (455)$$

Otherwise, if cIdx is equal to 1, $$qP=\text{Max}(QpPrimeTsMin,Qp'Cb) \qquad (456)$$

Otherwise (cIdx is equal to 2), $$qP=\text{Max}(QpPrimeTsMin,Qp'Cr) \qquad (457)$$

2. The list levelScale[ ] is specified as levelScale[k]={40, 45, 51, 57, 64, 72} with k=0 . . . 5.
  3. The following applies:

$$\{\{shift=\text{Min}(bitDepth-1,(QpPrimeTsMin-4)/6)\}\}$$

$$[[tmpVal=(PaletteEscapeVal[cIdx][xCbL+xL][yCbL+yL]*levelScale[qP\%6])<<(qP/6)+32)>>6 \qquad (458)]]$$

$$\{\{tmpVal=((PaletteEscapeVal[cIdx][xCbL+xL][yCbL+yL]<<shift)*levelScale[(qP-QpPrimeTsMin+4)\%6])<<((qP-QpPrimeTsMin+4)/6)+32)>>6 \qquad (458)\}\}$$

$$recSamples[x][y]=\text{Clip3}(0,(1<<BitDepth)-1,tmpVal) \qquad (459)$$

5.10 Embodiment #10

The changes are based on JVET-P2001-vE.
8.4.5.3 Decoding Process for Palette Mode
Inputs to this process are:
  a location (xCbComp, yCbComp) specifying the top-left sample of the current coding block relative to the top-left sample of the current picture,
  a variable treeType specifying whether a single or a dual tree is used and if a dual tree is used, it specifies whether the current tree corresponds to the luma or chroma components,
  a variable cIdx specifying the color component of the current block,
  two variables nCbW and nCbH specifying the width and height of the current coding block, respectively.

Output of this process is an array recSamples[x][y], with x=0 . . . nCbW−1, y=0 . . . nCbH−1 specifying reconstructed sample values for the block.

Depending on the value of treeType, the variables startComp and numComps are derived as follows:
  If treeType is equal to SINGLE_TREE:

$$startComp=0 \qquad (444)$$

$$numComps=3 \qquad (445)$$

Otherwise, treeType is equal to DUAL_TREE_LUMA:

$$startComp=0 \qquad (446)$$

$$numComps=1 \qquad (447)$$

Otherwise, treeType is equal to DUAL_TREE_CHROMA:

$$startComp=1 \qquad (448)$$

$$numComps=2 \qquad (449)$$

Depending on the value of cIdx, the variables nSubWidth and nSubHeight are derived as follows:
  If cIdx is greater than 0 and startComp is equal to 0, nSubWidth is set to SubWidthC and nSubHeight is set to SubHeightC.
  Otherwise, nSubWidth is set to 1 and nSubHeight is set to 1.

The (nCbW x nCbH) block of the reconstructed sample array recSamples at location (xCbComp, yCbComp) is represented by recSamples[x][y] with x=0 . . . nCTbW−1 and y=0 . . . nCbH−1, and the value of recSamples[x][y] for each x in the range of 0 to nCbW−1, inclusive, and each y in the range of 0 to nCbH−1, inclusive, is derived as follows:
  The variables xL, yL, xCbL, and yCbL are derived as follows:

$$xL = x * nSubWidth \quad (450)$$

$$yL = y * nSubHeight \quad (451)$$

$$xCbL = xCbComp * nSubWidth \quad (452)$$

$$yCbL = yCbComp * nSubHeight \quad (453)$$

The variable bIsEscapeSample is derived as follows:
  If PaletteIndexMap[xCbL+xL][yCbL+yL] is equal to MaxPaletteIndex and palette_escape_val_present_flag is equal to 1, bIsEscapeSample is set equal to 1.
  Otherwise, bIsEscapeSample is set equal to 0.

If bIsEscapeSample is equal to 0, the following applies:

$$recSamples[x][y] = CurrentPaletteEntries[cIdx][PaletteIndexMap[xCbL+xL][yCbL+yL]] \quad (454)$$

Otherwise (bIsEscapeSample is equal to 1), the following ordered steps apply:
4. The quantization parameter qP is derived as follows:
  If cIdx is equal to 0, $$qP = Max(QpPrimeTsMin, Qp'Y) \quad (455)$$

Otherwise, if cIdx is equal to 1, $$qP = Max(QpPrimeTsMin, Qp'Cb) \quad (456)$$

Otherwise (cIdx is equal to 2), $$qP = Max(QpPrimeTsMin, Qp'Cr) \quad (457)$$

5. The list levelScale[ ] is specified as levelScale[k]={40, 45, 51, 57, 64, 72} with k=0 . . . 5.
6. The following applies:

$$\{\{shift = Min(bitDepth-1, (QpPrimeTsMin-4)/6)\}\}$$

$$[[tmpVal = (PaletteEscapeVal[cIdx][xCbL+xL][yCbL+yL] * levelScale[qP\%6]) <<< (qP/6) + 32) >> 6 \quad (458)]]$$

$$\{\{qP' = Max(0, qP - 6*shift)$$

$$tmpVal = ((PaletteEscapeVal[cIdx][xCbL+xL][yCbL+yL] <<< shift) * levelScale[qP'\%6]) <<< (qP'/6) + 32) >> 6 \quad (458)\}\}$$

$$recSamples[x][y] = Clip3(0, (1<<BitDepth)-1, tmpVal) \quad (459)$$

Figure 9:
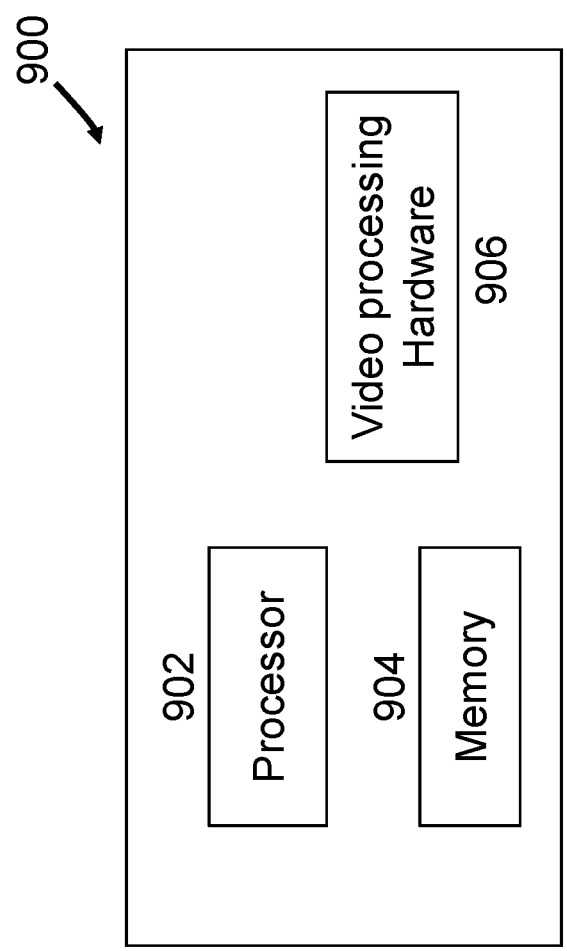
FIG. 9 is a block diagram of an example of a hardware platform used for implementing techniques described in the present document.

FIG. 9 is a block diagram of a video processing apparatus 900. The apparatus 900 may be used to implement one or more of the methods described herein. The apparatus 900 may be embodied in a smartphone, tablet, computer, Internet of Things (IoT) receiver, and so on. The apparatus 900 may include one or more processors 902, one or more memories 904 and video processing hardware 906. The processor(s) 902 may be configured to implement one or more methods described in the present document. The memory (memories) 904 may be used for storing data and code used for implementing the methods and techniques described herein. The video processing hardware 906 may be used to implement, in hardware circuitry, some techniques described in the present document. In some embodiments, the hardware 906 may be at least partly internal to the processor 902, e.g., a graphics co-processor.

Some embodiments of the present disclosure include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the present disclosure include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 10:
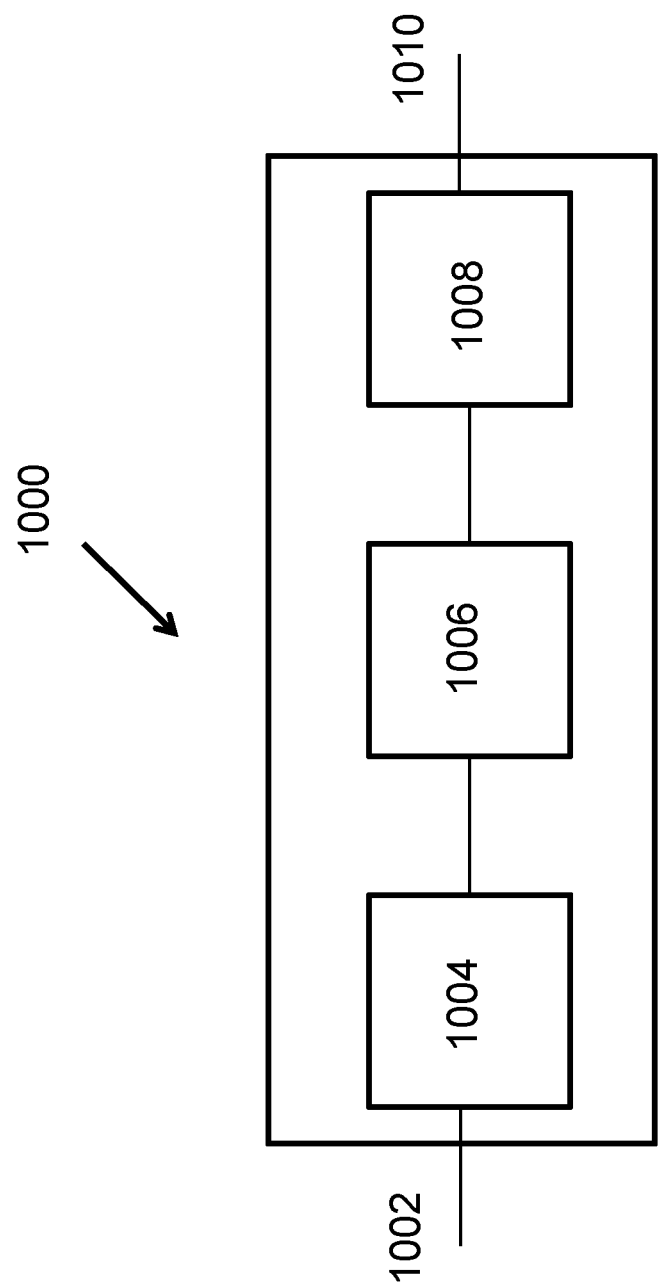
FIG. 10 is a block diagram of an example video processing system in which disclosed techniques may be implemented.

FIG. 10 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8- or 10-bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1000 may include a coding component 1004 that may implement the various coding or encoding methods described in the present document. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The techniques described in the present document may be embodied in various electronic devices such as mobile phones, laptops, smartphones or other devices that are capable of performing digital data processing and/or video display.

Figure 11:
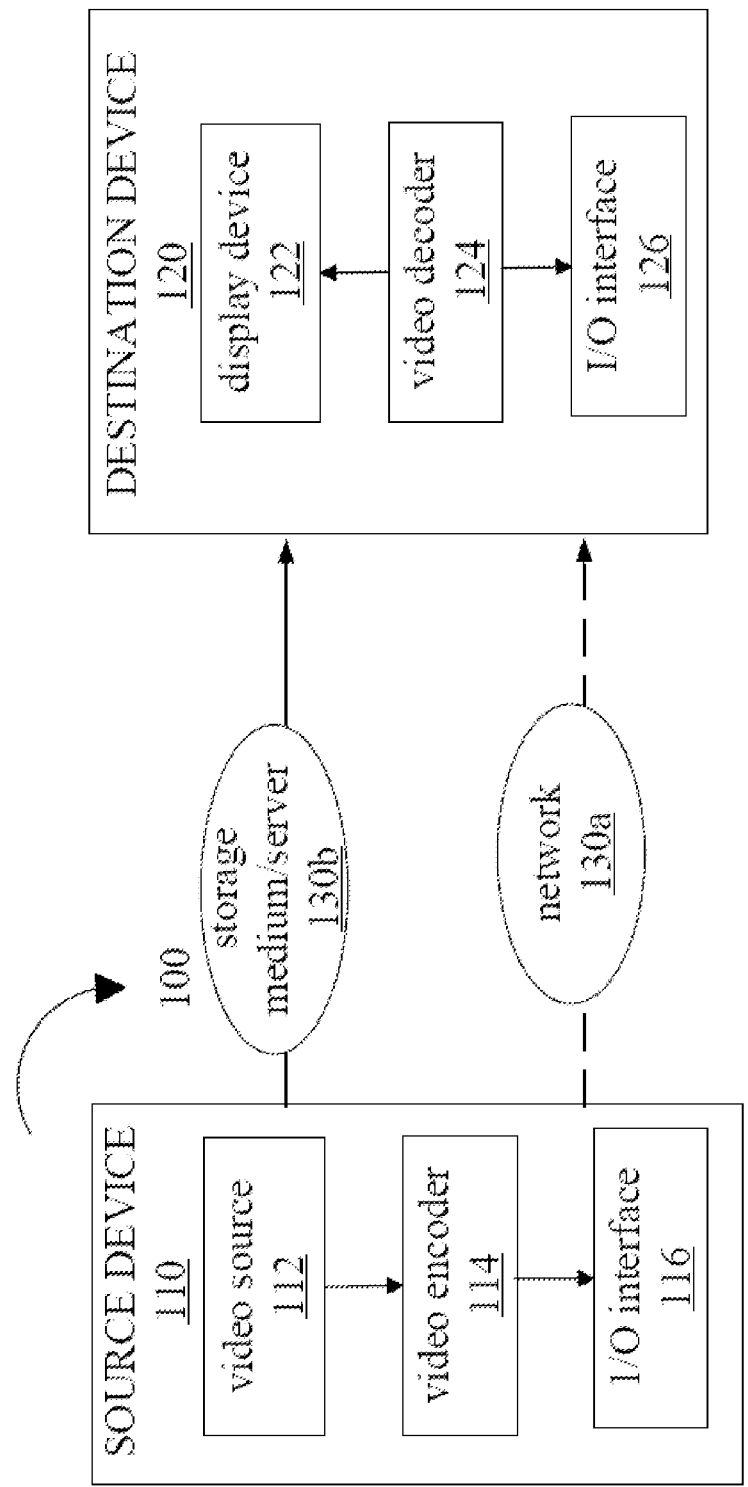
FIG. 11 is a block diagram that illustrates a video coding system in accordance with some embodiments of the present disclosure.

FIG. 11 is a block diagram that illustrates an example video coding system 100 that may utilize the techniques of this disclosure.

As shown in FIG. 11, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the HEVC standard, VVC standard and other current and/or further standards.

Figure 12:
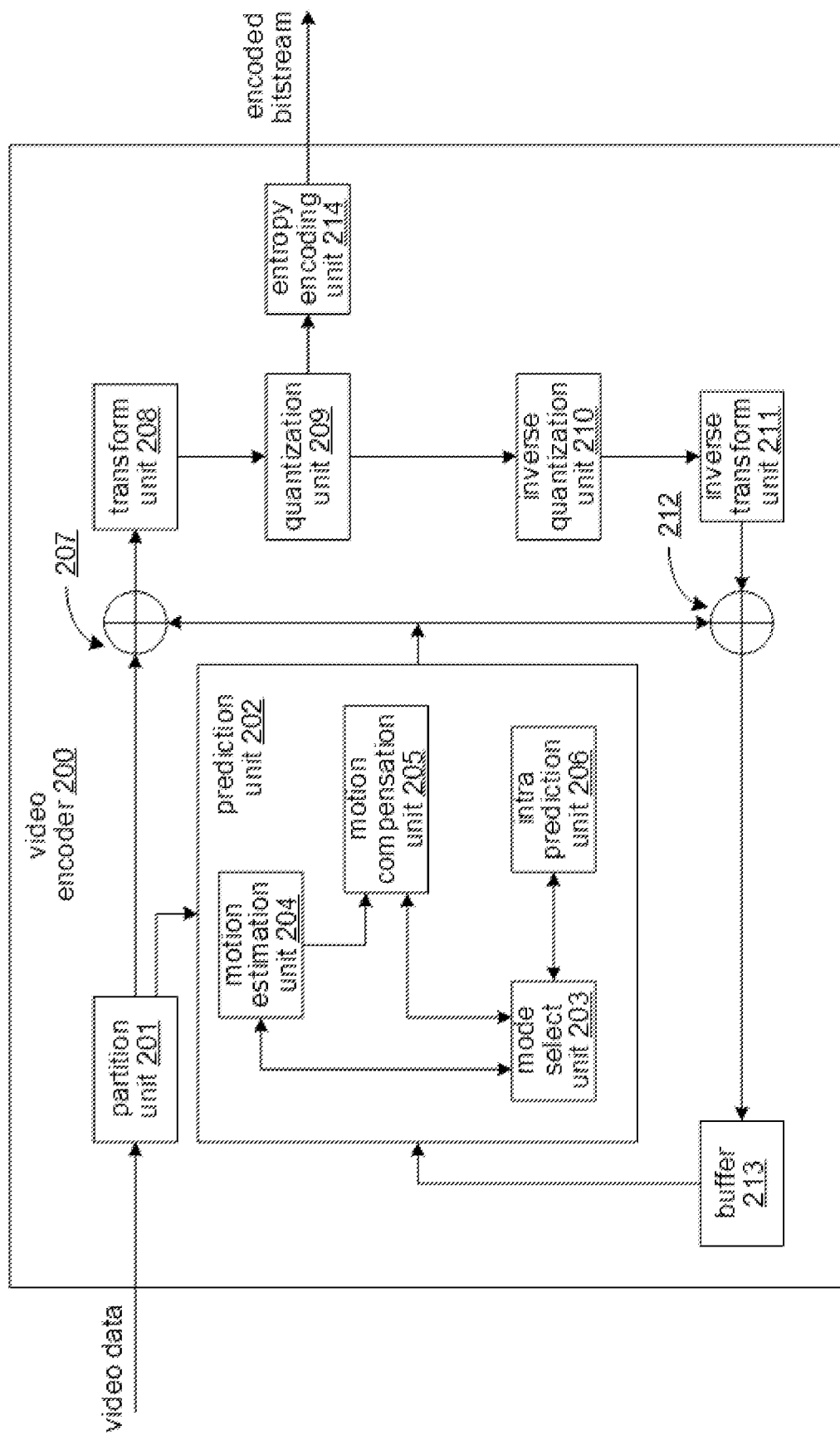
FIG. 12 is a block diagram that illustrates an encoder in accordance with some embodiments of the present disclosure.

FIG. 12 is a block diagram illustrating an example of video encoder 200, which may be video encoder 114 in the system 100 illustrated in FIG. 11.

Video encoder 200 may be configured to perform any or all of the techniques of this disclosure. In the example of FIG. 12, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 12 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 13:
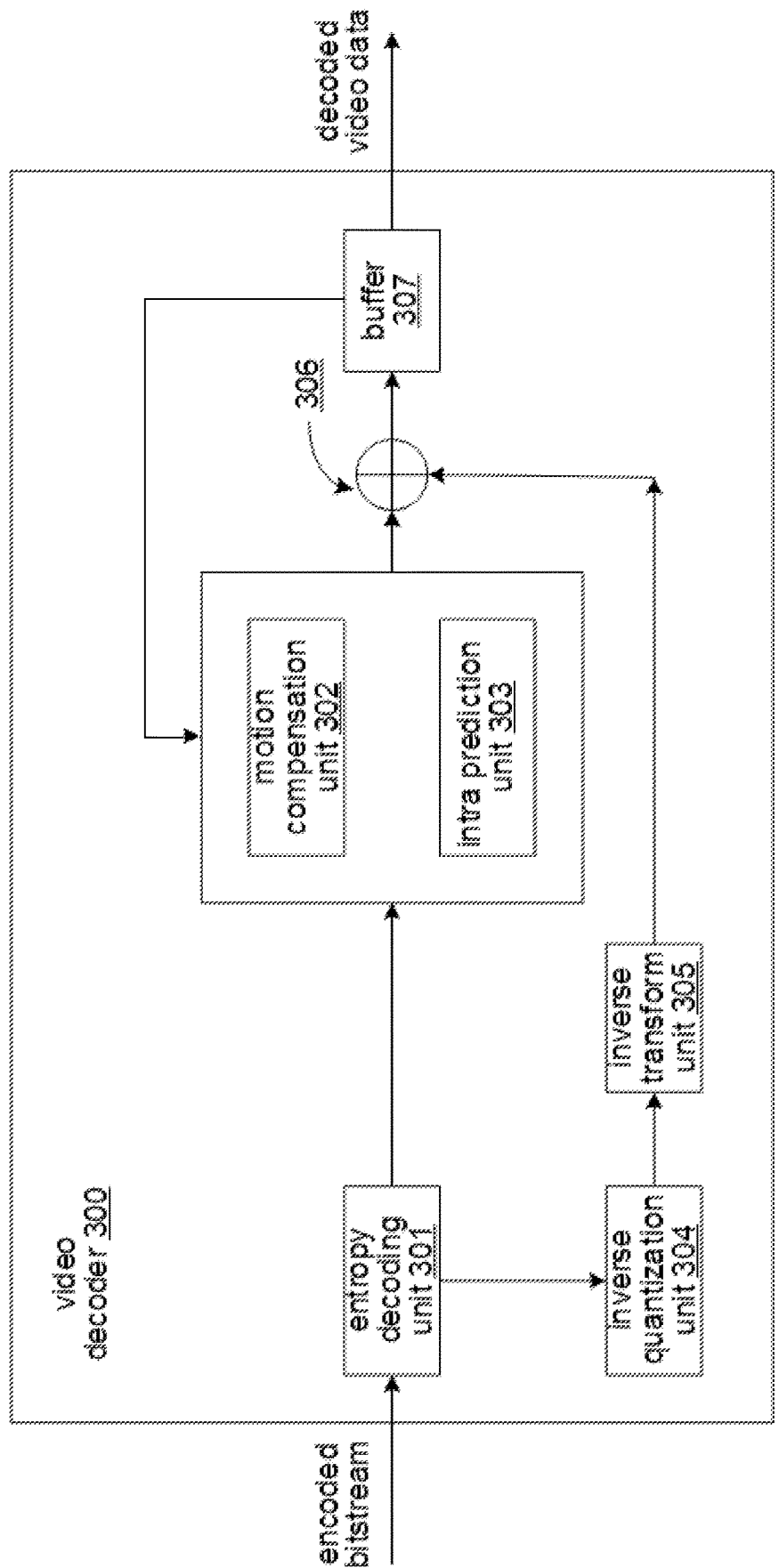
FIG. 13 is a block diagram that illustrates a decoder in accordance with some embodiments of the present disclosure.

FIG. 13 is a block diagram illustrating an example of video decoder 300 which may be video decoder 124 in the system 100 illustrated in FIG. 11.

The video decoder 300 may be configured to perform any or all of the techniques of this disclosure. In the example of FIG. 13, the video decoder 300 includes a plurality of functional components. The techniques described in this disclosure may be shared among the various components of the video decoder 300. In some examples, a processor may be configured to perform any or all of the techniques described in this disclosure.

In the example of FIG. 13, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (FIG. 12).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

In some embodiments, the following methods are based on the listing of examples and embodiments enumerated above. In an example, these methods can be implemented using, but not limited to, the implementations shown in FIG. 9-13.

Figure 14:
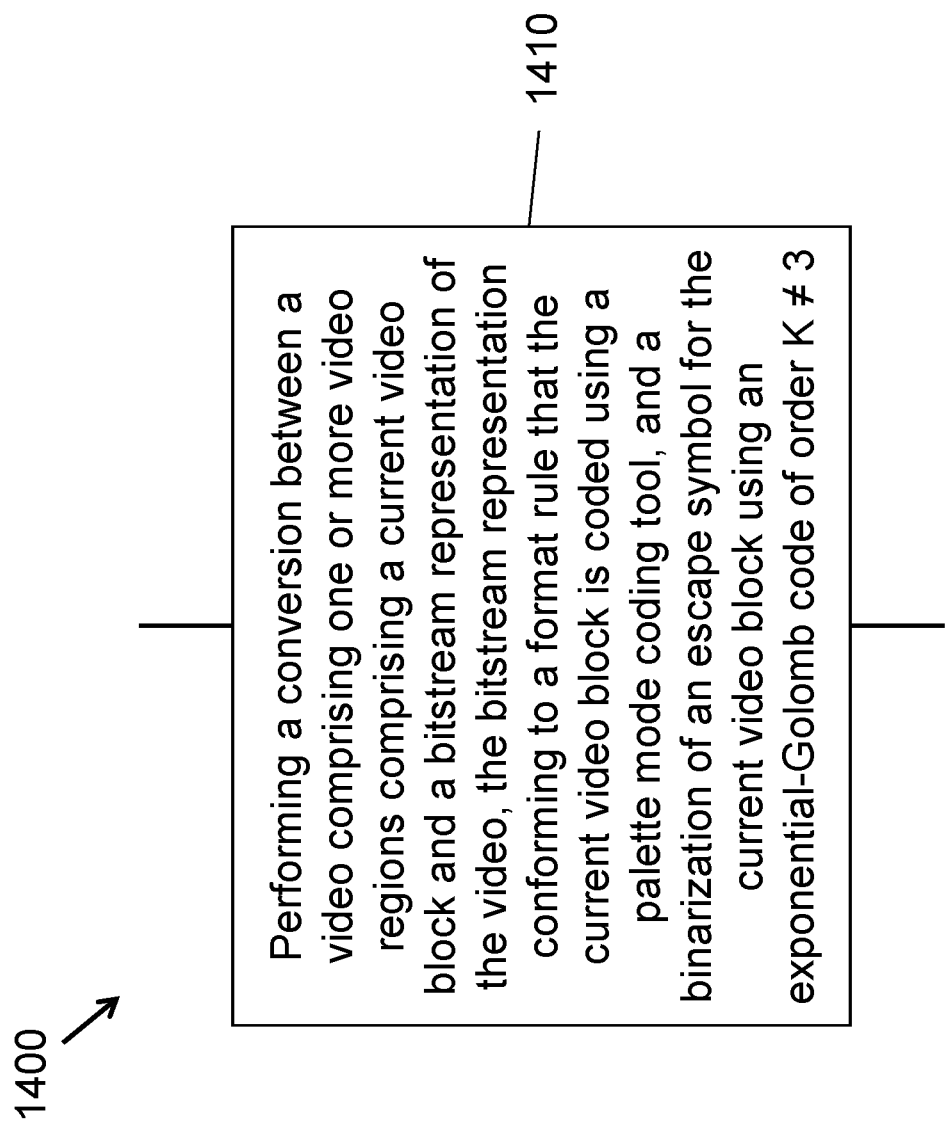

FIG. 14 is a flowchart of an example method for video processing. As shown therein, the method 1400 includes performing a conversion between a video comprising one or more video regions comprising a current video block and a bitstream representation of the video (1410), wherein the bitstream representation conforms to a format rule that the current video block is coded using a palette mode coding tool, wherein a binarization of an escape symbol for the current video block uses an exponential-Golomb (EG) code of order K, wherein K is a non-negative integer that is unequal to three, and wherein the palette mode coding tool represents the current video block using a palette of representative color values and wherein the escape symbol is used for a sample of the current video block coded without using the representative color values.

Figure 15:
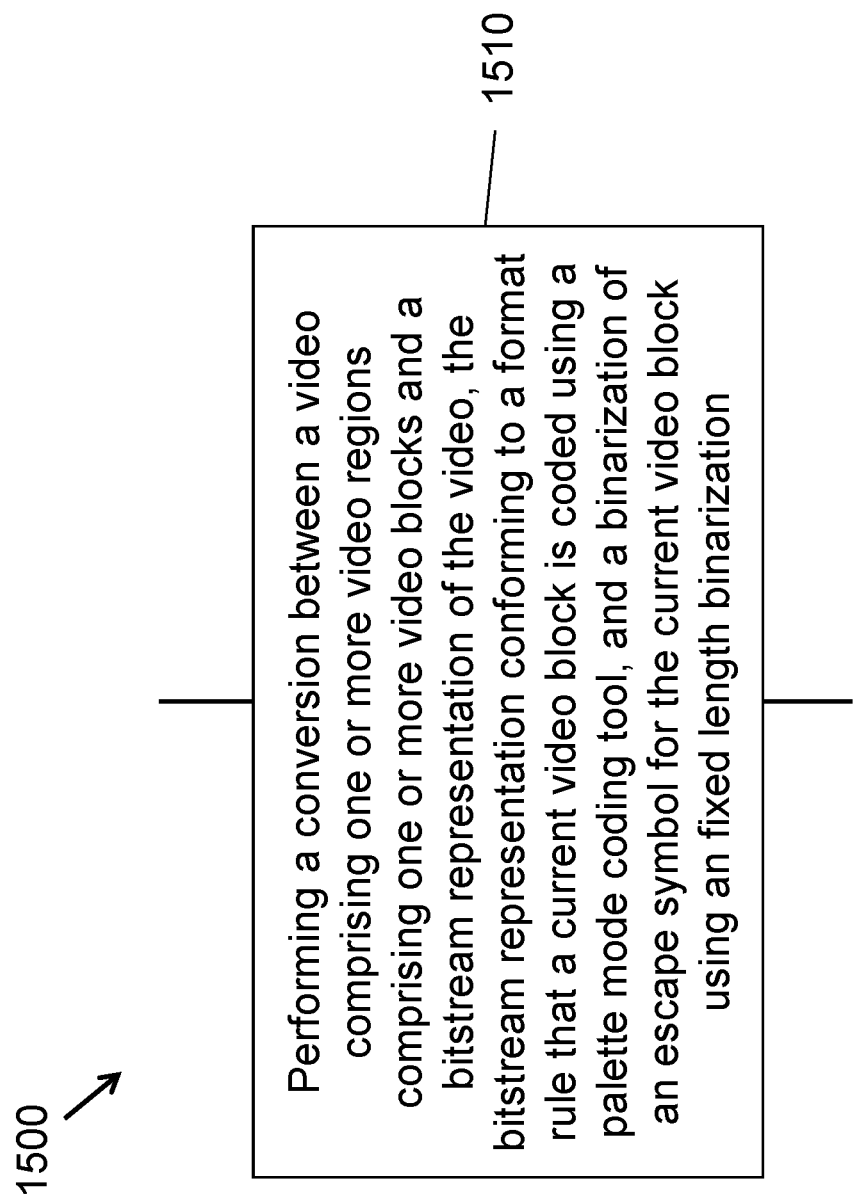

FIG. 15 is a flowchart of an example method for video processing. As shown therein, the method 1500 includes performing a conversion between a video comprising one or more video regions comprising one or more video blocks and a bitstream representation of the video (1510), wherein the bitstream representation conforms to a format rule that a current video block of the one or more video blocks that is coded using a palette mode coding tool wherein a binarization of an escape symbol for the current video block uses a fixed length binarization, wherein the palette mode coding tool represents the current video block using a palette of representative color values and wherein the escape symbol is used for a sample of the current video block coded without using the representative color values.

Figure 16:
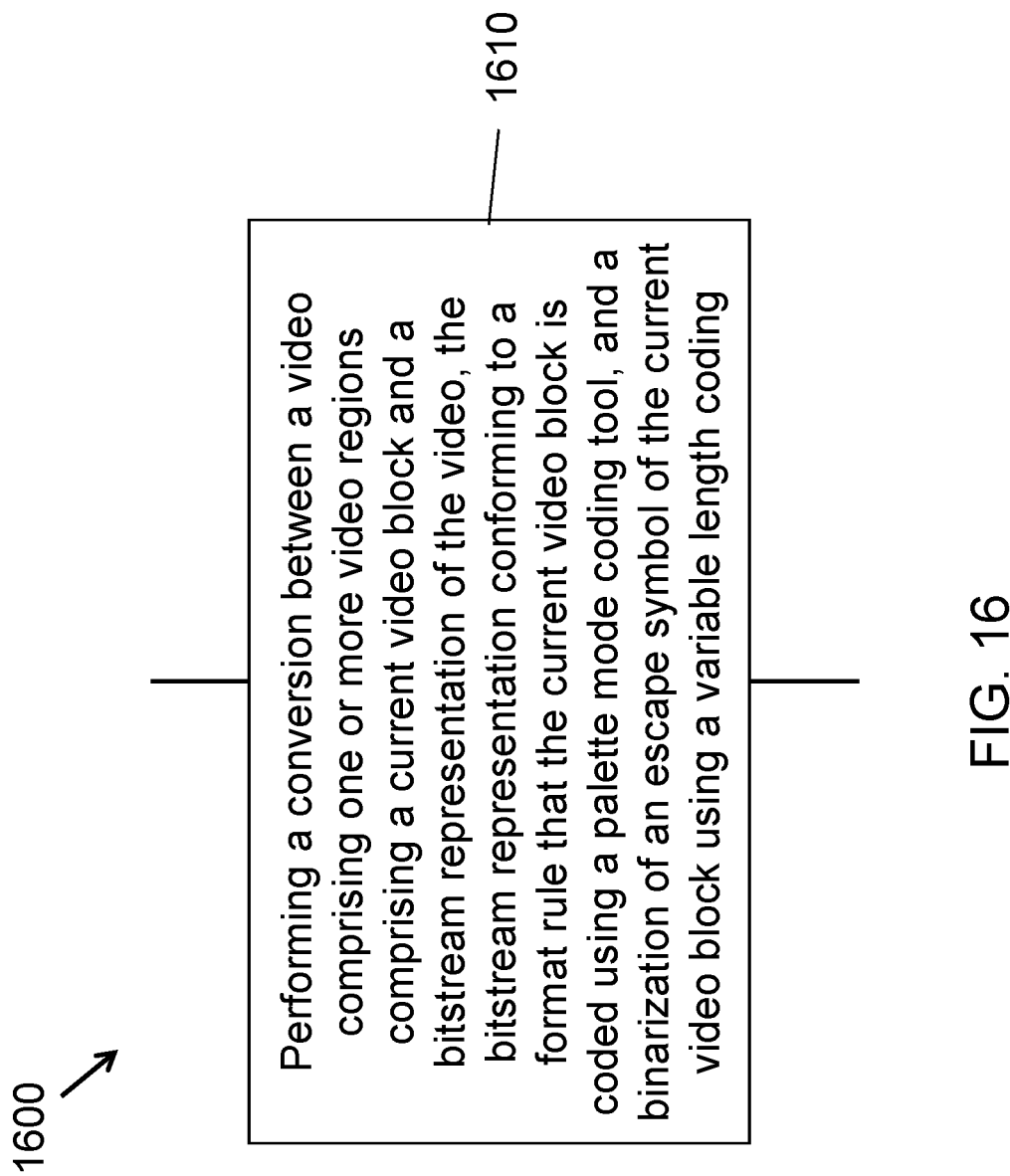

FIG. 16 is a flowchart of an example method for video processing. As shown therein, the method 1600 includes performing a conversion between a video comprising one or more video regions comprising a current video block and a bitstream representation of the video (1610), wherein the bitstream representation conforms to a format rule that the current video block is coded using a palette mode coding tool, wherein a binarization of an escape symbol of the current video block uses a variable length coding, wherein the palette mode coding tool represents the current video block using a palette of representative color values and wherein the escape symbol is used for a sample of the current video block coded without using the representative color values.

Figure 17:
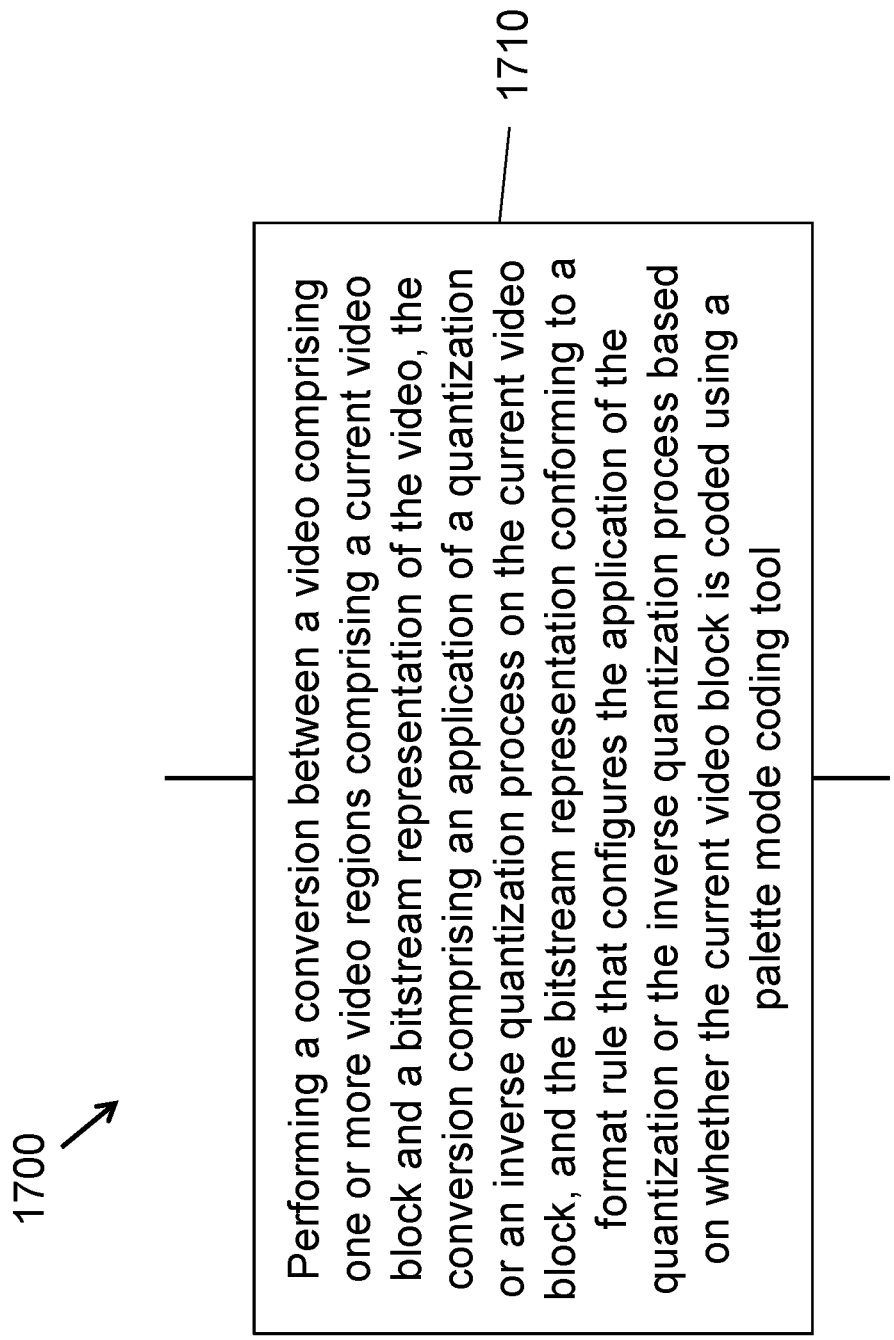

FIG. 17 is a flowchart of an example method for video processing. As shown therein, the method 1700 includes performing a conversion between a video comprising one or more video regions comprising a current video block and a bitstream representation of the video (1710), wherein the conversion comprises an application of a quantization or an inverse quantization process on the current video block, wherein the bitstream representation conforms to a format rule that configures the application of the quantization or the inverse quantization process based on whether the current video block is coded using a palette mode coding tool, and wherein the palette mode coding tool represents the current video block using a palette of representative color values.

Figure 18:
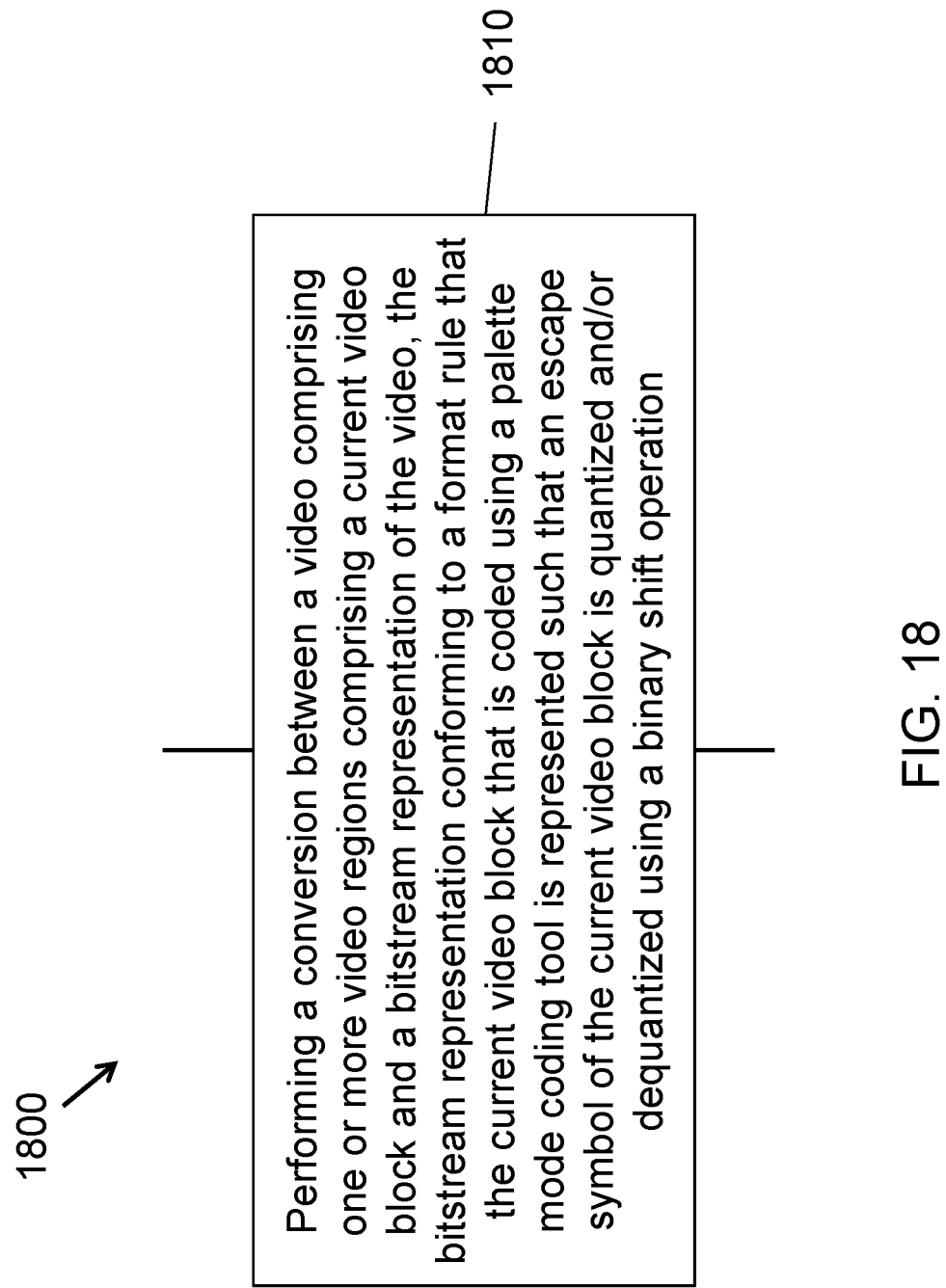

FIG. 18 is a flowchart of an example method for video processing. As shown therein, the method 1800 includes performing a conversion between a video comprising one or more video regions comprising a current video block and a bitstream representation of the video (1810), wherein the bitstream representation conforms to a format rule that the current video block that is coded using a palette mode coding tool is represented such that an escape symbol of the current video block is quantized and/or dequantized using a binary shift operation, wherein the palette mode coding tool represents the current video block using a palette of representative color values and wherein the escape symbol is used for a sample of the current video block coded without using the representative color values.

Figure 19:
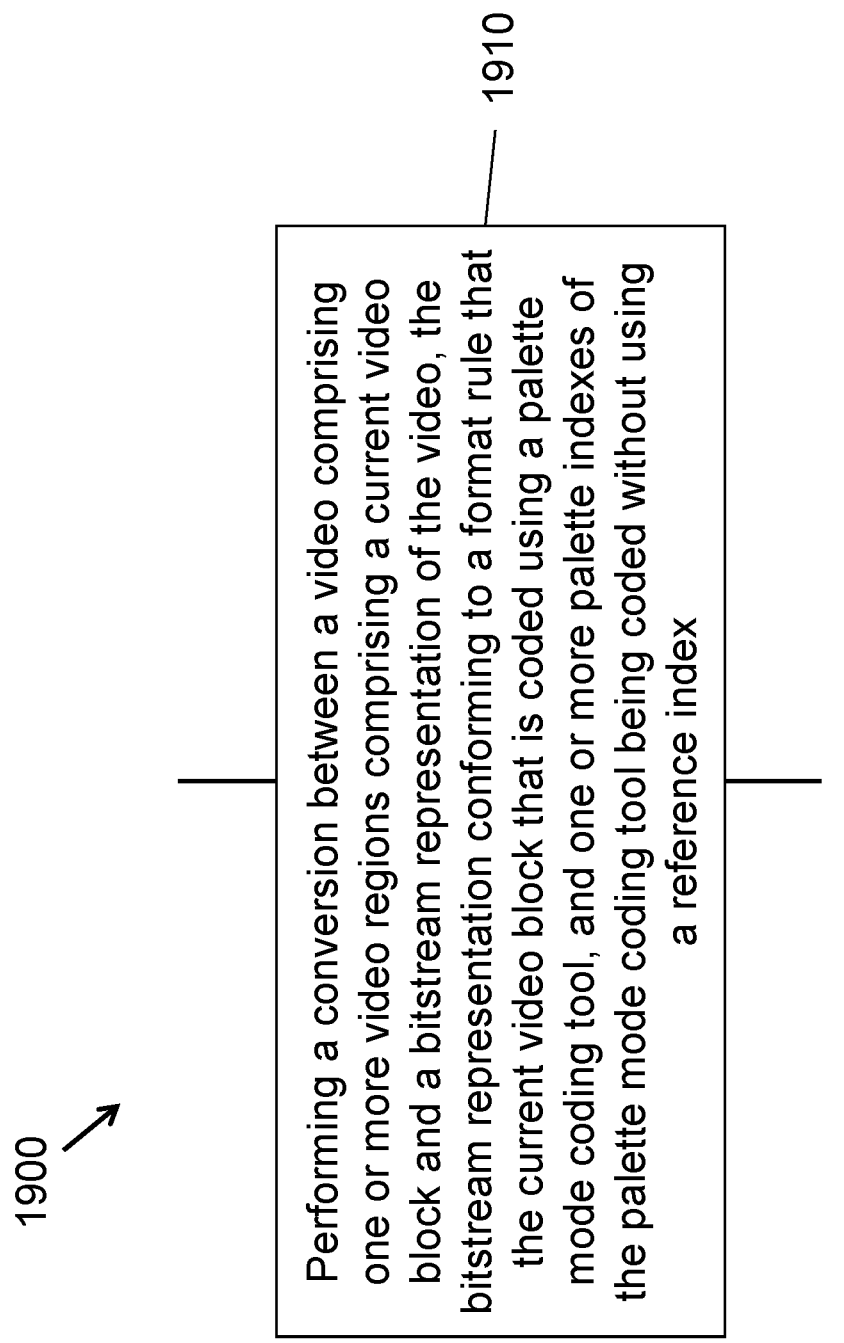

FIG. 19 is a flowchart of an example method for video processing. As shown therein, the method 1900 includes performing a conversion between a video comprising one or more video regions comprising a current video block and a bitstream representation of the video (1910), wherein the bitstream representation conforms to a format rule that the current video block that is coded using a palette mode coding tool, wherein one or more palette indexes of the palette mode coding tool are coded without using a reference index, and wherein the palette mode coding tool represents the current video block using a palette of representative color values.

Figure 20:
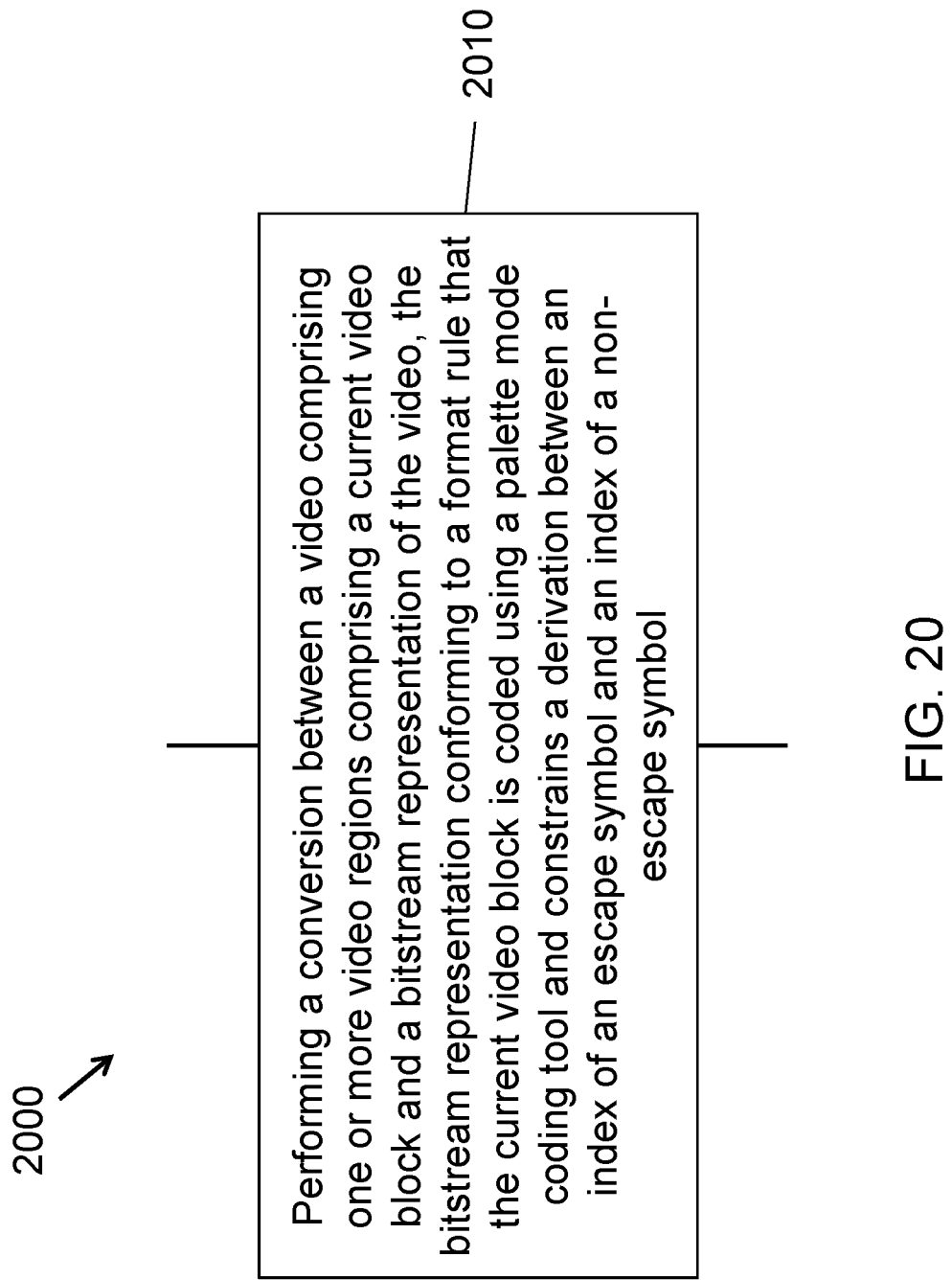

FIG. 20 is a flowchart of an example method for video processing. As shown therein, the method 2000 includes performing a conversion between a video comprising one or more video regions comprising a current video block and a bitstream representation of the video (2010), wherein the bitstream representation conforms to a format rule that the current video block is coded using a palette mode coding tool and constrains a derivation between an index of an escape symbol and an index of a non-escape symbol, wherein the palette mode coding tool represents the current video block using a palette of representative color values and wherein the escape symbol is used for a sample of the current video block coded without using the representative color values.

Figure 21:
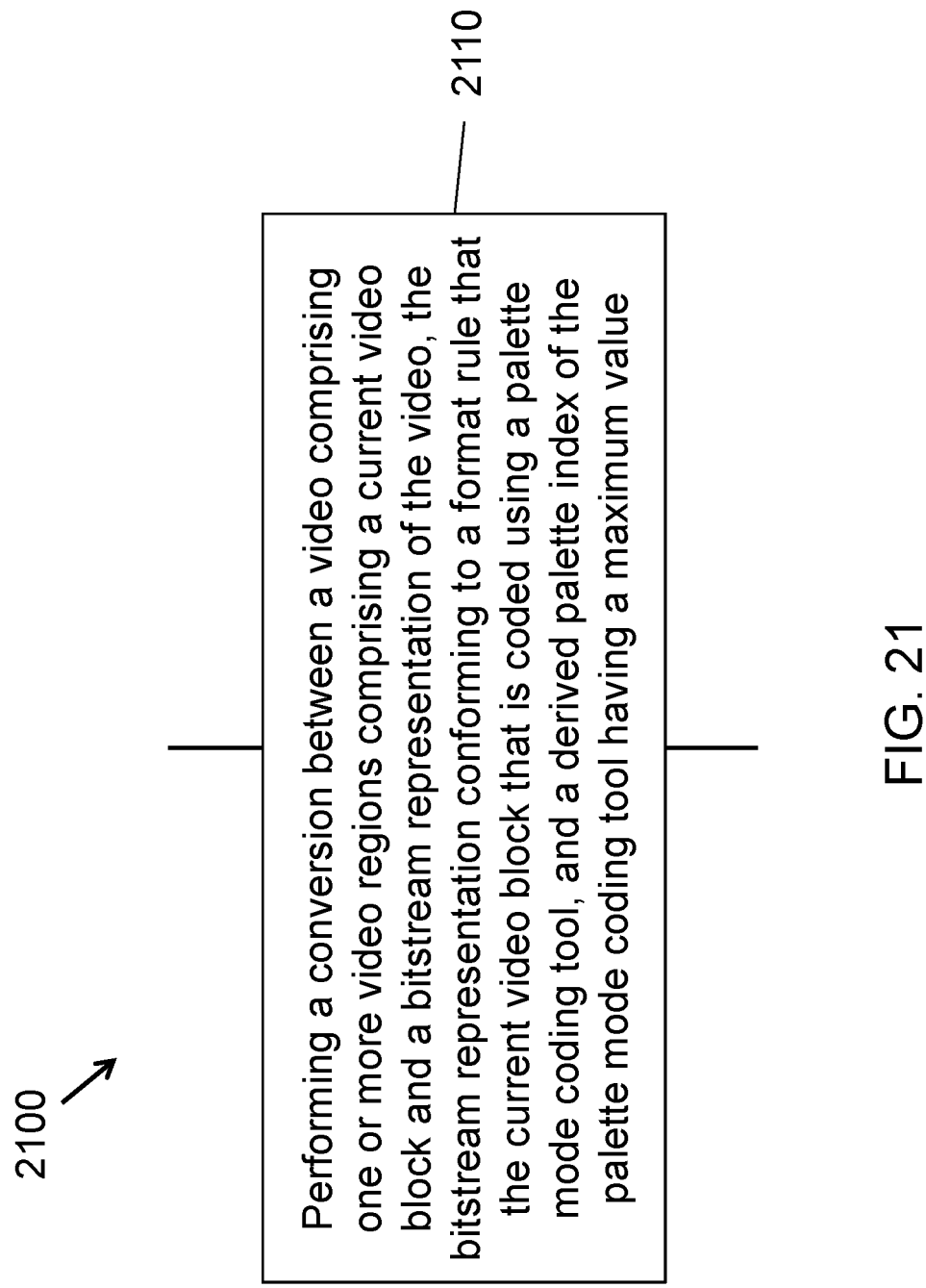

FIG. 21 is a flowchart of an example method for video processing. As shown therein, the method 2100 includes performing a conversion between a video comprising one or more video regions comprising a current video block and a bitstream representation of the video (2110), wherein the bitstream representation conforms to a format rule that the current video block that is coded using a palette mode coding tool, wherein a derived palette index of the palette mode coding tool has a maximum value, and wherein the palette mode coding tool represents the current video block using a palette of representative color values.

Figure 22:
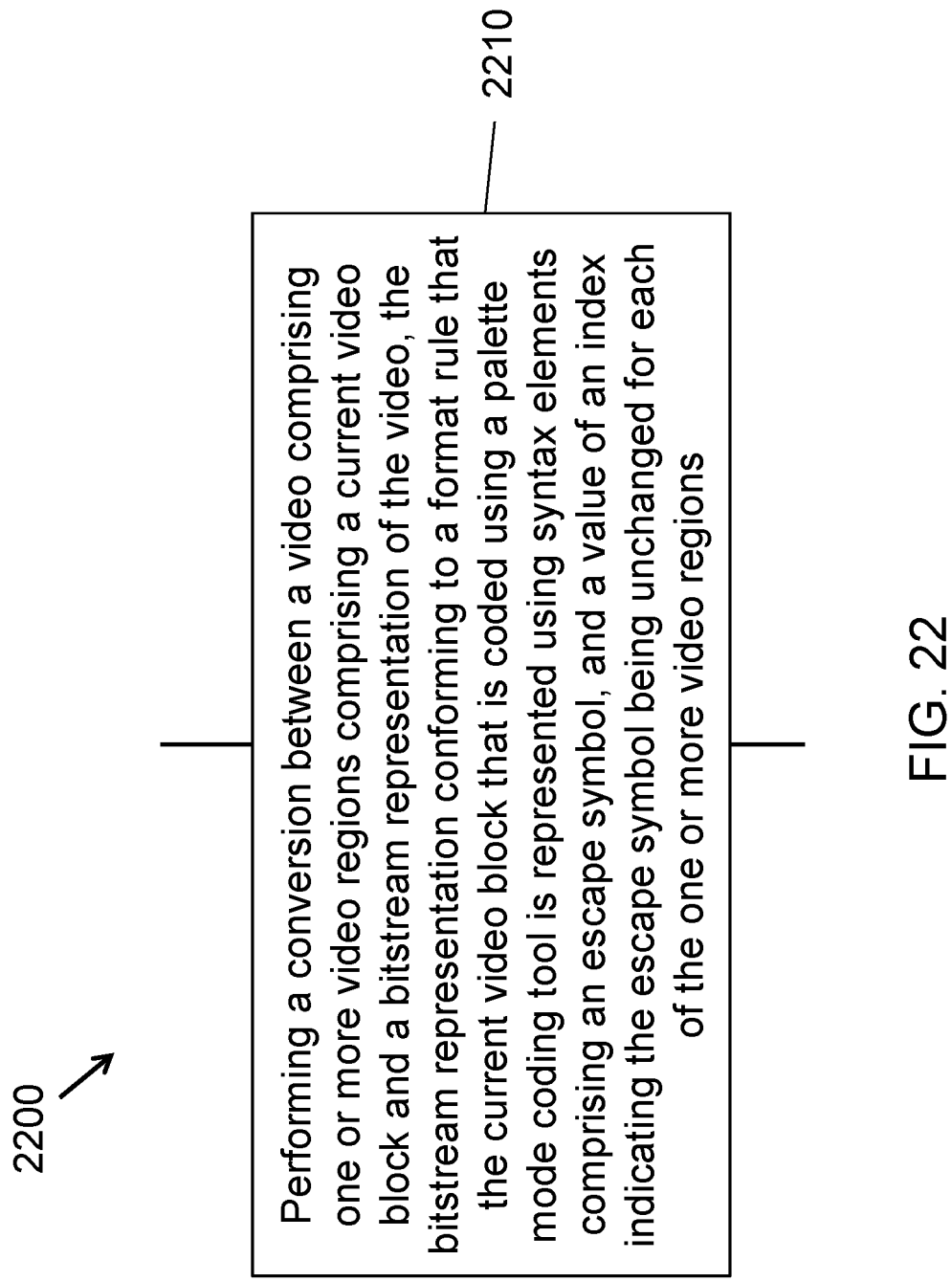

FIG. 22 is a flowchart of an example method for video processing. As shown therein, the method 2200 includes performing a conversion between a video comprising one or more video regions comprising a current video block and a bitstream representation of the video (2210), wherein the bitstream representation conforms to a format rule that the current video block that is coded using a palette mode coding tool is represented using syntax elements comprising an escape symbol, wherein a value of an index indicating the escape symbol is unchanged for each of the one or more video regions, wherein the palette mode coding tool represents the current video block using a palette of representative color values and wherein the escape symbol is used for a sample of the current video block coded without using the representative color values.

FIG. 23 is a flowchart of an example method for video processing. As shown therein, the method 2300 includes performing a conversion between a video comprising one or more video regions comprising a current video block and a bitstream representation of the video (2310), wherein the bitstream representation conforms to a format rule that the current video block that is coded using a palette mode coding tool is represented using syntax elements that are coded based on the current index and a reference index, wherein the palette mode coding tool represents the current video block using a palette of representative color values.

FIG. 24 is a flowchart of an example method for video processing. As shown therein, the method 2400 includes performing a conversion between a video comprising one or more video regions comprising a current video block and a bitstream representation of the video (2410), wherein the bitstream representation conforms to a format rule that the current video block that is coded using a palette mode coding tool is represented using syntax elements comprising an escape symbol that is predictively coded, wherein the palette mode coding tool represents the current video block using a palette of representative color values and wherein the escape symbol is used for a sample of the current video block coded without using the representative color values.

Figure 25:
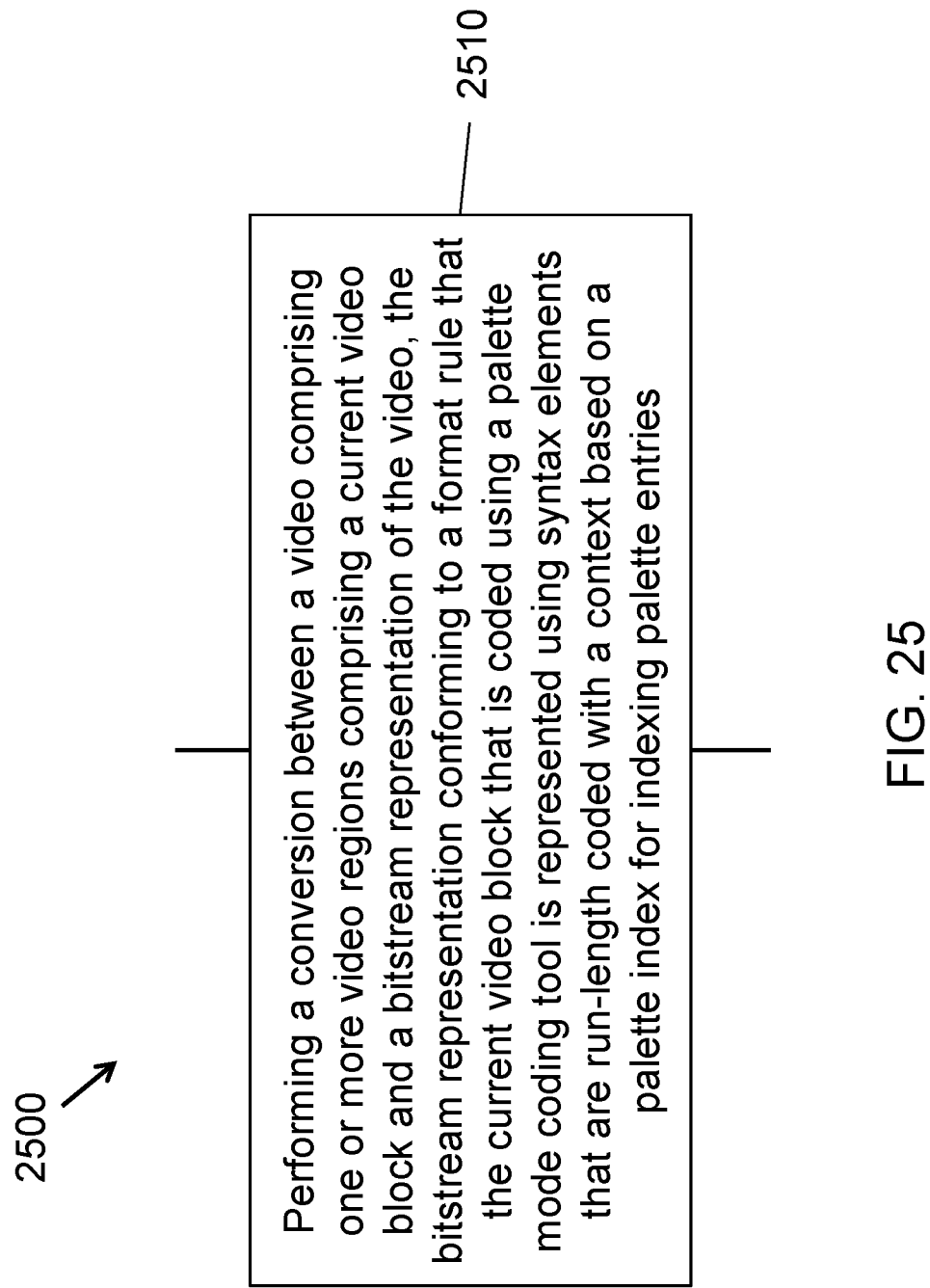

FIG. 25 is a flowchart of an example method for video processing. As shown therein, the method 2500 includes performing a conversion between a video comprising one or more video regions comprising a current video block and a bitstream representation of the video (2510), wherein the bitstream representation conforms to a format rule that the current video block that is coded using a palette mode coding tool is represented using syntax elements that are run-length coded with a context based on a palette index for indexing palette entries, wherein the palette mode coding tool represents the current video block using a palette of representative color values.

Figure 26:
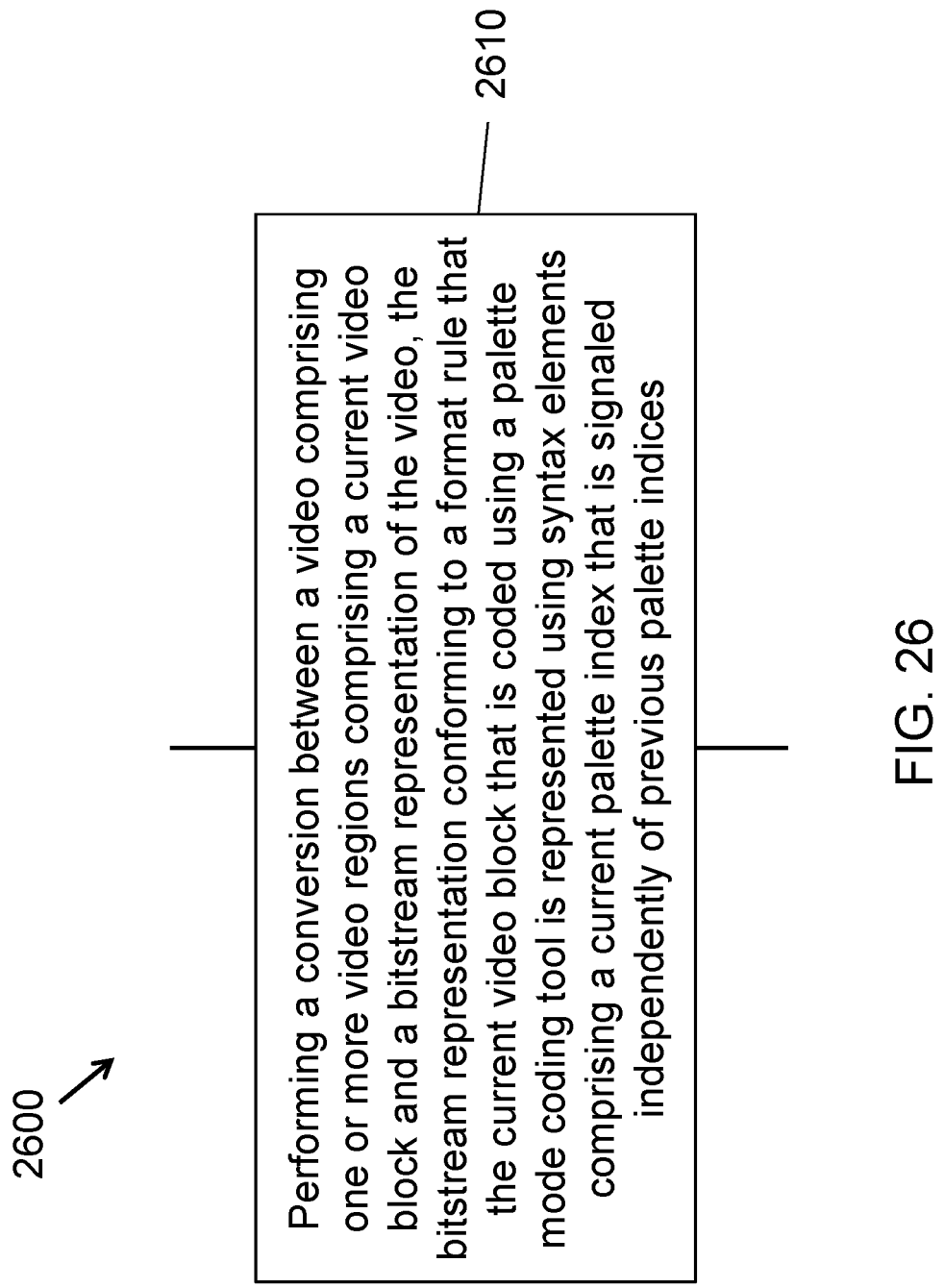

FIG. 26 is a flowchart of an example method for video processing. As shown therein, the method 2600 includes performing a conversion between a video comprising one or more video regions comprising a current video block and a bitstream representation of the video (2610), wherein the bitstream representation conforms to a format rule that the current video block that is coded using a palette mode coding tool is represented using syntax elements comprising a current palette index that is signalled independently of previous palette indices, wherein the palette mode coding tool represents the current video block using a palette of representative color values.

Figure 27:
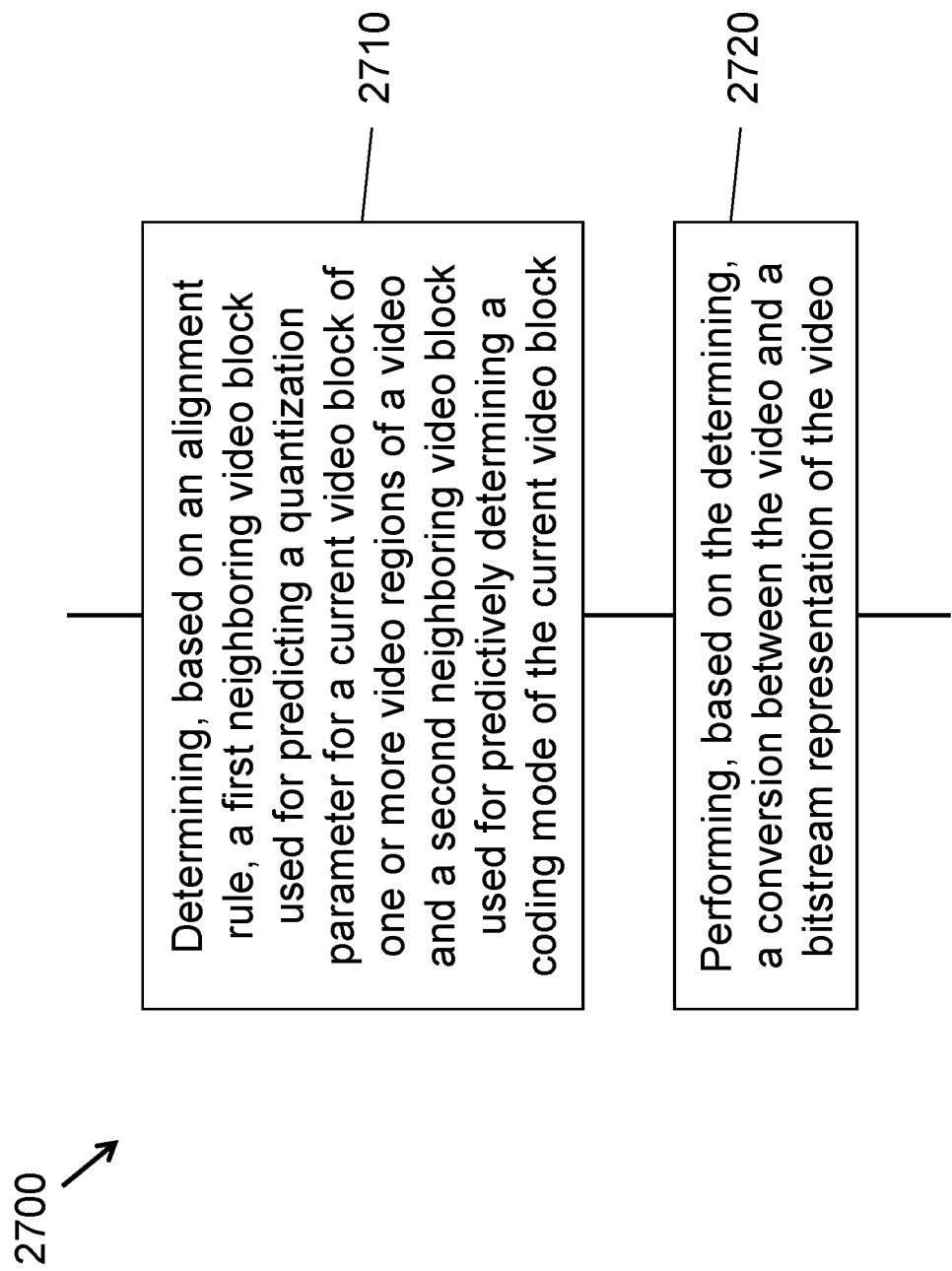

FIG. 27 is a flowchart of an example method for video processing. As shown therein, the method 2700 includes determining, based on an alignment rule, a first neighboring video block used for predicting a quantization parameter for a current video block of one or more video regions of a video and a second neighboring video block used for predictively determining a coding mode of the current video block (2710), and performing, based on the determining, a conversion between the video and a bitstream representation of the video (2720).

Figure 28:
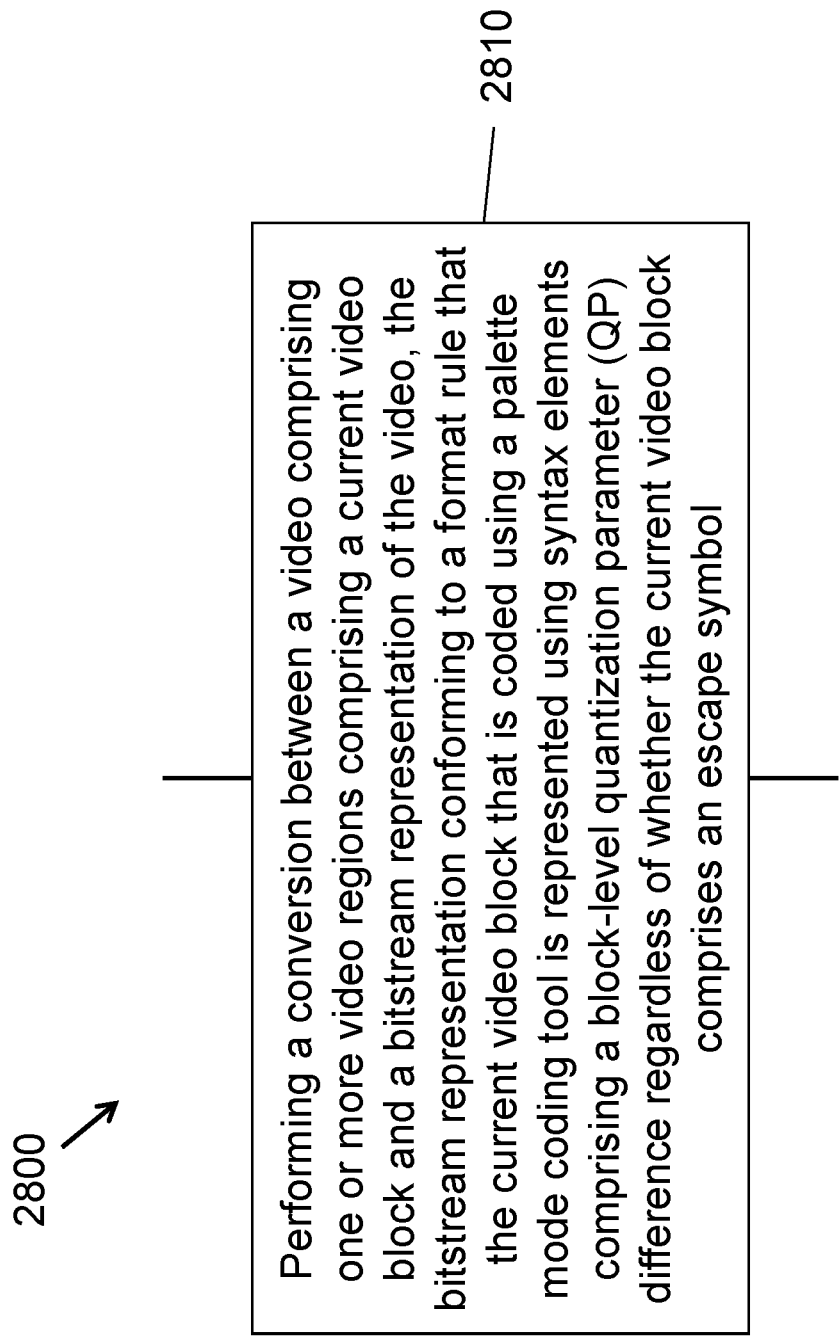

FIG. 28 is a flowchart of an example method for video processing. As shown therein, the method 2800 includes performing a conversion between a video comprising one or more video regions comprising a current video block and a bitstream representation of the video (2810), wherein the bitstream representation conforms to a format rule that the current video block that is coded using a palette mode coding tool is represented using syntax elements comprising a block-level quantization parameter (QP) difference regardless of whether the current video block comprises an escape symbol, wherein the palette mode coding tool represents the current video block using a palette of representative color values and wherein the escape symbol is used for a sample of the current video block coded without using the representative color values.

Figure 29:
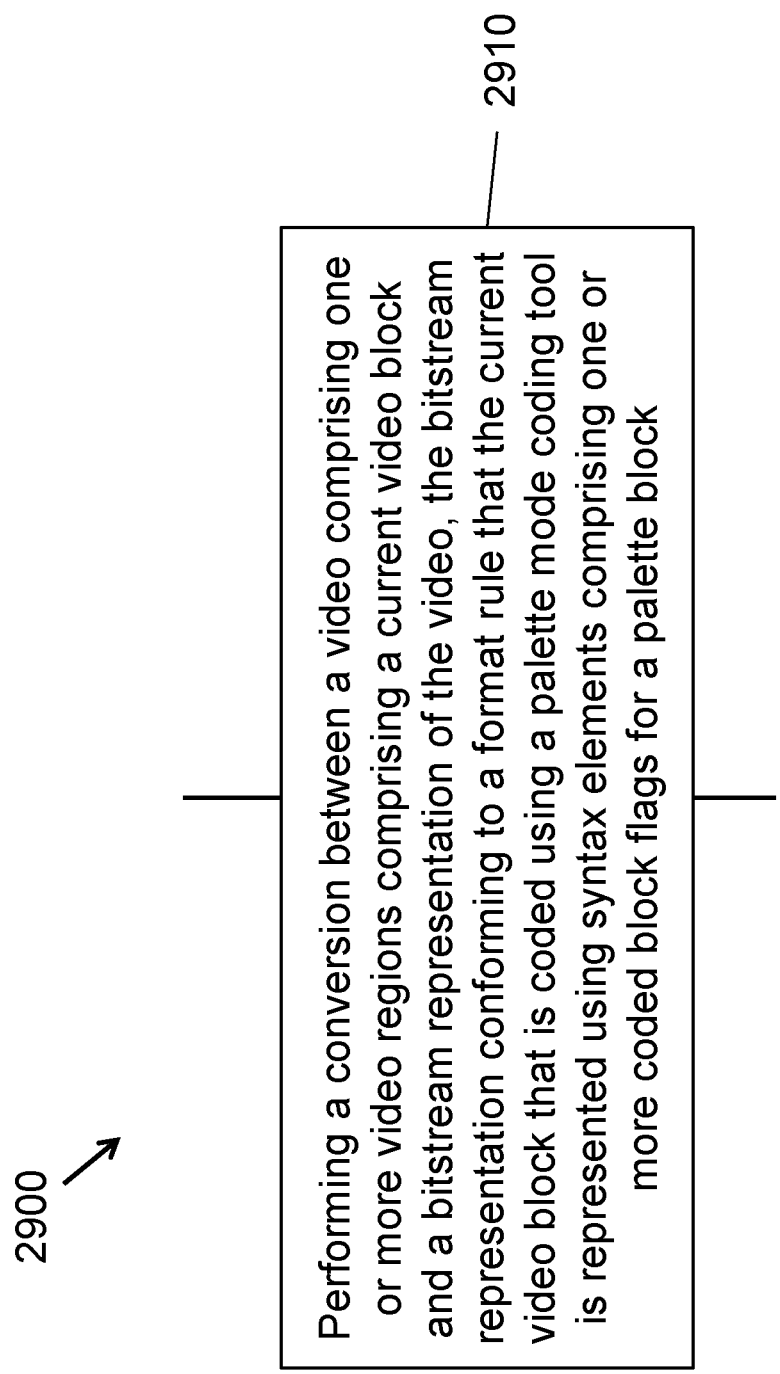

FIG. 29 is a flowchart of an example method for video processing. As shown therein, the method 2900 includes performing a conversion between a video comprising one or more video regions comprising a current video block and a bitstream representation of the video (2910), wherein the bitstream representation conforms to a format rule that the current video block that is coded using a palette mode coding tool is represented using syntax elements comprising one or more coded block flags (CBFs) for a palette block, wherein the palette mode coding tool represents the current video block using a palette of representative color values.

Figure 30:
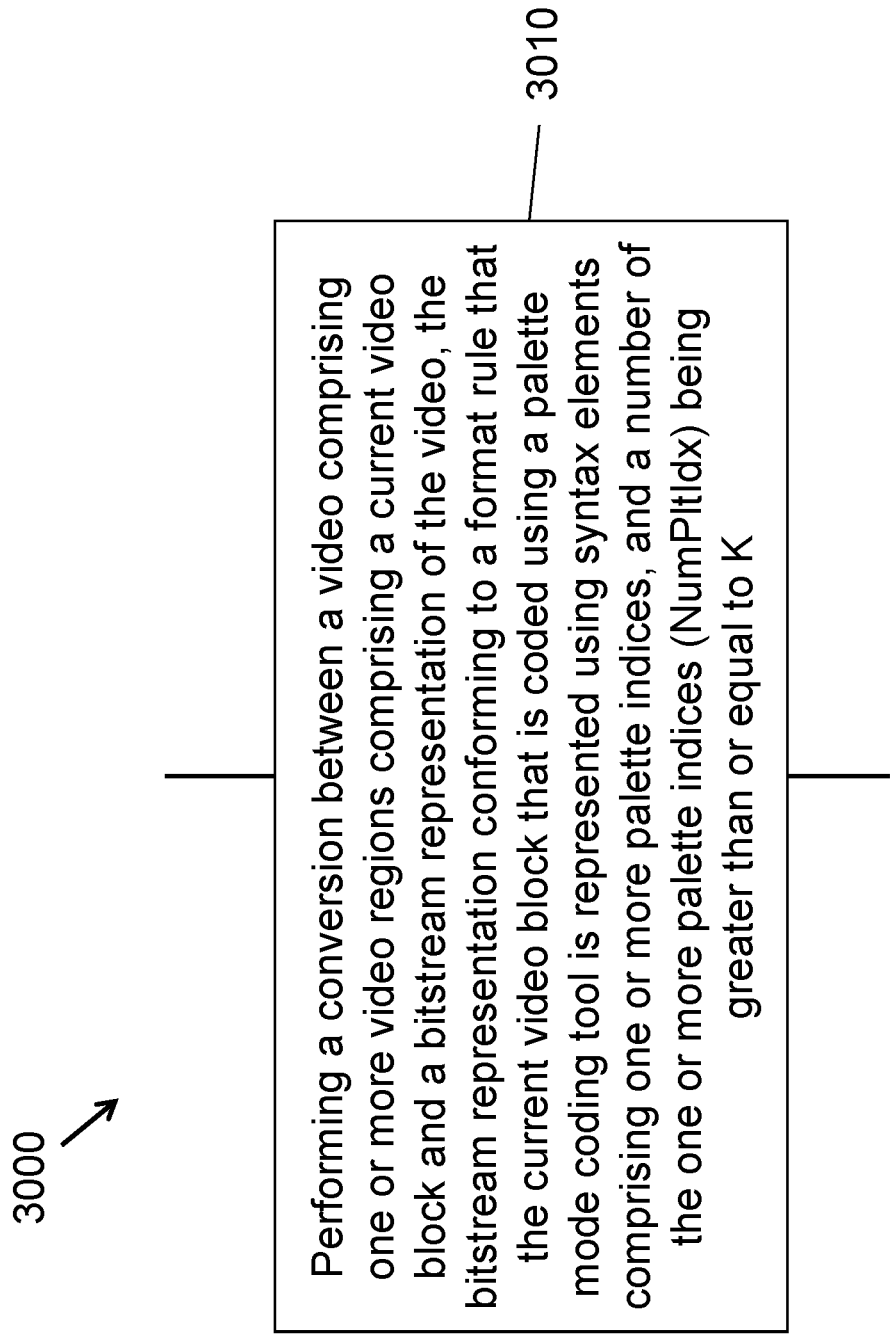

FIG. 30 is a flowchart of an example method for video processing. As shown therein, the method 3000 includes performing a conversion between a video comprising one or more video regions comprising a current video block and a bitstream representation of the video (3010), wherein the bitstream representation conforms to a format rule that the current video block that is coded using a palette mode coding tool is represented using syntax elements comprising one or more palette indices, wherein a number of the one or more palette indices (NumPltIdx) is greater than or equal to K, wherein the palette mode coding tool represents the current video block using a palette of representative color values, and wherein K is a positive integer.

Figure 31:
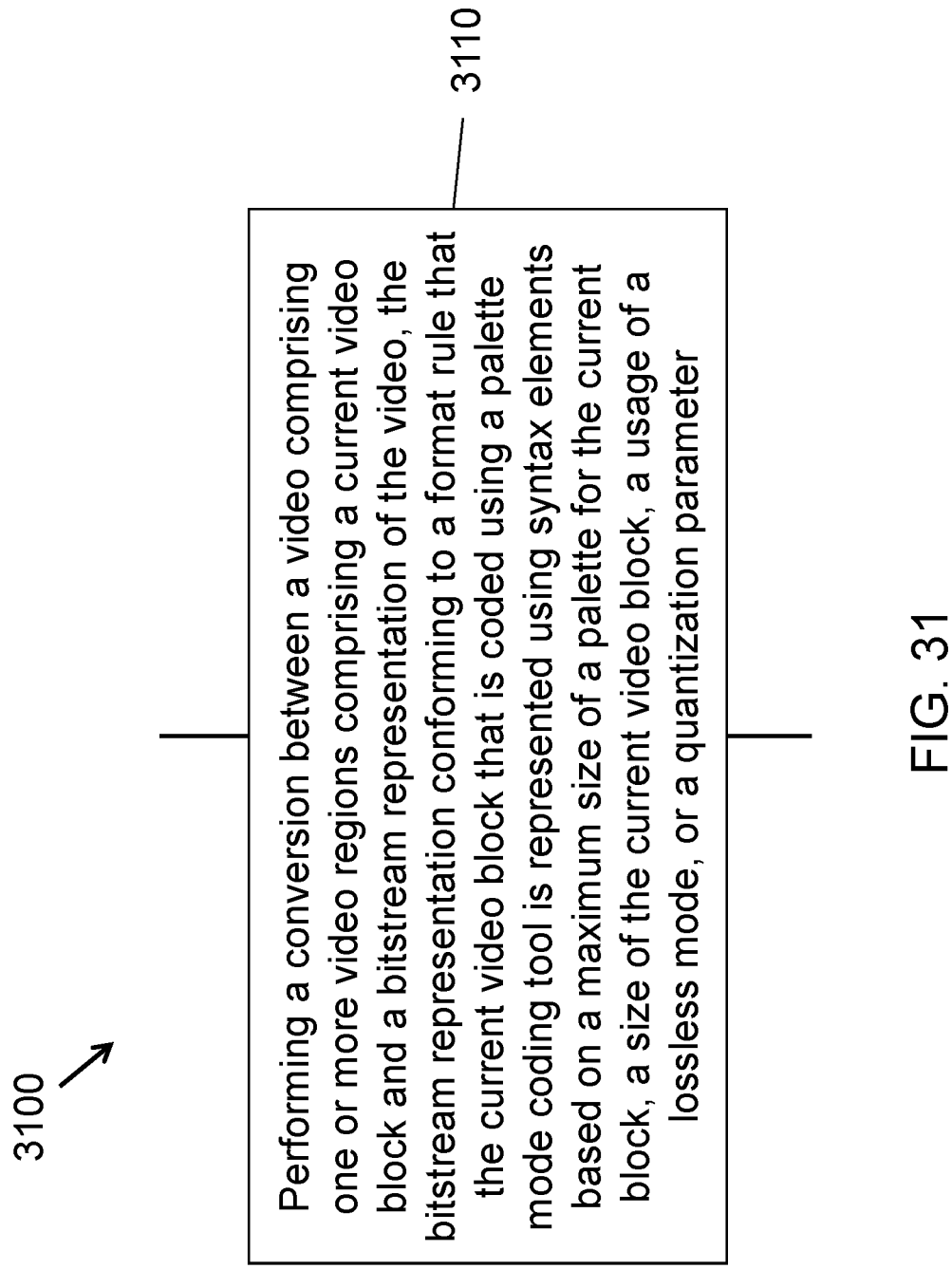

FIG. 31 is a flowchart of an example method for video processing. As shown therein, the method 3100 includes performing a conversion between a video comprising one or more video regions comprising a current video block and a bitstream representation of the video (3110), wherein the bitstream representation conforms to a format rule that the current video block that is coded using a palette mode coding tool is represented using syntax elements based on a maximum size of a palette for the current block, a size of the current video block, a usage of a lossless mode, or a quantization parameter (QP), wherein the palette mode coding tool represents the current video block using a palette of representative color values.

Figure 32:
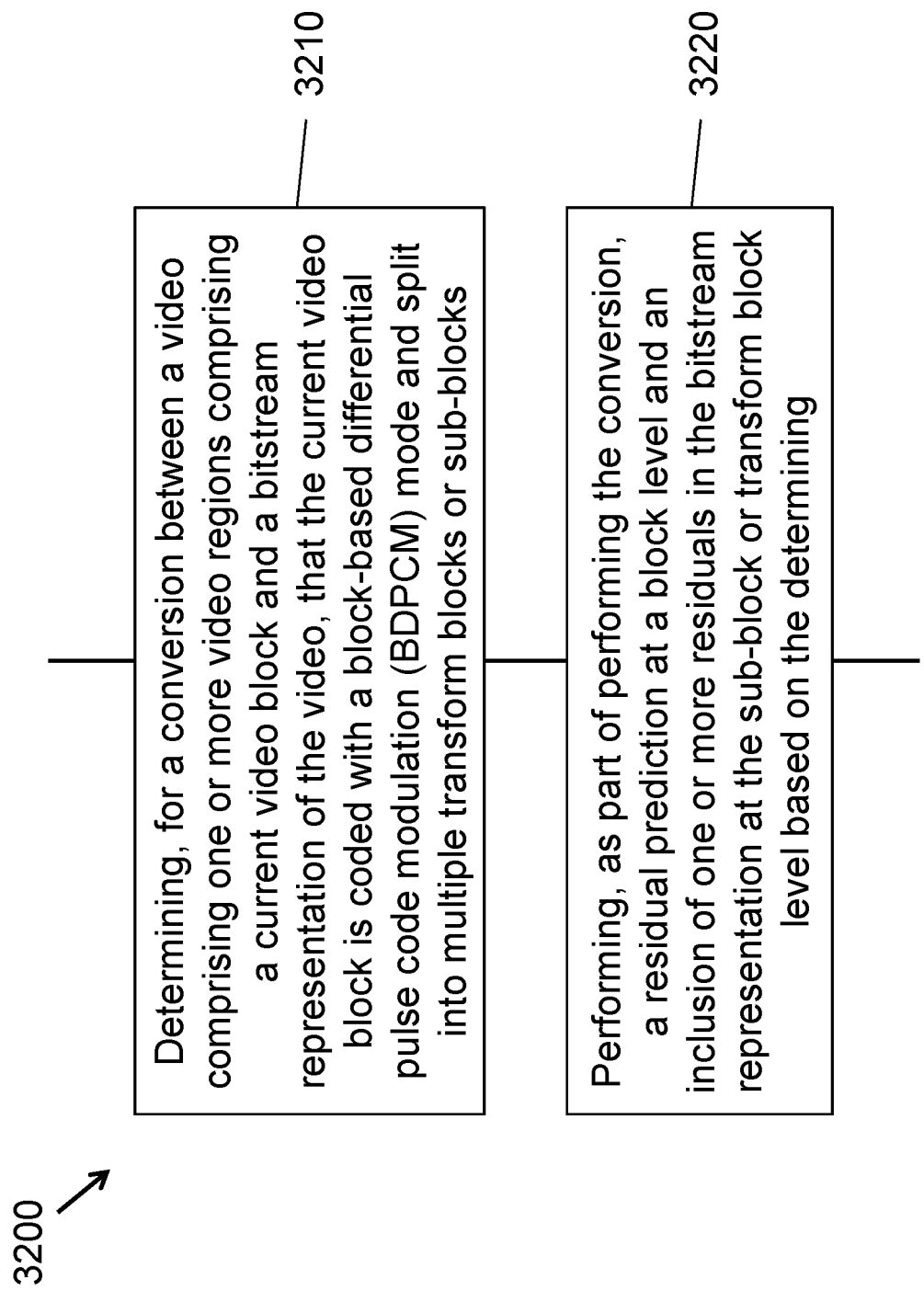

FIG. 32 is a flowchart of an example method for video processing. As shown therein, the method 3200 includes determining, for a conversion between a video comprising one or more video regions comprising a current video block and a bitstream representation of the video, that the current video block is coded with a block-based differential pulse code modulation (BDPCM) mode and split into multiple transform blocks or sub-blocks (3210), and performing, as part of performing the conversion, a residual prediction at a block level and an inclusion of one or more residuals in the bitstream representation at the sub-block or transform block level based on the determining (3220).

Figure 33:
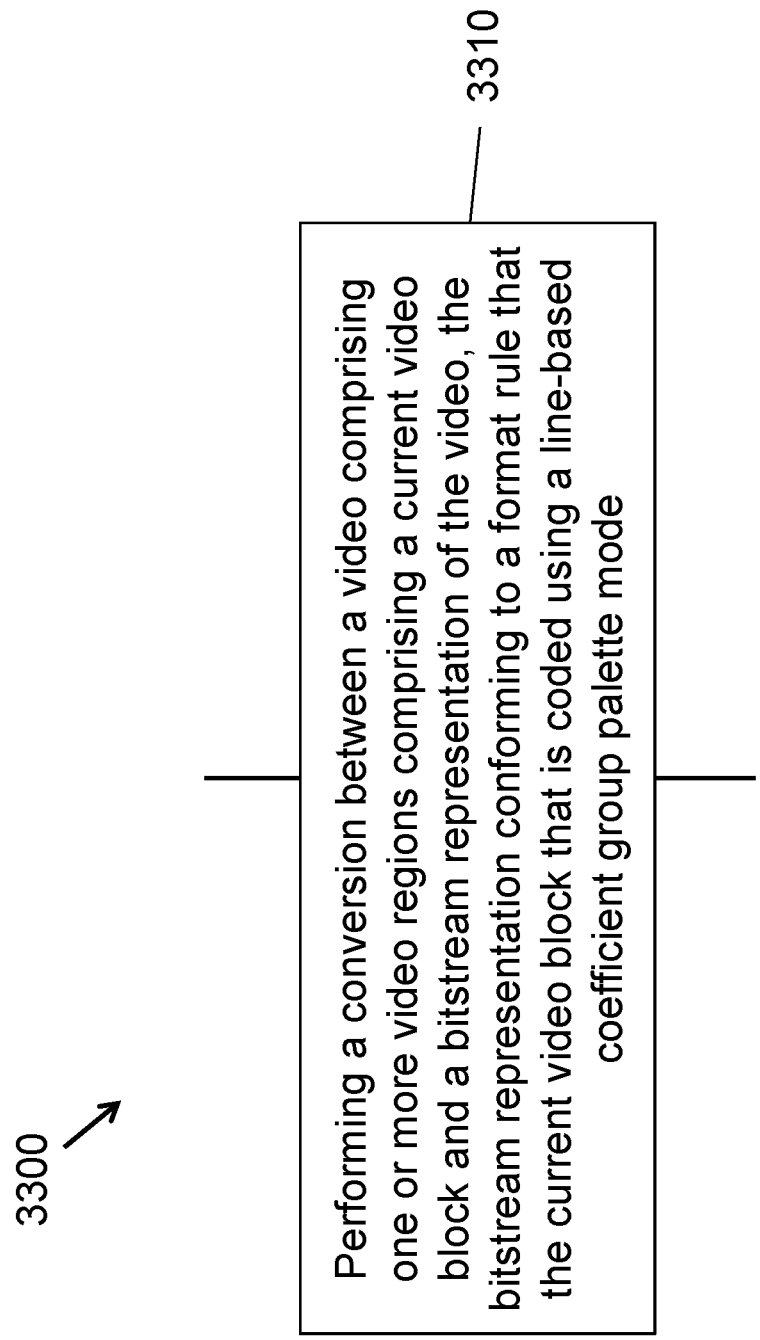

FIG. 33 is a flowchart of an example method for video processing. As shown therein, the method 3300 includes performing a conversion between a video comprising one or more video regions comprising a current video block and a bitstream representation of the video (3310), wherein the bitstream representation conforms to a format rule that the current video block that is coded using a line-based coefficient group (CG) palette mode, wherein the line-based CG palette mode represents multiple segments of each coding unit (CU) of the current video block using a palette of representative color values.

The following solutions may be implemented together with additional techniques described in items listed in the previous section (e.g., item 1) as preferred features of some embodiments.

1. A method of video processing, comprising performing a conversion between a video comprising one or more video regions comprising a current video block and a bitstream representation of the video, wherein the bitstream representation conforms to a format rule that the current video block is coded using a palette mode coding tool, wherein a binarization of an escape symbol for the current video block uses an exponential-Golomb (EG) code of order K, wherein K is a non-negative integer that is unequal to three, and wherein the palette mode coding tool represents the current video block using a palette of representative color values and wherein the escape symbol is used for a sample of the current video block coded without using the representative color values.

2. The method of solution 1, wherein K=0.
3. The method of solution 1, wherein K=1.
4. The method of solution 1, wherein K=2.
5. A method of video processing, comprising performing a conversion between a video comprising one or more video regions comprising one or more video blocks and a bitstream representation of the video, wherein the bitstream representation conforms to a format rule that a current video block of the one or more video blocks is coded using a palette mode coding tool, wherein a binarization of an escape symbol for the current video block uses a fixed length binarization, wherein the palette mode coding tool represents the current video block using a palette of representative color values, and wherein the escape symbol is used for a sample of the current video block coded without using the representative color values.

6. The method of solution 5, wherein the fixed length binarization uses N bits, wherein N is an integer greater than one.

7. The method of solution 6, wherein N is based on an internal bit depth.

8. The method of solution 6, wherein a value of N is signalled in a slice subpicture, tile, picture, or video.

9. The method of solution 6, wherein N is based on a quantization parameter.

10. The method of solution 9, wherein N is based on a function (f( )) of the quantization parameter (Qp), denoted as f(Qp).

11. The method of solution 9, wherein N is set to (ibd−max(16, (Qp−4)/6)), and wherein ibd is an internal bit depth.

12. The method of solution 9, wherein N is set to (ibd−max(QpPrimeTsMin, (Qp−4)/6)), wherein ibd is an internal bit depth and QpPrimeTsMin is a minimum allowed quantization parameter for a transform skip mode.

13. The method of solution 9, wherein N is set to max(A, (ibd−max(16, (QpPrimeTsMin−4)/6))), and wherein ibd is an internal bit depth, QpPrimeTsMin is a minimum allowed quantization parameter for a transform skip mode, and A is a non-negative integer.

14. The method of solution 13, wherein A=0 or A=1.

15. The method of any of solutions 9 to 14, wherein the quantization parameter is a sum of a quantization parameter of a slice of the video and a constant value, wherein the constant value is an integer.

16. A method of video processing, comprising performing a conversion between a video comprising one or more video regions comprising a current video block and a bitstream representation of the video, wherein the bitstream representation conforms to a format rule that the current video block is coded using a palette mode coding tool, wherein a binarization of an escape symbol of the current video block uses a variable length coding, wherein the palette mode coding tool represents the current video block using a palette of representative color values and wherein the escape symbol is used for a sample of the current video block coded without using the representative color values.

17. The method of solution 16, wherein the variable length coding excludes an exponential-Golomb code of order 3.

18. The method of solution 16, wherein the variable length coding is a truncated binary (TB) code with an input parameter K, wherein K is an integer.

19. The method of solution 18, wherein K is based on (a) a message signalled in a sequence parameter set (SPS), a video parameter set (VPS), a picture parameter set (PPS), a picture header, a slice header, a tile group header, a largest coding unit (LCU) row, a group of LCUs, or a brick, (b) an internal bit depth, (c) an input bit depth, (d) a different between the internal bit depth and the input bit depth, (e) a dimension of the current video block, (f) a current quantization parameter of the current video block, (g) an indication of a color format of the video, (h) a coding tree structure, or (i) a color component of the video.

20. The method of solution 5, wherein multiple values of the escape symbol are signalled using multiple binarization methods.

21. A method of video processing, comprising performing a conversion between a video comprising one or more video regions comprising a current video block and a bitstream representation of the video, wherein the conversion comprises an application of a quantization or an inverse quantization process on the current video block, wherein the bitstream representation conforms to a format rule that configures the application of the quantization or the inverse quantization process based on whether the current video block is coded using a palette mode coding tool, and wherein the palette mode coding tool represents the current video block using a palette of representative color values.

22. A method of video processing, comprising performing a conversion between a video comprising one or more video regions comprising a current video block and a bitstream representation of the video, wherein the bitstream representation conforms to a format rule that the current video block that is coded using a palette mode coding tool is represented such that an escape symbol of the current video block is quantized and/or dequantized using a binary shift operation, wherein the palette mode coding tool represents the current video block using a palette of representative color values and wherein the escape symbol is used for a sample of the current video block coded without using the representative color values.

23. The method of solution 22, wherein the quantizing corresponds to right bit-shifting.

24. The method of solution 22 wherein the escape symbol is coded as f(p, Qp), wherein f( ) is a function, p is an input symbol value, and Qp is a derived quantization parameter for a corresponding color component representing the current video block.

25. The method of solution 24, wherein f is defined as p>>g(Qp).

26. The method of solution 24, wherein f is defined as (p+(1<<(g(QP)−1)))>>g(Qp).

27. The method of solution 24, wherein f is defined as clip(0, (1<<bd)−1, (p+(1<<(g(QP)−1)))>>g(Qp)), wherein clip(x, min, max) is a clipping function, and wherein x, min, and max are integers.

28. The method of solution 22, wherein the escape symbol is coded as h(p), wherein h( ) is a function and p is an input value symbol.

29. The method of solution 28, wherein h is defined as p>>N and N is a non-negative integer.

30. The method of solution 28, wherein h is defined as (p+(1<<(N−1)))>>>N, and wherein N is a non-negative integer.

31. The method of solution 29 or 30, wherein N=0 when cu_transquant_bypass_flag=1.

32. The method of solution 29 or 30, wherein N=(bd−ibd) when cu_transquant_bypass_flag=1, wherein bd is an internal bit depth and ibd is an input bit depth.

33. The method of solution 28, wherein h is defined as clip(0, (1<<(bd−N)−1, p>>N), wherein bd is an internal bit depth for a current color component of the current video block and N is a non-negative integer, wherein clip(x, min, max) is a clipping function, and wherein x, min, and max are integers.

34. The method of solution 28, wherein h is defined as clip(0, (1<<(bd−N)−1, (p+(1<<(N−1)))>>N), wherein bd is an internal bit depth for a current color component of the current video block and N is a non-negative integer, wherein clip(x, min, max) is a clipping function, and wherein x, min, and max are integers.

35. The method of any of solutions 29 to 34, wherein N is in a range [0, (bd−1)], and wherein bd is an internal bit depth for a current color component of the current video block.

36. The method of solution 22, wherein the dequantizing corresponds to left bit-shifting.

37. The method of solution 36, wherein the escape symbol is dequantized as f(p, Qp), wherein f( ) is a function, p is a decoded escape symbol, and Qp is a derived quantization parameter for a corresponding color component representing the current video block.

38. The method of solution 37, wherein f is defined as p<<<g(Qp).

39. The method of solution 36, wherein the escape symbol is reconstructed as f(p, Qp), wherein f( ) is a function, p is a decoded escape symbol, and Qp is a derived quantization parameter for a corresponding color component representing the current video block.

40. The method of solution 39, wherein f is defined as clip (0, (1<<bd)−1, p<<g(Qp)), wherein bd is an internal bit depth for a current color component of the current video block, and wherein clip(x, min, max) is a clipping function, and wherein x, min, and max are integers.

41. The method of solution 27, 33, 34, or 40, wherein the clipping function clip(x, min, max) is defined as $$\text{clip}(x, \text{min}, \text{max}) = \begin{cases} \text{min} & x < \text{min} \\ x & \text{min} \le x \le \text{max} \\ \text{max} & x > \text{max} \end{cases}.$$

42. The method of solution 36, wherein the escape symbol is reconstructed as h(p), wherein h( ) is a function and p is a decoded escape symbol.

43. The method of solution 42, wherein h is defined as p<<<N and N is a non-negative integer.

44. The method of solution 42 or 43, wherein N=0 when cu_transquant_bypass_flag=1.

45. The method of solution 42 or 43, wherein N=(bd−ibd) when cu_transquant_bypass_flag=1, wherein bd is an internal bit depth and ibd is an input bit depth.

46. The method of solution 42 or 43, wherein N=(max (QpPrimeTsMin, qP)−4)/6, wherein qP is a decoded quantization parameters and QpPrimeTsMin is a minimum allowed quantization parameter for a transform skip mode.

47. The method of any of solutions 43 to 46, wherein N is further clipped as min(bd−1, N), and wherein bd is an internal bit depth for a current color component of the current video block.

48. The method of any of solutions 43 to 47, wherein N is in a range [0, (bd−1)], and wherein bd is an internal bit depth for a current color component of the current video block.

49. The method of solution 36, wherein a reconstruction offset of the escape symbol is based on bit depth information.

50. The method of solution 49, wherein the bit depth information comprises a difference between an internal bit depth and an input bit depth (denoted Asp).

51. The method of solution 50, wherein the reconstructed offset is equal to p<<K when K≤Asp, wherein p is a decoded escape symbol and K is an integer.

52. The method of solution 49, wherein the reconstructed offset is equal to p<<K when K≤T0, wherein p is a decoded escape symbol and K and T0 are integers.

53. The method of solution 50, wherein T0=2.

54. The method of solution 50, wherein the reconstructed offset is equal to (p<<<K)+((1<<<(K−1))>>$\Delta_{BD}$<<$\Delta_{BD}$), wherein p is a decoded escape symbol and K is an integer.

55. The method of solution 50, wherein Asp is signalled in the bitstream representation in a sequence level, picture level, slice level, tile level, brick level, or subpicture level.

56. The method of any of solutions 22 to 55, wherein the escape symbol is context coded.

57. The method of any of solutions 22 to 55, wherein the escape symbol is bypass coded.

58. The method of any of solutions 25-27, 38 or 40, wherein g(Qp) is defined as (Qp−4)/6.

59. The method of any of solutions 25-27, 38 or 40, wherein g(Qp) is defined as (max(M, Qp)−4)/6, wherein M is an integer.

60. The method of solution 59, wherein M is signalled in a sequence parameter set (SPS).

61. The method of any of solutions 58 to 60, wherein g(Qp) is in a range [0, (bd−1)], and wherein bd is an internal bit depth for a current color component of the current video block.

62. A method of video processing, comprising performing a conversion between a video comprising one or more video regions comprising a current video block and a bitstream representation of the video, wherein the bitstream representation conforms to a format rule that the current video block that is coded using a palette mode coding tool, wherein one or more palette indexes of the palette mode coding tool are coded without using a reference index, and wherein the palette mode coding tool represents the current video block using a palette of representative color values.

63. The method of solution 62, wherein a binarization of the one or more palette indexes is a truncated binary (TB) code with a maximal palette index as a binarization input parameter.

64. A method of video processing, comprising performing a conversion between a video comprising one or more video regions comprising a current video block and a bitstream representation of the video, wherein the bitstream representation conforms to a format rule that the current video block is coded using a palette mode coding tool and constrains a derivation between an index of an escape symbol and an index of a non-escape symbol, wherein the palette mode coding tool represents the current video block using a palette of representative color values and wherein the escape symbol is used for a sample of the current video block coded without using the representative color values.

65. The method of solution 64, wherein deriving the index of the escape symbol from the index of the non-escape symbol is disallowed.

66. The method of solution 64, wherein deriving the index of the non-escape symbol from the index of the escape symbol is disallowed.

67. A method of video processing, comprising performing a conversion between a video comprising one or more video regions comprising a current video block and a bitstream representation of the video, wherein the bitstream representation conforms to a format rule that the current video block that is coded using a palette mode coding tool, wherein a derived palette index of the palette mode coding tool has a maximum value, and wherein the palette mode coding tool represents the current video block using a palette of representative color values.

68. The method of solution 67, wherein the maximum value is a current palette table size.

69. The method of solution 67, wherein the maximum value is a current palette table size that excludes an index for one or more escape symbols, and wherein an escape symbol of the one or more escape symbols is used for a sample of the current video block coded without using the representative color values.

70. A method of video processing, comprising performing a conversion between a video comprising one or more video regions comprising a current video block and a bitstream representation of the video, wherein the bitstream representation conforms to a format rule that the current video block that is coded using a palette mode coding tool is represented using syntax elements comprising an escape symbol, wherein a value of an index indicating the escape symbol is unchanged for each of the one or more video regions, wherein the palette mode coding tool represents the current video block using a palette of representative color values and wherein the escape symbol is used for a sample of the current video block coded without using the representative color values.

71. The method of solution 70, wherein the index is equal to MaxPaletteIndex.

72. A method of video processing, comprising performing a conversion between a video comprising one or more video regions comprising a current video block and a bitstream representation of the video, wherein the bitstream representation conforms to a format rule that the current video block that is coded using a palette mode coding tool is represented using syntax elements that are coded based on the current index and a reference index, wherein the palette mode coding tool represents the current video block using a palette of representative color values.

73. The method of solution 72, wherein a difference between the current index and the reference index is coded.

74. The method of solution 73, wherein a coded representation of the difference excludes zero-valued differences.

75. The method of solution 72, wherein a modulo of a difference between the current index and the reference index is coded.

76. The method of solution 75, wherein the modulo is represented as I=modulo(C−R, MaxPaletteIndex), wherein C is the current index, R is the reference index, and MaxPaletteIndex is a predefined non-negative integer.

77. The method of solution 72, wherein the reference index is set to −1 at a beginning of a palette block of the palette mode coding tool.

78. A method of video processing, comprising performing a conversion between a video comprising one or more video regions comprising a current video block and a bitstream representation of the video, wherein the bitstream representation conforms to a format rule that the current video block that is coded using a palette mode coding tool is represented using syntax elements comprising an escape symbol that is predictively coded, wherein the palette mode coding tool represents the current video block using a palette of representative color values and wherein the escape symbol is used for a sample of the current video block coded without using the representative color values.

79. The method of solution 78, wherein the escape symbol is predictively coded based on previously coded escape symbols.

80. The method of solution 78, wherein the escape symbol in a color component of the video is predictively coded based on values in the same color component.

81. The method of solution 78, wherein the escape symbol in a first color component of the video is predictively coded based on values in a second color component of the video that is different from the first color component.

82. A method of video processing, comprising performing a conversion between a video comprising one or more video regions comprising a current video block and a bitstream representation of the video, wherein the bitstream representation conforms to a format rule that the current video block that is coded using a palette mode coding tool is represented using syntax elements that are run-length coded with a context based on a palette index for indexing palette entries, wherein the palette mode coding tool represents the current video block using a palette of representative color values.

83. The method of solution 82, wherein the context for a prefix of a length element is based on the palette index after an index adjustment process at a decoder.

84. A method of video processing, comprising performing a conversion between a video comprising one or more video regions comprising a current video block and a bitstream representation of the video, wherein the bitstream representation conforms to a format rule that the current video block that is coded using a palette mode coding tool is represented using syntax elements comprising a current palette index that is signalled independently of previous palette indices, wherein the palette mode coding tool represents the current video block using a palette of representative color values.

85. The method of solution 84, wherein using the previous palette indices is based on whether the current video block comprises one or more escape symbols, and wherein an escape symbol is used for a sample of the current video block coded without using the representative color values.

86. A method of video processing, comprising determining, based on an alignment rule, a first neighboring video block used for predicting a quantization parameter for a current video block of one or more video regions of a video and a second neighboring video block used for predictively determining a coding mode of the current video block; and performing, based on the determining, a conversion between the video and a bitstream representation of the video.

87. The method of solution 86, wherein the first neighboring video block is an above left neighboring video block or an above neighboring video block.

88. The method of solution 86 or 87, wherein the second neighboring video block is an above left neighboring video block or an above neighboring video block.

89. The method of any of solutions 86 to 88, wherein the coding mode comprises a most probable mode (MPM) for the current video block.

90. A method of video processing, comprising performing a conversion between a video comprising one or more video regions comprising a current video block and a bitstream representation of the video, wherein the bitstream representation conforms to a format rule that the current video block that is coded using a palette mode coding tool is represented using syntax elements comprising a block-level quantization parameter (QP) difference regardless of whether the current video block comprises an escape symbol, wherein the palette mode coding tool represents the current video block using a palette of representative color values and wherein the escape symbol is used for a sample of the current video block coded without using the representative color values.

91. The method of solution 90, wherein the QP difference is coded for a palette block with a width greater than a threshold.

92. The method of solution 90, wherein the QP difference is coded for a palette block with a height greater than a threshold.

93. A method of video processing, comprising performing a conversion between a video comprising one or more video regions comprising a current video block and a bitstream representation of the video, wherein the bitstream representation conforms to a format rule that the current video block that is coded using a palette mode coding tool is represented using syntax elements comprising one or more coded block flags (CBFs) for a palette block, wherein the palette mode coding tool represents the current video block using a palette of representative color values.

94. The method of solution 93, wherein each of the CBFs is set equal to one.

95. The method of solution 93, wherein a value of the one or more CBFs is based on whether the current video block comprises an escape symbol, wherein the escape symbol is used for a sample of the current video block coded without using the representative color values.

96. A method of video processing, comprising performing a conversion between a video comprising one or more video regions comprising a current video block and a bitstream representation of the video, wherein the bitstream representation conforms to a format rule that the current video block that is coded using a palette mode coding tool is represented using syntax elements comprising one or more palette indices, wherein a number of the one or more palette indices (NumPltIdx) is greater than or equal to K, wherein the palette mode coding tool represents the current video block using a palette of representative color values, and wherein K is a positive integer.

97. The method of solution 96, wherein K is based on a current palette size (S), an escape flag (E), or a size of the current video block (BlkS).

98. The method of solution 97, wherein K=S+E.

99. The method of solution 96, wherein K is equal to a maximal value of a palette index (MaxPaletteIndex) plus one.

100. The method of solution 96, wherein one of the syntax elements comprises NumPltIdx−K.

101. The method of solution 100, wherein a binarization of a value of (NumPltIdx−K) is a truncated binary code.

102. The method of solution 100, wherein a binarization of a value of (NumPltIdx−K) is a truncated unary code.

103. The method of solution 101 or 102, wherein (BlkS−K) is a binarization input parameter, and wherein BlkS is a size of the current video block.

104. A method of video processing, comprising performing a conversion between a video comprising one or more video regions comprising a current video block and a bitstream representation of the video, wherein the bitstream representation conforms to a format rule that the current video block that is coded using a palette mode coding tool is represented using syntax elements based on a maximum size of a palette for the current block, a size of the current video block, a usage of a lossless mode, or a quantization parameter (QP), wherein the palette mode coding tool represents the current video block using a palette of representative color values.

105. The method of solution 104, wherein a size of the palette for the current block is inferred to be equal to the size of the current video block upon a determination that the lossless mode has bene applied, the QP is greater than a threshold, or transform skip has been applied.

106. The method of any of solutions 1 to 105, wherein performing the conversion is further based on one or more of a video content of the video, a message signalled in a decoder parameter set (DPS), a sequence parameter set (SPS), a video parameter set (VPS), a picture parameter set (PPS), an adaptation parameter set (APS), a picture header, a slice header, a tile group header, a largest coding unit (LCU), a coding unit (CU), an LCU row, a group of LCUs, a transform unit (TU), a prediction unit (PU) block, or a video coding unit, an indication of a color format of the video, a coding tree structure, a temporal ID layer, or a profile, level, or tier of a standard.

107. A method of video processing, comprising determining, for a conversion between a video comprising one or more video regions comprising a current video block and a bitstream representation of the video, that the current video block is coded with a block-based differential pulse code modulation (BDPCM) mode and split into multiple transform blocks or sub-blocks; and performing, as part of performing the conversion, a residual prediction at a block level and an inclusion of one or more residuals in the bitstream representation at the sub-block or transform block level based on the determining 108. A method of video processing, comprising performing a conversion between a video comprising one or more video regions comprising a current video block and a bitstream representation of the video, wherein the bitstream representation conforms to a format rule that the current video block that is coded using a line-based coefficient group (CG) palette mode, wherein the line-based CG palette mode represents multiple segments of each coding unit (CU) of the current video block using a palette of representative color values.

109. The method of solution 108, wherein the bitstream representation comprises an indication of whether an escape sample is present for each coefficient group, and wherein an escape sample is used for a sample of the current video block coded without using the representative color values.

110. The method of solution 108, wherein the bitstream representation comprises an indication of a usage of copying an above index that is not context coded.

111. The method of solution 110, wherein the indication is bypass coded.

112. The method of solution 108, wherein one or more copy flags, one or more run types, one or more indications of a usage of copying an above index, and escape values are signalled in the bitstream representation in an interleaved manner 113. The method of solution 108, wherein the line-based CG palette mode is disabled upon a determination that a size of the current video block is less than or equal to a threshold (Th).

114. The method of any of solutions 107 to 113, wherein performing the conversion is further based on one or more of a video content of the video, a message signalled in a decoder parameter set (DPS), a sequence parameter set (SPS), a video parameter set (VPS), a picture parameter set (PPS), an adaptation parameter set (APS), a picture header, a slice header, a tile group header, a largest coding unit (LCU), a coding unit (CU), an LCU row, a group of LCUs, a transform unit (TU), a prediction unit (PU) block, or a video coding unit, an indication of a color format of the video, a coding tree structure, a temporal ID layer, or a profile, level, or tier of a standard.

115. The method of any of solutions 1 to 114, wherein performing the conversion comprises generating the bitstream representation from the one or more video regions.

116. The method of any of solutions 1 to 114, wherein performing the conversion comprises generating the one or more video regions from the bitstream representation.

117. An apparatus in a video system comprising a processor and a non-transitory memory with instructions thereon, wherein the instructions upon execution by the processor, cause the processor to implement the method in any one of solutions 1 to 116.

118. A computer program product stored on a non-transitory computer readable media, the computer program product including program code for carrying out the method in any one of solutions 1 to 116.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for processing video data, comprising:
determining, for a conversion between a current video block of a video and a bitstream of the video, that a prediction mode is applied to the current video block, wherein in the prediction mode, reconstructed samples are represented by a set of representative color values, and the set of representative color values comprises at least one of 1) palette predictors, 2) escaped samples, or 3) palette information included in the bitstream; and
performing the conversion at least based on the prediction mode,
wherein a first syntax element specifying a quantized value of the escaped sample is included in the bitstream, and wherein a binarization of the first syntax element uses an exponential-Golomb (EG) code of order K, K a non-negative integer that is unequal to three,
wherein a reconstructed escaped sample is generated based on a Clip function and the quantized value of the escaped sample,
wherein the reconstructed escaped sample is further determined based on qP which specifies a quantization parameter, and
wherein the qP is determined based on Max (QpPrimeTsMin, Qp'Y), where QpPrimeTsMin denotes a minimum allowed quantization parameter for a transform skip mode, and Qp'Y denotes a luma quantization parameter.

2. The method of claim 1, wherein K=5.

3. The method of claim 1, wherein the reconstructed escape sample is determined based on Clip3 (0, (1<<BitDepth)−1, tmpVal),
wherein tmpVal is determined based on m<< (qP/6)+32)>>6, and
wherein m is determined based on the quantized value of the escaped sample.

4. The method of claim 1, wherein QpPrimeTsMin is defined as 6*n+4, wherein n is a value of a second syntax element included in the bitstream.

5. The method of claim 4, wherein the second syntax element is included in a sequence level of the bitstream.

6. The method of claim 1, wherein the current video block is a luma block,
wherein a current palette comprising one or more palette predictors derived from a palette prediction table is constructed for the current video block, wherein the conversion is performed further based on the current palette,
wherein a determination that a local dual tree coding is applied to the current video block is made, and
wherein based on the determination, the palette prediction table is modified according to the current palette, wherein modifying the palette prediction table comprises a reset process.

7. The method of claim 6, wherein the local dual tree coding disables partitioning of a chroma parent block and enables partitioning of a corresponding luma parent block based on a size of the chroma parent block,
wherein the luma parent block is generated from a luma coding tree block based on a luma partition scheme including recursive partition operations, and the chroma parent block is generated from a chroma coding tree block based on a chroma partition scheme having same recursive partition operations with the luma partition scheme.

8. The method of claim 6, wherein the reset process includes resetting an entry of the palette prediction table to a fixed value.

9. The method of claim 1,
wherein when the current video block is a chroma block, the quantization parameter is derived from a variable obtained by performing a mapping operation on a luma quantization parameter of a luma video block corresponding to the current video block.

10. The method of claim 9, wherein the quantization parameter is derived based on the variable and a clip function.

11. The method of claim 1, wherein the minimum allowed quantization parameter is indicated in a sequence parameter set in the bitstream.

12. The method of claim 1, wherein the conversion includes encoding the current video block into the bitstream.

13. The method of claim 1, wherein the conversion includes decoding the current video block from the bitstream.

14. An apparatus for processing video data comprising a processor and a non-transitory memory with instructions thereon, wherein the instructions upon execution by the processor, cause the processor to:
determine, for a conversion between a current video block of a video and a bitstream of the video, that a prediction mode is applied to the current video block, wherein in the prediction mode, reconstructed samples are represented by a set of representative color values, and the set of representative color values comprises at least one of 1) palette predictors, 2) escaped samples, or 3) palette information included in the bitstream; and
perform the conversion at least based on the prediction mode,
wherein a first syntax element specifying a quantized value of the escaped sample is included in the bitstream, and wherein a binarization of the first syntax element uses an exponential-Golomb (EG) code of order K, K a non-negative integer that is unequal to three,
wherein a reconstructed escaped sample is generated based on a Clip function and the quantized value of the escaped sample, wherein the reconstructed escape sample is further determined based on qP which specifies a quantization parameter, and wherein the qP is determined based on Max (QpPrimeTsMin, Qp'Y), where QpPrimeTsMin denotes a minimum allowed quantization parameter for a transform skip mode, and Qp'Y denotes a luma quantization parameter.

15. The apparatus of claim 14, wherein the current video block is a luma block, wherein a current palette comprising one or more palette predictors derived from a palette prediction table is constructed for the current video block, wherein the conversion is performed further based on the current palette, wherein a determination that a local dual tree coding is applied to the current video block is made, and wherein based on the determination, the palette prediction table is modified according to the current palette, wherein modifying the palette prediction table comprises a reset process.

16. The apparatus of claim 14, wherein when the current video block is a chroma block, the quantization parameter is derived from a variable obtained by performing a mapping operation on a luma quantization parameter of a luma video block corresponding to the current video block.

17. A non-transitory computer-readable storage medium storing instructions that cause a processor to:

determine, for a conversion between a current video block of a video and a bitstream of the video, that a prediction mode is applied to the current video block, wherein in the prediction mode, reconstructed samples are represented by a set of representative color values, and the set of representative color values comprises at least one of 1) palette predictors, 2) escaped samples, or 3) palette information included in the bitstream; and perform the conversion at least based on the prediction mode, wherein a first syntax element specifying a quantized value of the escaped sample is included in the bitstream, and wherein a binarization of the first syntax element uses an exponential-Golomb (EG) code of order K, K a non-negative integer that is unequal to three, wherein a reconstructed escaped sample is generated based on a Clip function and the quantized value of the escaped sample, wherein the reconstructed escape sample is further determined based on qP which specifies a quantization parameter, and wherein the qP is determined based on Max (QpPrimeTsMin, Qp'Y), where QpPrimeTsMin denotes a minimum allowed quantization parameter for a transform skip mode, and Qp'Y denotes a luma quantization parameter.

18. A non-transitory computer-readable recording medium storing a bitstream which is generated by a method performed by a video processing apparatus, wherein the method comprises:

determining, for a current video block of a video, that a prediction mode is applied to the current video block, wherein in the prediction mode, reconstructed samples are represented by a set of representative color values, and the set of representative color values comprises at least one of 1) palette predictors, 2) escaped samples, or 3) palette information included in the bitstream; and generating the bitstream at least based on the prediction mode, wherein a first syntax element specifying a quantized value of the escaped sample is included in the bitstream, and wherein a binarization of the first syntax element uses an exponential-Golomb (EG) code of order K, K a non-negative integer that is unequal to three, wherein a reconstructed escaped sample is generated based on a Clip function and the quantized value of the escaped sample, wherein the reconstructed escape sample is further determined based on qP which specifies a quantization parameter, and wherein the qP is determined based on Max (QpPrimeTsMin, Qp'Y), where QpPrimeTsMin denotes a minimum allowed quantization parameter for a transform skip mode, and Qp'Y denotes a luma quantization parameter.

19. The non-transitory computer-readable storage medium of claim 17, wherein the current video block is a luma block, wherein a current palette comprising one or more palette predictors derived from a palette prediction table is constructed for the current video block, wherein the conversion is performed further based on the current palette, wherein a determination that a local dual tree coding is applied to the current video block is made, and wherein based on the determination, the palette prediction table is modified according to the current palette, wherein modifying the palette prediction table comprises a reset process.

20. The non-transitory computer-readable recording medium of claim 18, wherein the current video block is a luma block, wherein a current palette comprising one or more palette predictors derived from a palette prediction table is constructed for the current video block, wherein the generating is performed further based on the current palette, wherein a determination that a local dual tree coding is applied to the current video block is made, and wherein based on the determination, the palette prediction table is modified according to the current palette, wherein modifying the palette prediction table comprises a reset process.

* * * * *